US011429712B2

(12) United States Patent
Ortiz et al.

(10) Patent No.: US 11,429,712 B2
(45) Date of Patent: Aug. 30, 2022

(54) SYSTEMS AND METHODS FOR DYNAMIC PASSPHRASES

(71) Applicant: ROYAL BANK OF CANADA, Toronto (CA)

(72) Inventors: Edison U. Ortiz, Toronto (CA); Mohammad Abuzar Shaikh, Toronto (CA); Margaret Inez Salter, Toronto (CA); Sarah Rachel Waigh Yean Wilkinson, Toronto (CA); Arya Pourtabatabaie, Toronto (CA); Iustina-Miruna Vintila, Bucharest (RO); Steven Fernandes, Omaha, NE (US); Sumit Kumar Jha, San Antonio, TX (US)

(73) Assignee: ROYAL BANK OF CANADA, Toronto (CA)

( * ) Notice: Subject to any disclaimer, the term of this patent is extended or adjusted under 35 U.S.C. 154(b) by 58 days.

(21) Appl. No.: 17/129,631

(22) Filed: Dec. 21, 2020

(65) Prior Publication Data
US 2021/0173916 A1 Jun. 10, 2021

Related U.S. Application Data

(63) Continuation-in-part of application No. 16/521,238, filed on Jul. 24, 2019.
(Continued)

(51) Int. Cl.
*G06F 21/46* (2013.01)
*G06N 20/00* (2019.01)
(Continued)

(52) U.S. Cl.
CPC .......... *G06F 21/46* (2013.01); *G06K 9/6215* (2013.01); *G06K 9/6272* (2013.01); *G06N 5/04* (2013.01);
(Continued)

(58) Field of Classification Search
CPC ............ G06F 21/46; G06F 2221/2106; G06K 9/6215; G06K 9/6272; G06N 5/04;
(Continued)

(56) References Cited

U.S. PATENT DOCUMENTS 9,300,644 B1 * 3/2016 Dubey ................ H04L 63/0815
10,038,689 B1 * 7/2018 Chan .................... H04L 63/107
(Continued)

*Primary Examiner* — Chau Le
(74) *Attorney, Agent, or Firm* — Norton Rose Fulbright Canada LLP

(57) ABSTRACT

Systems, devices, methods, and computer readable media are provided in various embodiments relating to generating a dynamic challenge passphrase data object. The method includes establishing, a plurality of data record clusters, representing a mutually exclusive set of structured data records of an individual, ranking the plurality of feature data fields based on a determined contribution value of each feature data field relative to the establishing of the data record cluster, and identifying, using the ranked plurality of feature data fields, a first and a second feature data field of the plurality of feature data fields. The method includes generating the dynamic challenge passphrase data object, wherein the first or the second feature data field is used to establish a statement string portion, and a remaining one of the first or the second feature data field is used to establish a question string portion and a correct response string.

20 Claims, 76 Drawing Sheets

Related U.S. Application Data

(60) Provisional application No. 62/951,528, filed on Dec. 20, 2019, provisional application No. 62/839,384, filed on Apr. 26, 2019, provisional application No. 62/775,695, filed on Dec. 5, 2018, provisional application No. 62/774,130, filed on Nov. 30, 2018, provisional application No. 62/751,369, filed on Oct. 26, 2018, provisional application No. 62/702,635, filed on Jul. 24, 2018.

(51) Int. Cl.
| | | |
|---|---|---|
| *G06N 5/04* | (2006.01) | |
| *G06Q 20/10* | (2012.01) | |
| *G06K 9/62* | (2022.01) | |
| *G10L 15/25* | (2013.01) | |
| *G10L 15/02* | (2006.01) | |
| *G06V 40/16* | (2022.01) | |

(52) U.S. Cl.
CPC ........... *G06N 20/00* (2019.01); *G06Q 20/108* (2013.01); *G06V 40/171* (2022.01); *G10L 15/02* (2013.01); *G10L 15/25* (2013.01); *G06F 2221/2103* (2013.01); *G10L 2015/025* (2013.01)

(58) Field of Classification Search
CPC ...... G06N 20/00; G06V 40/171; G10L 15/02; G10L 15/25
See application file for complete search history.

(56) References Cited

U.S. PATENT DOCUMENTS

| | | | |
|---|---|---|---|
| 2013/0132091 A1* | 5/2013 | Skerpac | G10L 17/00 704/273 |
| 2014/0359736 A1* | 12/2014 | Harty | H04L 63/0861 726/7 |
| 2021/0141888 A1* | 5/2021 | Hires | H04L 63/083 |
| 2021/0173916 A1* | 6/2021 | Ortiz | H04L 9/3226 |
| 2021/0174069 A1* | 6/2021 | Benkreira | G06V 30/1444 |

* cited by examiner

2D facial recognition can't distinguish similar people
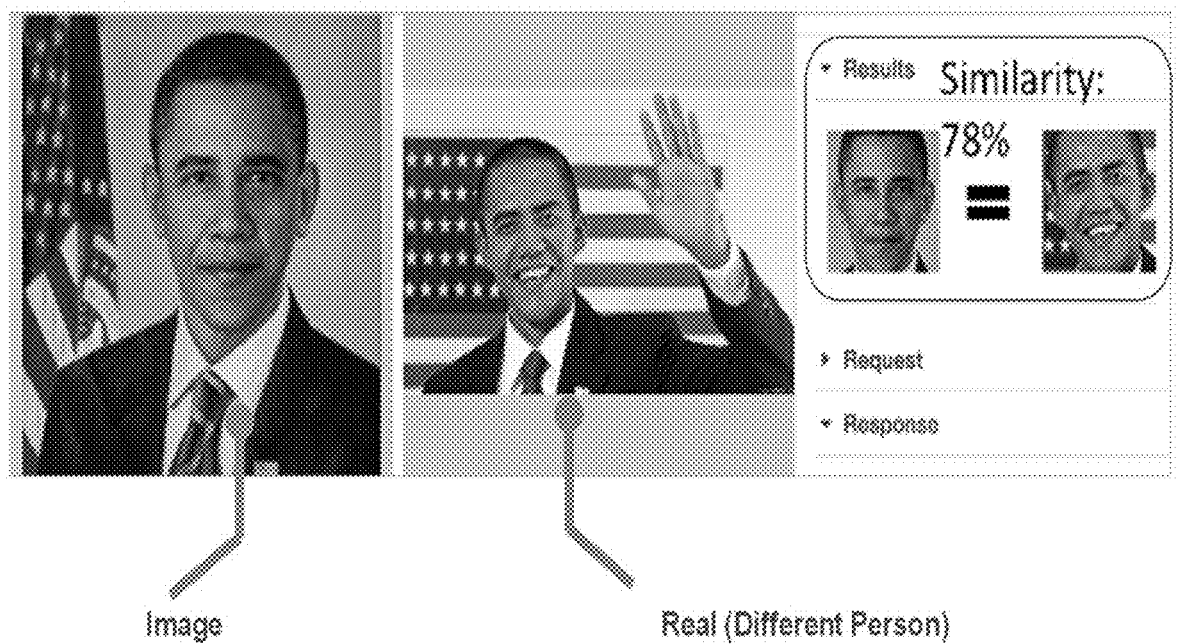
Image          Real (Different Person)
* Amazon Rekognition and Azure only offers 2D facial recognition
* FaceID on iPhoneX uses depth analysis, however, APIs are not open to developers
* Infrared hardware on iPhoneX is not accessible by developers
FIG. 11

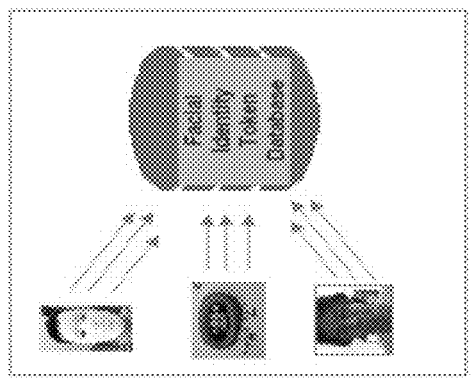

Facial Identity Token: Extracted features (eg. 2D, Lip Movement, 3D) are encrypted and stored as string in a secure database

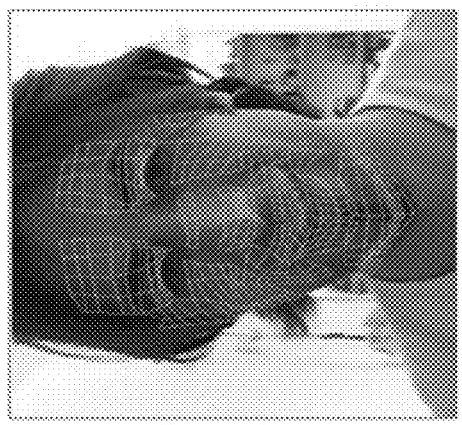

3D Depth Video Analysis: Extract and utilize user's depth facial features in situations where a depth camera is available

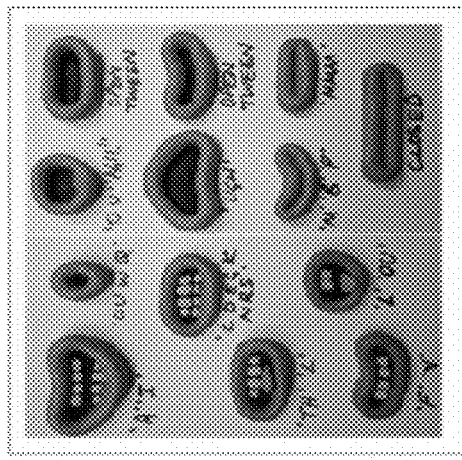

Lip Movement: AI to extract and interpret the user's lip movement against RBC-provided words as a way to validate the user

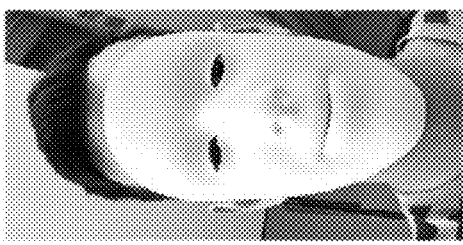

Pixel Mask: Applying an AR face mask via mobile to gamify and extract user's 2D facial features

FIG. 12

Leverage GAN in the system when needed

1350

Problem: Video has proliferated the world, which has lead to latency problems due to high traffic and low bandwidth. A result, videos are transmitted at lower resolution to reduce latency and cost.

What is GAN? GAN (Generative Adversarial Networks) is a Deep Learning algorithm could be trained to upscale the frames of video. A browser plugin that can use the algorithm to generate and render a better quality video.

Advantage of GAN

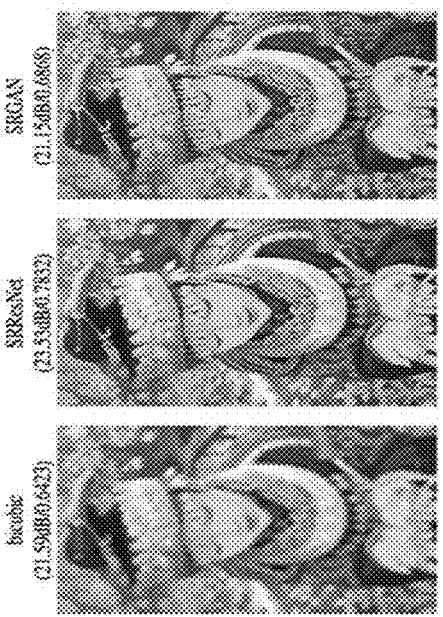

- Low bandwidth usage
- No lag or interruptions
- Better reconstruction than existing state-of-the-art methods used.

GAN Diagram 1352

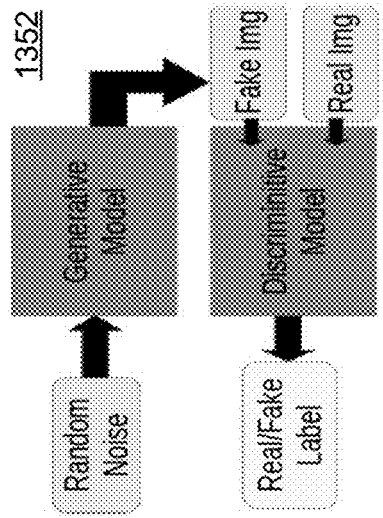

```
┌─────────────────────────────────────────────────────────────┐
│ RECEIVING ONE OR MORE IMAGES OR VIDEOS TAKEN BY A CAMERA,   │
│ EACH IMAGE OR VIDEO CONTAINING A FACE                       │
│ 2701                                                        │
└─────────────────────────────────────────────────────────────┘
                              │
                              ▼
┌─────────────────────────────────────────────────────────────┐
│ EXTRACTING ONE OR MORE FACIAL FEATURES OF THE FACE FROM     │
│ EACH OF THE IMAGES OR VIDEOS BY PROCESSING THE IMAGE OR     │
│ VIDEO TO GENERATE LOCATION COORDINATES OF EACH OF THE ONE   │
│ OR MORE FACIAL FEATURES                                     │
│ 2702                                                        │
└─────────────────────────────────────────────────────────────┘
                              │
                              ▼
┌─────────────────────────────────────────────────────────────┐
│ USING THE IMAGE AND LOCATION COORDINATES TO GENERATE A TOKEN│
│ 2703                                                        │
└─────────────────────────────────────────────────────────────┘
                              │
                              ▼
┌─────────────────────────────────────────────────────────────┐
│ A SIGNING AUTHORITY VERIFIES AND SIGNS THE TOKEN            │
│ 2704                                                        │
└─────────────────────────────────────────────────────────────┘
                              │
                              ▼
┌─────────────────────────────────────────────────────────────┐
│ SIGNED TOKEN IS SAVED IN A USER'S MOBILE DEVICE             │
│ 2705                                                        │
└─────────────────────────────────────────────────────────────┘
```

```
┌─────────────────────────────────────────────────────────────┐
│ USER SCANS A QR OR BAR CODE USING A MOBILE DEVICE TO ASSOCIATE │
│      THE MOBILE DEVICE WITH THE VERIFICATION PROCESS        │
│                          2801                                │
└─────────────────────────────────────────────────────────────┘
                               │
                               ▼
┌─────────────────────────────────────────────────────────────┐
│      VENDOR POS TAKES A PICTURE OR IMAGE OF USER'S FACE      │
│                          2802                                │
└─────────────────────────────────────────────────────────────┘
                               │
                               ▼
┌─────────────────────────────────────────────────────────────┐
│ POS EXTRACTING ONE OR MORE FACIAL FEATURES OF THE FACE FROM  │
│ EACH OF THE IMAGES OR VIDEOS BY PROCESSING THE IMAGE OR VIDEO│
│ TO GENERATE LOCATION COORDINATES OF EACH OF THE ONE OR MORE  │
│                      FACIAL FEATURES                         │
│                          2803                                │
└─────────────────────────────────────────────────────────────┘
                               │
                               ▼
┌─────────────────────────────────────────────────────────────┐
│  POS USING THE IMAGE AND LOCATION COORDINATES TO GENERATE A  │
│                           TOKEN                              │
│                          2804                                │
└─────────────────────────────────────────────────────────────┘
              │                              │
              ▼                              ▼
┌──────────────────────────┐   ┌──────────────────────────────┐
│  GENERATED TOKEN IS      │   │ IF THE USER'S MOBILE DEVICE IS│
│  COMPARED AGAINST SIGNED │   │  NOT REACHABLE, OR IT DOES    │
│  TOKENS STORED IN THE USER'S│ │ NOT HAVE THE SIGNED TOKENS,  │
│  MOBILE DEVICE TO CHECK FOR │ │ POS MAY REACH AN EXTERNAL    │
│      USER'S IDENTITY     │   │ DATABASE (E.G. FEATURE OR    │
│          2805            │   │ TOKEN DATABASE) FOR THE      │
│                          │   │ PURPOSE OF IDENTITY          │
│                          │   │ VERIFICATION                 │
│                          │   │          2806                │
└──────────────────────────┘   └──────────────────────────────┘
```

FIG. 28

Use Case 1.a - Enrolment (2D + Lip)

Pre-Condition: Mobile Phone

Enrolment:
1. A User opens mobile-app for enrolment
2. The User requests for "Basic Enrolment" and provides required information
3. The Mobile-app takes a 2D picture of the User's face
4. The "Basic Enrolment" requests the User via mobile-app to say the challenge words/phrases
5. The "Basic Enrolment" extracts and tokenizes all the required information
6. The "Basic Enrolment" creates and delivers signed tokens to the PIB Note: This example enrolment is a convenient, frequent and low barrier to entry such as gym membership, points program, work badge, low value transactions, restricted public space)

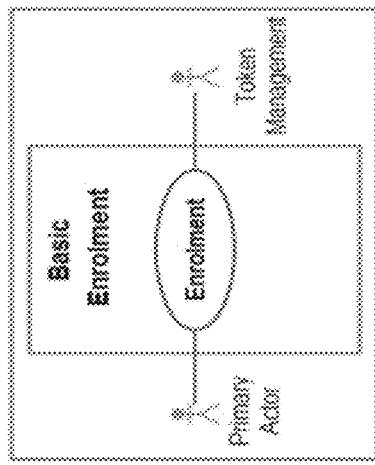
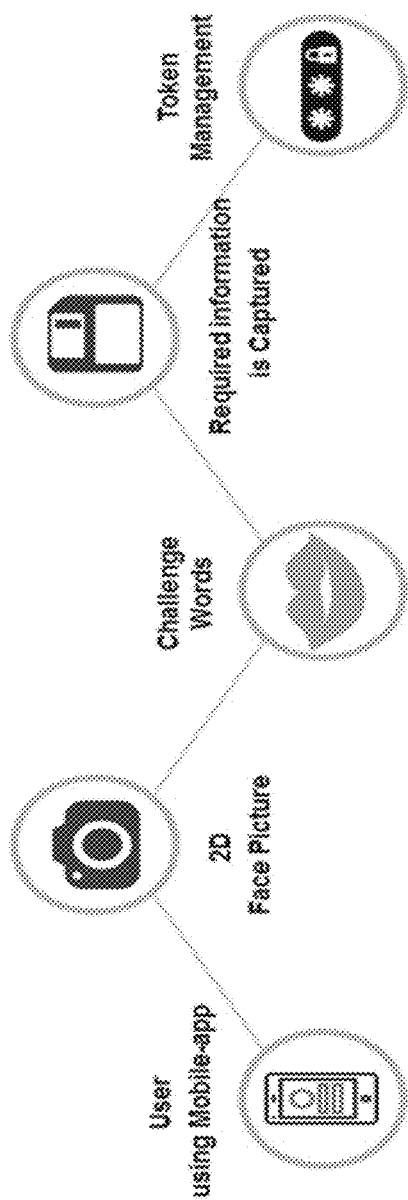

FIG. 34

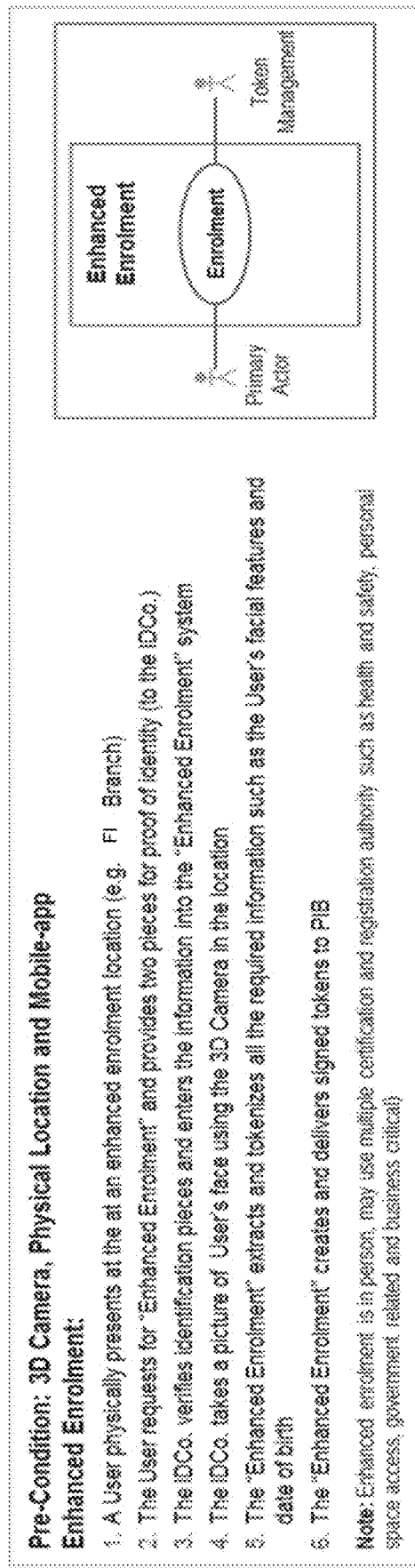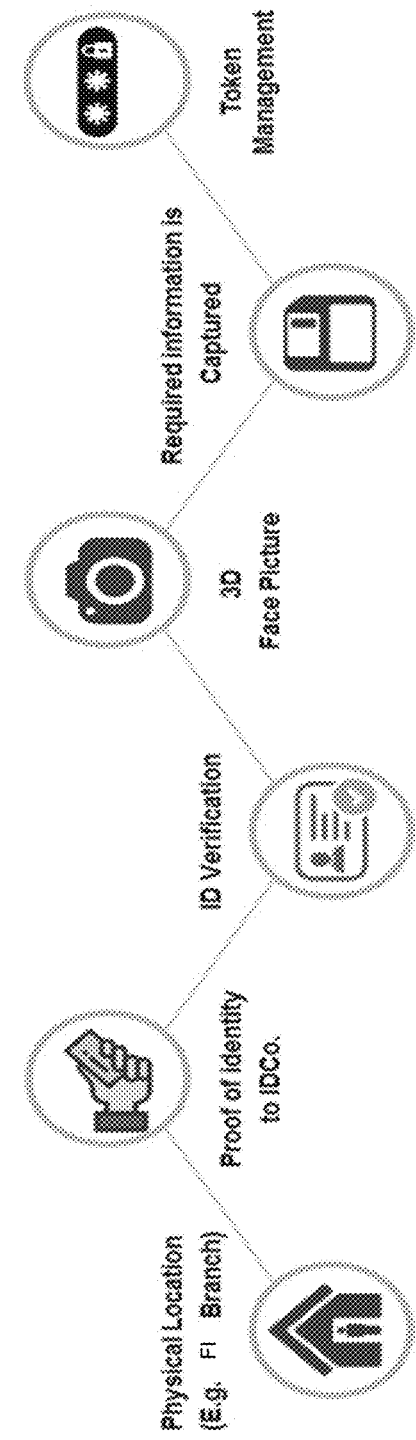
FIG. 35

Use case 2 - Touchless Rental Bike

Pre-Condition: 2D Camera, Mobile-phone

Rent a Bike:
1. The Renter selects a bike at the station and faces the station camera
2. The camera scans The Renter's facial component
3. The Identification and deposit token is presented by the Renter via mobile phone and verified by the Station
4. The System verifies that the Renter is not holding a bike from previous rent
5. The System unlocks the bike
6. The system creates a Token with the date and time that the Bike was unlocked Return the Bike:
1. The Renter places the bike in an empty spot in the station
2. The station accepts the return
3. The Payment component calculates the charge and applies it on the Renter's preferred method of payment through "Payment Services"
4. The inventory is updated

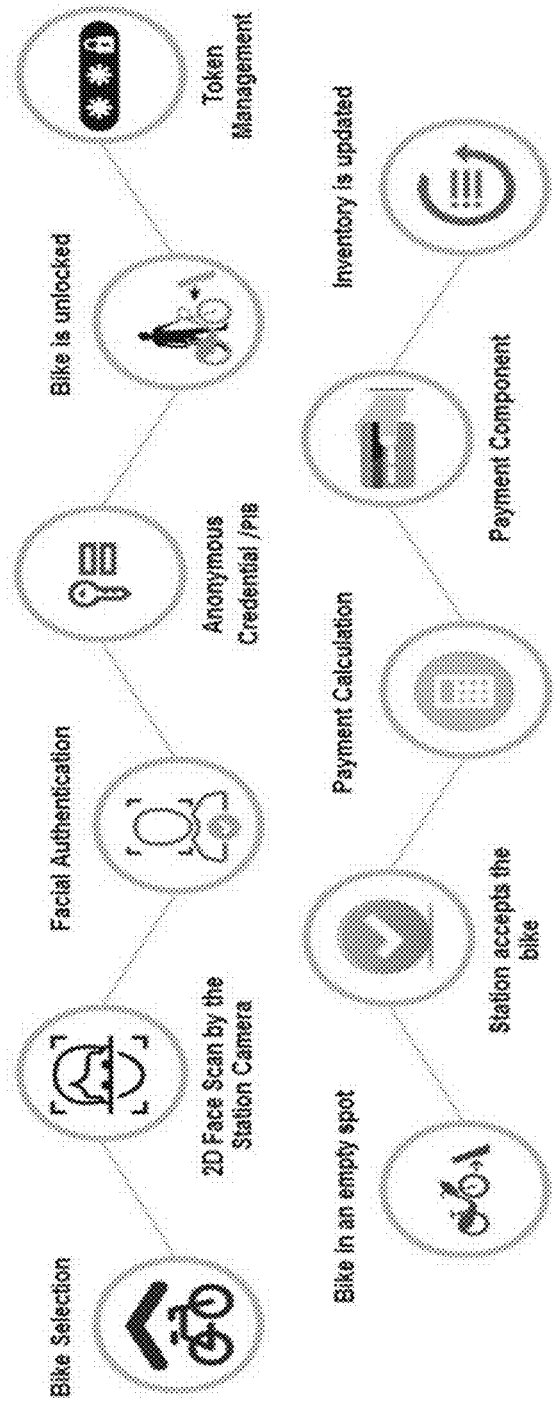

FIG. 36

| Total images: 161 | | | | | | | | | | | | |
|---|---|---|---|---|---|---|---|---|---|---|---|---|
| name | TP | TN | FP | FN | specificity | precision | recall | mcc | 10.5 | 11 | 12 | Accuracy |
| personne08127-15-90 | 11 | 67 | 82 | 0 | 0.4496...... | 0.1182...... | 1 | 0.2306...... | 0.1322...... | 0.2115...... | 0.5288...... | 0.4875 |
| personne09133-15+0 | 12 | 64 | 84 | 0 | 0.4324...... | 0.125 | 1 | 0.2324...... | 0.1388...... | 0.2222...... | 0.5555...... | 0.475 |
| personne02138-15+75 | 11 | 81 | 68 | 0 | 0.5436...... | 0.1392...... | 1 | 0.2751...... | 0.1527...... | 0.2444...... | 0.6111...... | 0.575 |
| personne01114-30-90 | 13 | 46 | 101 | 0 | 0.3129...... | 0.1140...... | 1 | 0.1889...... | 0.1279...... | 0.2047...... | 0.5118...... | 0.36875 |
| personne02131-15-30 | 11 | 71 | 78 | 0 | 0.4765...... | 0.1235...... | 1 | 0.2426...... | 0.1375 | 0.22 | 0.55 | 0.5125 |

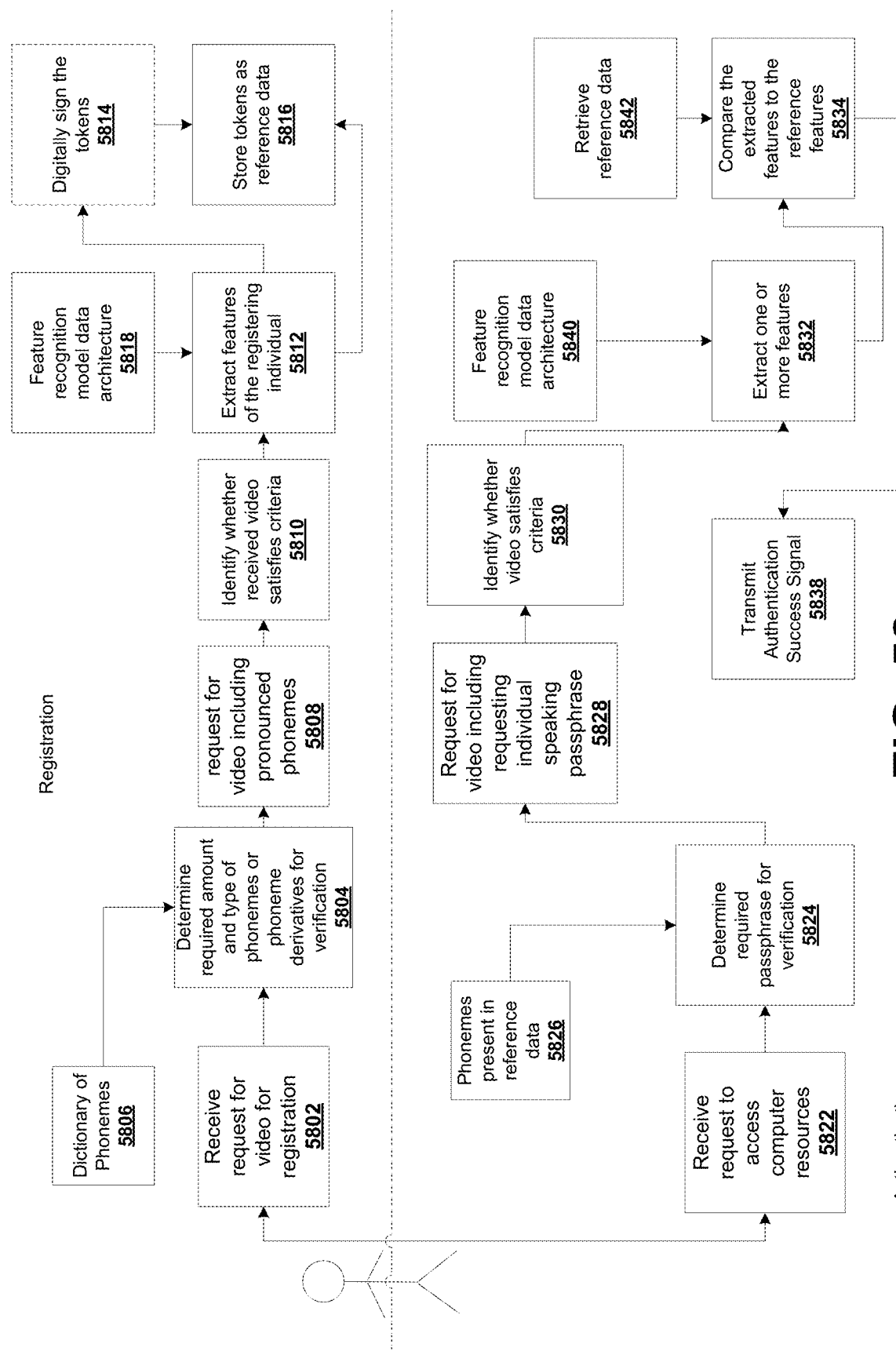

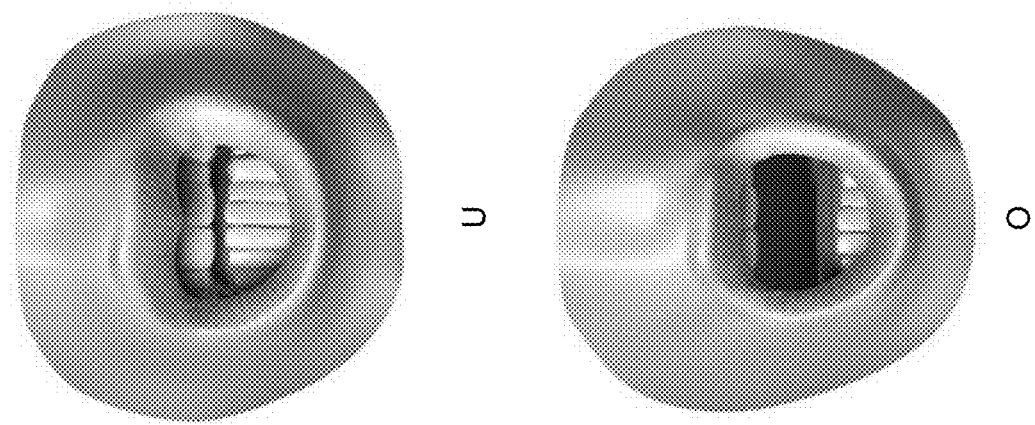
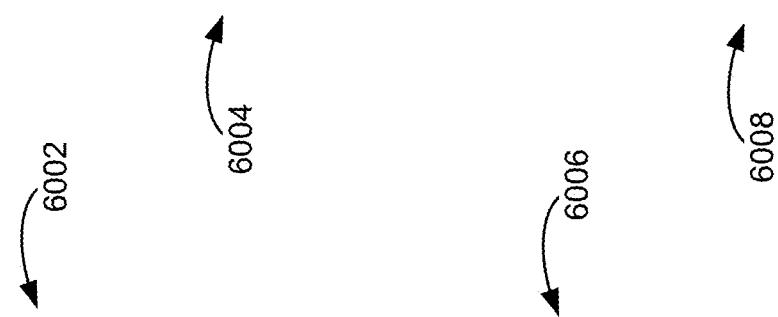
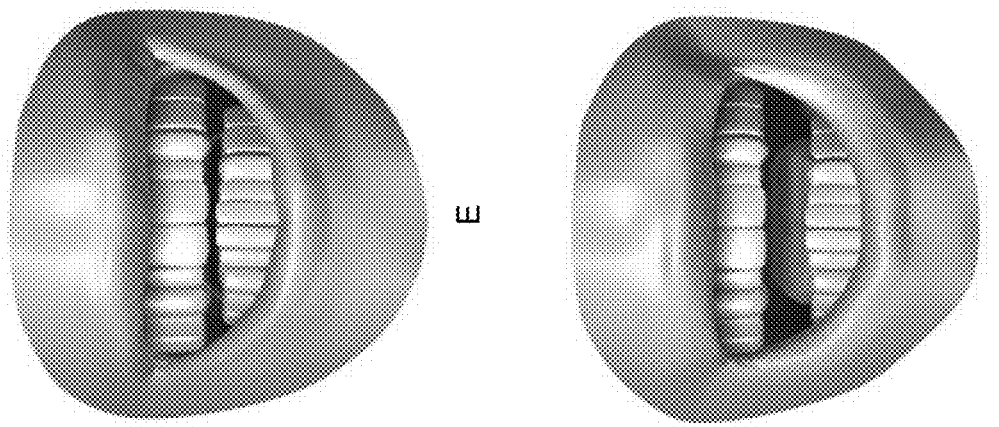
FIG. 60

| Date | Description | Amount | Merchant name | Transaction fee | Balance (Do not include negative) |
|---|---|---|---|---|---|
| DATE | Existing balance | $45.00 | Woodgrove Bank | | $45.00 |
| DATE | Payment for June | -$34.00 | Woodgrove Bank | $2.00 | $13.00 |
| DATE | Picture frame | $45.00 | Northwind Traders | | $58.00 |
| DATE | Wine | $680.00 | Coho Winery | | $678.00 |
| DATE | Ticket to Mars | $469.00 | Blue Yonder Airlines | | $1,147.00 |
| DATE | Cash withdrawal | $654.00 | Woodgrove Bank | $20.00 | $1,801.00 |
| Total | | $1,779.00 | | $22.00 | |

FIG. 61

```
'AUC 0.58 +/- 0.01'

1  # Top 20 features
2  clf.fit(x, y)
3  top_features = feature_importances(clf, features_encoded, n=20)

1: Feature: frequency = POPLATEK TYDNE, 0.275
 2: Feature: frequency = POPLATEK MESICNE, 0.208
 3: Feature: frequency = POPLATEK PO OBRATU, 0.175
 4: Feature: district_id, 0.101
 5: Feature: WEEKDAY(date) = 6.0, 0.033
 6: Feature: WEEKDAY(date) is unknown, 0.029
 7: Feature: frequency is unknown, 0.027
 8: Feature: YEAR(date) = 1994.0, 0.025
 9: Feature: MONTH(date) is unknown, 0.023
10: Feature: YEAR(date) is unknown, 0.013
11: Feature: YEAR(date) = 1996.0, 0.012
12: Feature: DAY(date) is unknown, 0.009
13: Feature: MONTH(date) = 10.0, 0.008
14: Feature: DAY(date) = 13.0, 0.008
15: Feature: YEAR(date) = 1997.0, 0.008
16: Feature: MONTH(date) = 11.0, 0.005
17: Feature: MONTH(date) = 9.0, 0.005
18: Feature: YEAR(date) = 1995.0, 0.004
19: Feature: DAY(date) = 12.0, 0.004
20: Feature: MONTH(date) = 7.0, 0.004
```

FIG. 64

```
[ ]    1  # Top 20 features
       2  clf.fit(X, y)
       3  top_features = feature_importances(clf, features_encoded, n=20)

⌐›    Feature 1: DAY(date) is unknown, 0.115
       Feature 2: YEAR(date) is unknown, 0.102
       Feature 3: MONTH(date) is unknown, 0.102
       Feature 4: WEEKDAY(date) is unknown, 0.098
       Feature 5: frequency is unknown, 0.085
       Feature 6: frequency = POPLATEK MESICNE, 0.007
       Feature 7: frequency = POPLATEK TYDNE, 0.003
       Feature 8: frequency = POPLATEK PO OBRATU, 0.003
       Feature 9: district_id, 0.000
       Feature 10: SUM(trans.account_id), 0.000
       Feature 11: SUM(trans.amount), 0.000
       Feature 12: SUM(trans.balance), 0.000
       Feature 13: SUM(trans.account), 0.000
       Feature 14: STD(trans.account_id), 0.000
       Feature 15: STD(trans.amount), 0.000
       Feature 16: STD(trans.balance), 0.000
       Feature 17: STD(trans.account), 0.000
```

7300 retrieve, from one or more data sources, one or more data objects storing a plurality of structured data records associated with an individual, each structured data record of the plurality of structured data records including at least a plurality of data values corresponding to a feature data field of a plurality of feature data fields
7301 establish, using an unsupervised machine learning model data architecture, a plurality of data record clusters, each data record cluster representing a mutually exclusive set of structured data records of the plurality of structured data Records
7302 for a data record cluster having a largest number of structured data records, rank the plurality of feature data fields based on a determined contribution value of each feature data field relative to the establishing of the data record cluster having the largest number of structured data
7303 identify, using the ranked plurality of feature data fields, a first and a second feature data field of the plurality of feature data fields having the two highest determined contribution values
7304 generate the dynamic challenge passphrase data object, wherein the first or the second feature data field is used to establish a statement string portion, and a remaining one of the first or the second feature data field is used to establish a question string portion and a correct response string
7305

FIG. 73

SYSTEMS AND METHODS FOR DYNAMIC PASSPHRASES

CROSS REFERENCE

This application is a non-provisional of, and claims all benefit, including priority to: U.S. Application No. 62/951,528, filed 2019 Dec. 20, entitled "SYSTEMS AND METHODS FOR DYNAMIC PASSPHRASES", incorporated herein by reference in its entirety.

This application is a continuation in part of: U.S. application Ser. No. 16/521,238, entitled "SYSTEMS AND METHODS FOR SECURE TOKENIZED CREDENTIALS", filed 2019 Jul. 24, incorporated herein by reference in its entirety.

U.S. application Ser. No. 16/521,238 is a non-provisional of, and claims all benefit, including priority to: U.S. Application No. 62/702,635, entitled "SYSTEM AND METHOD FOR FACIAL RECOGNITION", filed on 2018 Jul. 24; U.S. Application No. 62/751,369, entitled "SYSTEM AND METHOD FOR FACIAL RECOGNITION", filed on 2018 Oct. 26; U.S. Application No. 62/774,130, entitled "SYSTEM AND METHOD FOR FACIAL IMAGE PROCESSING", filed on 2018 Nov. 30; U.S. Application No. 62/775,695, entitled "SYSTEMS AND METHODS FOR SECURE TOKENIZED CREDENTIALS", filed on 2018 Dec. 5; and U.S. Application No. 62/839,384, entitled "SYSTEMS AND METHODS FOR SECURE TOKENIZED CREDENTIALS", filed on 2019 Apr. 26.

All of these documents are incorporated herein by reference in their entirety.

FIELD

The present disclosure generally relates to the field of secure authentication tokens, and more specifically, secure authentication or validation using dynamically generated passphrases.

INTRODUCTION

Traditional personal verification questions rely upon a single authentication factor, or multiple static factors to form a multi-factor authentication mechanism. Static factors can include personal verification pre-determined questions previously provided by the authenticated individual such as, "What is your first pet's name", or, "What type of car do you drive?"

Static questions are vulnerable to attack by malicious parties who may have access to personal records of a person, legitimately or illegitimately (e.g., documentation stolen from rubbish bin).

SUMMARY

A technical approach is described herein that is adapted for overcoming some of the challenges associated with technical challenges in verifying credentials. A balance needs to be established between security, convenience of usage, and finite computing resources, and an improved approach is described that allows for the usage of dynamically generated passphrases (referred to in the alternative as a "passphrase") in authentication. The system can be used to secure physical or electronic resources, such as door access, access to online resources (e.g., online banking, cloud drives) protected by a challenge mechanism established using at least the dynamically generated passphrases to establish answers that would be readily apparent to an individual.

In the context of this application, dynamically generated challenge passphrases are different than statically generated passphrases (e.g., traditional personal verification questions, "What is your pet's name") as they can be generated and changed over time (or generated just-in-time), and the user is still able to securely authenticate. Dynamically generated challenge passphrases offer increased security as there is less vulnerability to man-in-the-middle attacks or cybersecurity attacks where an individual's publicly available personal information can be used to answer the question (e.g., person lists the pet's name in his/her social media account).

However, relative to statically generated passphrases, there is an increased technical difficulty in practical implementation as there is no pre-defined and pre-established secret to be relied upon. In particular, the system must be able to generate and validate a challenge response that it has likely never encountered before, and accordingly, there can be difficulty in validating whether the response is indeed correct.

An individual would need to encounter a question that is sufficiently prominent in the individual's memory or experience (e.g., not an outlier) to be able to successfully answer the question without too much difficulty. For example, even when generated with the individual's transaction history, an individual is unlikely to remember specific details of a specific transaction, especially if the transaction is routine or has little prominence (e.g., the price of a paper towel roll). On the other hand, automatically identified patterns or trends can be utilized to improve the chances of a successful answer by a particular individual (e.g., on your recent trip to New York City, what was the major spending category? [live theatre and music]).

Stated differently, not all dynamically generated passphrases are equal. The automated generation and structuring of questions needs to be carefully established to ensure that the questions, while having a high level of flexibility in available data sources and data sets, actually pertain to questions that can be readily answered by the user. As described some various embodiments herein, this technical challenge is addressed using a combination of unsupervised learning-based clustering approaches and feature ranking in significant clusters to improve the relevance of a generated question.

To allow for this balance of flexibility and relevance, the dynamically generated challenge passphrases are implemented using contextual information that can be extracted from patterns of recorded interactions associated with an individual during the course of the individual's interactions.

The recorded interactions can be represented in the form of structured electronic data records, and can be stored in various data repositories. The patterns of recorded interactions are established by proxy, using an unsupervised machine learning model data architecture that is trained to establish data record clusters. The data record clusters can include, for example, clustered unimodal data entries (e.g., transaction records), or, in some embodiments, clustered multimodal data entries (e.g., transaction records along with physical interaction records).

The unsupervised machine learning allows for self-organization via a machine learning data model architecture, generating clusters based on a presence or an absence of commonalities in the various data sets, for example, by mapping various records onto a feature space, and then determining a distance between various members of a cluster, or, in some embodiments, cluster centroids.

Each data record cluster represents a mutually exclusive set of structured data records of the plurality of structured data records, and for a data record cluster having a largest number of structured data records, the feature data fields are ranked based on a determined contribution value of each feature data field relative to the establishing of the data record cluster having the largest number of structured data records.

From the ranked plurality of feature data fields, a first and a second feature data field of the plurality of feature data fields are identified having the two highest determined contribution values, which is then used to generate the dynamic challenge passphrase data object. Either the first or the second feature data field is used to establish a statement string portion, and a remaining one of the the first or the second feature data field is used to establish a question string portion and a correct response string.

The dynamic challenge passphrase data object can be used to validate a challenge response data structure using the correct response string (for example, typing in a correct answer or selecting a correct answer among a set of candidate answers); and the dynamic challenge passphrase data object is automatically generated from one or more data sources such that an individual is not required to establish the dynamic challenge passphrase data object during an initial registration.

A second validation mechanism that can be used separately or in combination with the contextual question generation includes the use of facial feature recognition and tokenization technology operating in combination with machine learning models can be used such that specific facial or auditory characteristics of how an originating script is effectuated can be used to train the machine learning models, which can then be used to validate a video or a particular dynamically generated passphrase by comparing overlapping phonemes or phoneme transitions between the originating script and the dynamically generated passphrase.

In particular, the machine learning models can, for example, be trained to update one or more machine learning models each corresponding to a unit of speech, such as a phoneme or phoneme transition, and then use a representation of the trained machine learning models for future reference comparisons and classifications for authentication.

For example, an initial set of words can be used as a script, such as a sentence or a paragraph from a newspaper article or a book. The set of words will include words requiring the speaking of various phonemes and phoneme transitions, and these may be repeated in some embodiments. For example, a phoneme could be /ŋ/ [eng], and the registration set of words can include multiple uses of the /ŋ/ [eng] sound so that multiple examples can be recorded ("I am enquiring about the singing engagement").

The dynamically generated passphrases can, in a simpler embodiment, be dictionary words chosen based on the available trained machine learning models (e.g., those trained above a threshold of confidence). For example, the word can just be "In another embodiment, the dynamically generated passphrases can also be used to augment security aspects relating to personal verification questions, as described in some embodiments herein (e.g., the dynamically generated passphrase challenges are also based on the user's personal information). For example, /ˈkɪŋ, lfɪʃə r/ (kingfisher) could be the phrase for authenticating against the above example registration, and the video portion corresponding to the phoneme $r_j$ can be used for reference comparison.

The process of generating the passphrases can be adapted for use by computing devices having limited computing resources (e.g., portable devices), including but not limited to computer memory, processing capabilities, and computer storage.

The user first creates the reference models through registration by uploading a video recording the user's spoken words from a script or an extract of a statement, such as a sentence or a paragraph from a newspaper article or a book. The set of words will include words requiring the speaking of various units of sound (e.g., phonemes and phoneme transitions), and these may be repeated in some embodiments.

The system processes and tokenizes the video and applies machine learning models to generate reference tokens (which can be a trained model or parameters of a trained model). The machine learning models can be individualized towards training for a particular unit of sound to distinguish between different users speaking the same unit of sound. For example, a separate machine learning model can be used for each unit of international phonetic alphabet (IPA) that are used for a particular language, such as each of kiofTar.

At a later time that is not necessarily temporally coupled to the registration (e.g., batch or upon encountering a challenge request), the system can generate a set of dynamically generated challenge passphrase candidates where at least one of the reference tokens can be used for comparison.

As described in a contextual question generation embodiment herein, the dynamically generated challenge passphrases can be generated based on the personal information of the individual (e.g., which bank is your mortgage with), and having an answer that requires the saying of one or more particular sound units (e.g., a phoneme or phoneme transition). The one or more particular sound units can be selected from the available models, and if multiple models are available, the system can be biased towards generating challenge passphrases including sound units from models having a higher or highest confidence levels.

When a challenge workflow is initiated, instead of or in combination with presenting a traditional personal verification question for entry, the user uploads a challenge response video that can be used for first identifying the relevant portions associated with the particular sound units for classification analysis, and then comparing the relevant portions with the trained machine learning models (e.g., classifiers) to output an authentication signal that can be based at least on a level of confidence of the user's identity. There can be situations where a user's response might not be accepted due to facial changes (e.g., a facial injury or a palsy), so the system may be configured to invoke fallback options alternate forms of authentication.

In the embodiments described herein, the dynamically generated passphrase(s), when spoken, require an individual to adjust their features (e.g., facial or auditory) to speak a first set of words (i.e., dynamically generated passphrase(s)) including a plurality of phonemes that are captured in audio and/or video.

In an illustrative example, a requesting individual who is not authenticated seeks access to computer resources associated with an authenticated individual (e.g., Tom's bank account). The system controlling access to the computer resources (e.g., a bank server), dynamically generates, requests, or selects a passphrase (e.g., from a dictionary, a book, etc.) having a plurality of phonemes and presents the passphrase to the user (e.g., transmits the passphrase to the requesting individual's device, or displays the passphrase, etc.).

The requesting individual captures a video of themselves speaking the passphrase (e.g., via a mobile phone), and transmits the captured video to the system.

In the contextual question embodiment, the passphrase is not provided to be read, but a statement portion having a question portion can be rendered and similarly, the individual records a video where the individual speaks what the individual believes is the answer.

The system receives the video (e.g., timestamped audio and video track) and extracts features (facial, lips, eyes or otherwise) of the requesting individual saying the plurality of phonemes, and compares the extracted features to reference features of the authenticated individual (e.g., Tom) saying the same plurality of phonemes.

These features are not necessarily comparison values, but can also be identified through the usage of a machine learning model that is adapted to generate auto-encoded features adapted to maximize a distinction between different users of the system. If a comparison of the captured and the reference features passes a threshold (e.g., the features of the requesting individual are sufficiently similar to the reference features of Tom speaking the same plurality of phonemes), the requesting user is authenticated.

The passphrase or the registration script can include, for example, a phonetic pangram (e.g., or a holo-alphabetic sentence). In example embodiments, the set of words may not necessarily be a phoneme pangram and may simply cover multiple phonemes and phoneme transitions. Some of these phonemes and phoneme transitions can be repeated deliberately in the set of words so that additional data points can be obtained. According to some embodiments, the set of words can also be a paragraph, an excerpt from a book, an article, etc.

The features can include facial expressions or characteristics (e.g., eye shape), micro-movements (i.e., movements difficult to see with the human eye), auditory features, and combinations thereof. These features can be extracted from images within the video data, depth image data (e.g., 3-D image data), and facial dot projection mapping data, among others. The features may include facial characteristics including at least one of: lateral and medial position coordinates of both eyes; lateral-position coordinates of lips, a forehead curvature, distances between an ear and the eyes, or a height of nose. For example, a pixel mask can be applied to track these features over multiple frames.

In some embodiments, to avoid deepfake vulnerabilities, the system limits the amount of time available for the requesting individual to provide the requesting data (e.g., the video or the audio recording), requires that the media data is timestamped, or includes embedded location information, etc. This may protect against deepfake generated videos as a video mimicking generative adversarial network (GAN) may require processing time to generate the deepfake whereas the requesting individual can quickly read and recite the dynamic passphrase.

Verification may be based on one or more verification techniques. In example embodiments, the verification may comprise comparing the features extracted from the video of Alice speaking the passphrase, and comparing the features to the same features stored in the reference media data using a Euclidian and cosine distance. A technical benefit of such an implementation may be efficient operation of the system, where the system requires only a few examples of the individual speaking phonemes to complete authentication.

In example embodiments, the system includes a model data architecture trained to predict one or more features of the authenticating individual saying the passphrase, and the predicted features are compared to the features provided by the requesting user. The model data architecture is trained with the reference data serving as positive training examples to adjust one or more transfer functions configured to minimize a loss function related to a false positive, by using the features of the authenticated individual as positive training examples.

The trained model data architecture may be used to predict an expected set of features of the authenticated individual speaking the passphrase, and the predict features may be compared to the features provided in response to the authentication challenge. A technical benefit of this approach can include more accurate verification, as the model is specifically trained based on examples of the authenticated individual. Moreover, new training examples (e.g., successful verifications) can be used to further train the model, and the increased training does not require large amounts of storage as only the weights of the transfer functions are adjusted.

Referring again to tokens, in some embodiments, the authenticated individual's computing device provides the tokens to the challenge interface. In an alternate embodiment, the tokens are stored on an authenticated individual's profile on backend data storage and they are retrieved for comparison. The tokens are encrypted, decrypted, or otherwise processed such that phoneme/speech characteristics in either video or audio (or both) can be compared against those of the authenticated individual. In some embodiments, the comparison is used to establish a confidence level, which if satisfied beyond a threshold, results in the system in provisioning access.

The secure tokens can include digital signatures associated with cryptographic keys of various validating parties. For example, the secure tokens can be processed to determine that the data fields stored thereon are signed by the party associated with a particular public key (e.g., bike share company public key that is accessible on the Internet). The third party computing device can, for example, be configured to compare the signature with the public key after retrieving the public key from an online repository, or in some embodiments, retrieving the public key from local storage (e.g., a bike share kiosk may store the bike share company public key).

In example embodiments, to extract the features from media data, the processors are configured to; using an encoder neural network, compress the data sets into a data subset that represents a constrained set of features identifying an individual. The extraction allows an improved compression ratio to reduce an overall storage and/or downstream processing burden. The determination of which features to retain (even in a transformed state) can be conducted by a specially configured and trained encoder neural network. The constrained set of features identifying an individual can be established to include a minimal set of elements based on the features selected by the encoder neural network.

In some embodiments, the digitally signed token stores thereon a model data architecture trained based on speech motions of the individual speaking one or more passphrases. The model data architecture is adapted to iteratively update, through modifying weight values associated with computing nodes, transfer functions configured to minimize a loss function related to a false positive by using the speech motions of the authenticated individual as positive training examples and using reference speech motions of other individuals as negative training examples. In such examples, the one or more trained transfer functions are used to process and validate the challenge response data set. The speech motions of the individual can be added to a reference speech motion data storage for use as reference speech motions during generation of digitally signed tokens for other individuals.

The third party computing device may process the digitally signed token upon receiving a challenge response data set representative of response images asserted as the individual speaking the passphrase. The third party computing device validates the challenge response data set by validating against the facial representation extracted by the model data architecture to establish that the challenged individual speaking the passphrase satisfies an output of the model data architecture at an acceptable confidence threshold value (e.g., a pre-defined value).

Continuing the model data architecture example, the passphrase can include multiple phonemes; and the model data architecture can, in some variant embodiments, include separate transfer functions, each corresponding to a separate phoneme of the passphrase, and each of the separate transfer functions generates intermediate outputs which are combined together to establish the output of the model data architecture. The speech motions of the individual can be added to a reference speech motion data storage for use as reference speech motions during generation of digitally signed tokens for other individuals.

The features can be represented as a floating point latent vector extracted from the raw image data, or a floating point vector generated from an encoder neural network can be adapted to learn a compression of the raw image data into the floating point latent vector defined by the feature set representing speech motions of the individual. In some embodiments, the encoder neural network is a trained 2D CNN adapted to generate pixel segments on at least one of eyes, nose, and lip corners, trained to recognize people to output the floating point latent vector, and the digitally signed token can further include a plurality of floating point latent vectors, each of the floating point latent vectors trained based on a different mix of feature sets representing speech motions of the individual.

In some embodiments, a different set of features can be used for each phoneme or phoneme transition, and one or more encoders may be utilized to generate these different features (e.g., an encoder assigned to each phoneme or each phoneme transition).

Systems, devices, methods, and computer readable media are provided in various embodiments having regard to authentication using dynamic passphrases, in accordance with various embodiments. The authentication utilizes multiple technologies to implement an improved authentication process where an individual's personal information is encapsulated into transformed digitally signed tokens, which can then be used to generate dynamically generated passphrases for use in future authentication processes.

The digitally signed tokens can include blended characteristics of the individual (e.g., 2D/3D facial representation, speech patterns) that are combined with digital signatures obtained from cryptographic keys (e.g., private keys) associated with corroborating trusted entities (e.g., a government, a bank) or organizations of which the individual purports to be a member of (e.g., a dog-walking service).

In an example embodiment where extracted features include depth data associated with an individuals face, a facial recognition scanner can be provided in the context of a bike sharing or a smart door lock, which takes a picture or a 3D representation of a face of the individual. This picture or the 3D representation is converted into a feature representation. The individual then utilizes the mobile device to adduce the digitally signed token as a "deposit token", which is then received in relation to a challenge request mapping the picture or a 3D representation of a face of the individual against the available characteristics of the digitally signed token. If the device is satisfied that the captured picture or a 3D representation of a face of the individual is corroborated by the available characteristics of the digitally signed token, the device may then provision access (e.g., unlocks a bicycle or unlock a door).

In some embodiments, the system may be used in a system to permit entry to dog walkers. For example, the dog walker may register a reference media data set with a third party dog walking authority. The dog walker subsequently queries a smart home to access the home, and is required to read the dynamically generated passphrase to in front of a camera. The video of the dog walker is processed to extract facial features, and the extracted features are compared with the features in the reference media data set registered with the dog walking authority.

The system to permit entry to dog walkers may be combined with a variety of other related systems. For example, the system may be coupled with an invoice verification system, which checks whether the dog walker was granted access to the house for each billed service. In example embodiments, the system may monitor the home for a second access event (e.g., the dog walker returning the dog), and calculate a payment amount based on the duration between the two events.

In further embodiments, a new token may be generated that tracks when an access was provisioned, and in response to a signal indicating an event at a future time (e.g., when bicycle was returned or a dog was returned), the new token may be used to process a financial transaction in relation to the event (e.g., pay for the bike rental for a duration of time, or pay the individual for walking the dog and returning the dog).

In this respect, before explaining at least one embodiment in detail, it is to be understood that the embodiments are not limited in application to the details of construction and to the arrangements of the components set forth in the following description or illustrated in the drawings. It is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 11 is that 2D facial recognition cannot distinguish similar faces.

FIG. 12 is example key capabilities of a facial recognition system, according to some embodiments.

FIG. 21 is an example neutral network algorithm implemented as part of a facial recognition system, according to some embodiments.

FIG. 27 is an example process for registration using an authenticated individual's mobile phone for facial image processing.

FIG. 28 is an example process for verification at a Point-of-Sale (POS).

FIG. 34 is an example method diagram of an enrollment example, according to some embodiments.

FIG. 35 is an example method diagram of an enhanced enrollment example, according to some embodiments.

FIG. 36 is an example method diagram of a touchless rental bike example, according to some embodiments.

FIG. 55 shows an example reference data set, according to example embodiments.

Figure 56:
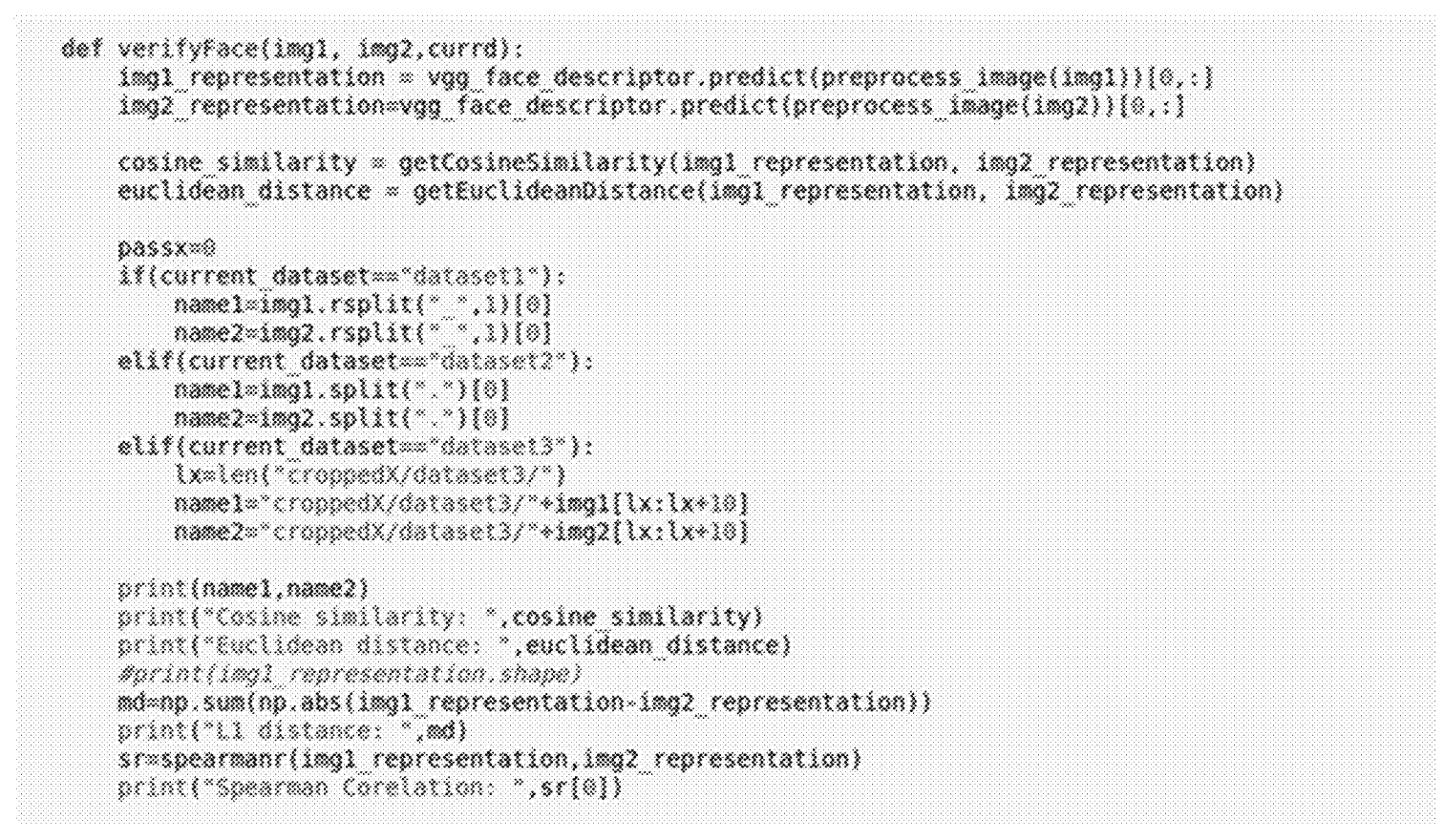

FIG. 56 shows example computer code to determine whether to verify a requesting individual, according to example embodiments.

FIG. 58 is a schematic diagram of system for authenticating a user with a dynamically generated password, according to example embodiments.

FIG. 60 is an illustration showing various facial feature contortions to generate phonemes, according to example embodiments.

FIG. 61 is an example plurality of structured data records, according to example embodiments.

FIGS. 64 and 65 show example computer code to determine rank the plurality of feature data fields based on a determined contribution value of the data record clusters, according to example embodiments.

FIG. 67 shows example computer code to determine a prioritized list of features associated with fitted clusters, according to example embodiments.

FIG. 73 is a method diagram showing an example method for generating dynamic passphrases, according to example embodiments.

DETAILED DESCRIPTION

Figure 1:
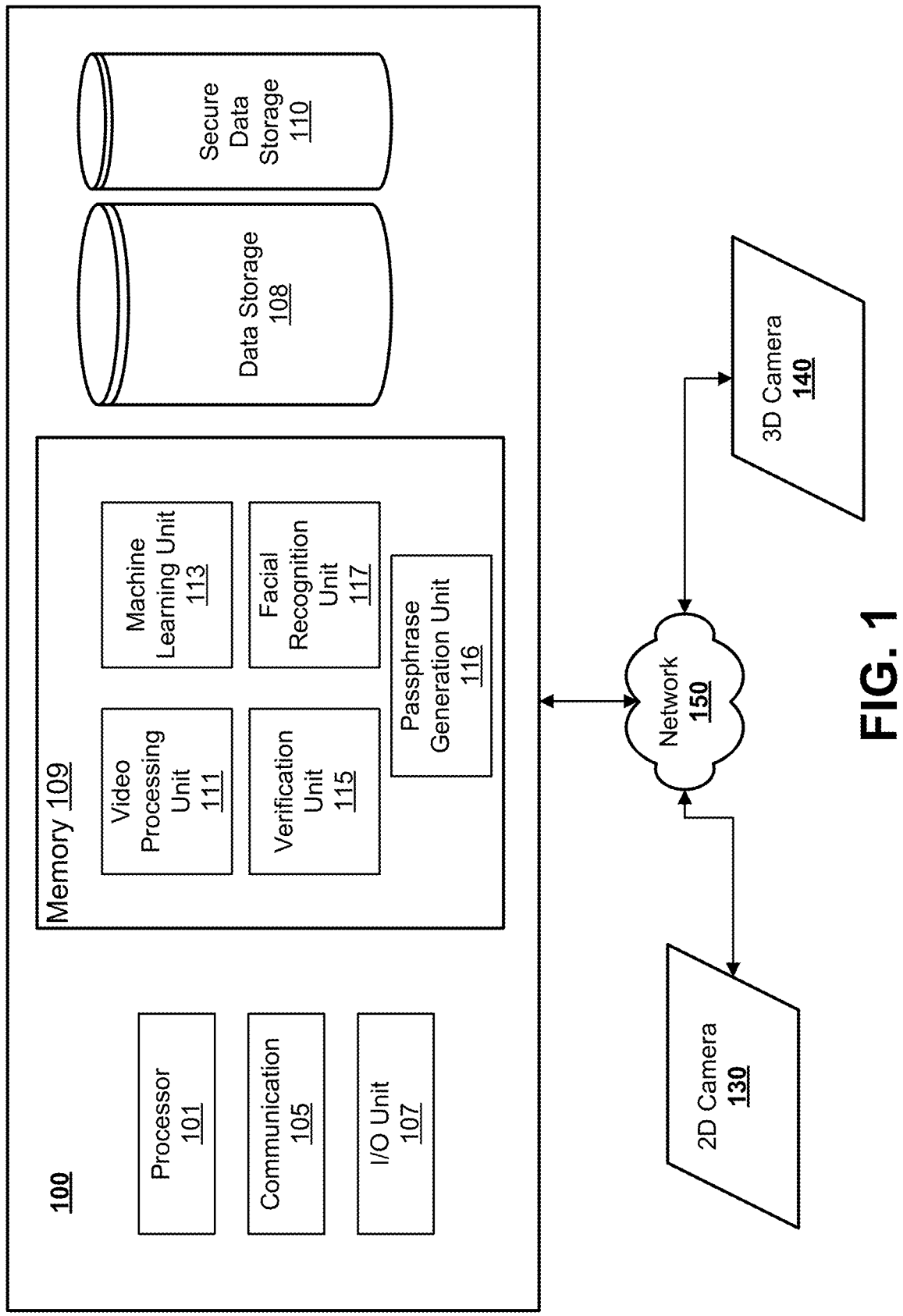
FIG. 1 is an example feature recognition system, in accordance with one embodiment.

Embodiments of methods, systems, and apparatus are described through reference to the drawings.

A technical approach is described herein that is adapted for overcoming some of the challenges associated with technical challenges in verifying credentials.

A system for generating and validating based on dynamically generated challenge passphrases is proposed. Dynamically generated challenge passphrases are different than statically generated passphrases, in that they are more difficult to generate and validate.

Two approaches are described herein, a first approach for automatically generating challenge passphrases based on contextual information obtained from various data sources pertaining to a particular individual, the generated challenge passphrases automatically generated to have a higher level of pertinence for a particular user using unsupervised learning approaches to improve a chance of successful answering by the individual, and a second approach for receiving a recoded video of the individual saying a dynamically generated passphrase and then using facial/lip recognition approaches to validate said video.

The two approaches are combined together in an embodiments, and the contextual challenge passphrase is specifically selected such that the phonemes or phoneme transitions present overlap with phonemes or phoneme transitions that were originally provided in a recorded video of the individual reading a script. The initial reading of a script is used to train one or more machine learning models (e.g., using non-specific models as baselines, and then tune them using the recorded sections of the videos). As the script has a set of known phonemes and phoneme transitions, these can be tokenized and stored for both provisioning corresponding machine learning models (each model corresponding to a specific phoneme or phoneme transition).

If there is at least some overlap in the phonemes or phoneme transitions, two layers of protection can be simultaneously established with the asking of a single question. For example, if a question statement is: "You have an unsecured line of credit that is greater than $100,000. Which bank is it with?, and the answer is "Sang Bank" (sæ ŋ bæ ŋk), the answer is specifically selected because it has two instances of the phoneme ŋ. The video portions of the individual speaking ŋ can then be used for an additional level of comparison to generate a confidence score.

A balance needs to be established between security, convenience of usage, and finite computing resources, and an improved approach is described that allows for the usage of dynamically generated passphrases (referred to in the alternative as a "passphrase") in authentication. In some embodiments, the system is configured to select a dynamic generation/validation approach based on an amount of available computing resources or the quality of stored information (e.g., a confidence or a quality level of contextual information or trained models), the system may be configured to generate either a contextual dynamically generated question or a facial recognition required dynamically generated passphrase.

The system can be used to secure physical or electronic resources, such as door access, access to online resources (e.g., online banking, cloud drives) protected by a challenge mechanism established using at least the dynamically generated passphrases to establish answers that would be readily apparent to an individual.

In the variant embodiment, the system is configured to leverage depth analysis and lip motion analysis to extract features of the requesting individual from a media recording of the requesting individual speaking a dynamically generated passphrase to authenticate the requesting individual. The dynamically generated passphrase may be generated in conjunction with a dynamic verification question, incorporating a second layer of security as the requesting individual is tested both for whether they are able to answer the question correctly, and whether their facial features are similar to a reference set of facial features of an authenticated individual speaking the same phonemes or phoneme transitions in the reference set.

For example, a static passphrase could be a conventional question, such as "What high school did you go attend"? An imposter could monitor the target's social media accounts or other public information and likely be able to obtain this information (or simply use brute force, as there are only a limited number of high schools) and breach this layer of security. Accordingly, static questions, while having some use, are limited in their potential protection as two-factor authentication beyond simple authenticated individual names and passwords.

In contrast, a dynamic passphrase is a passphrase that might not be readily guessed from existing public information or social media accounts, as the passphrase does not need to correspond directly with the original question, or augmented such that even with such information, a malicious user is not able to obtain access. Rather, the requested dynamic passphrase is derived from the original question and can be dynamically generated (in advance and stored in a question bank, or, in some embodiments, generated temporally proximate (or responsive to) an access request).

As an illustrative example, a person could read a set of words relating to a story about the topic "fruits", but the dynamic passphrase could be a question about "birds" and instead of monitoring the answer for correctness in relation to an underlying fact, the answer is broken down into its constituent features and compared against the underlying model features as reference. Accordingly, even if an imposter were able to obtain various information about an authenticated individual, they would not be able to overcome the dynamic passphrase challenge.

For example, the dynamic passphrases, by virtue of their not correspond directly with originally provided information (e.g., the reference data set), and being extrapolated or interpolated automatically by a machine learning data model architecture from the original provided information, provide the technical benefit of being difficult to copy or prepare for in advance. Moreover, the dynamic passphrases may not require storage and collation, reducing the risk that a central repository of passphrases can be compromised, compromising the whole system.

In contrast to a static question, requiring a requesting individual to capture video of themselves saying a dynamically generated passphrase precludes unauthorized parties from completing verification based on the contents of stolen information. From an accessibility perspective, the proposed system may provide increased accessibility to vulnerable users, including individuals who have difficulty remembering archaic static questions is difficult (e.g., the forgetful, or memory impaired persons). Moreover, as the dynamically generated passphrase is difficult to guess ahead of time (compared to static information about the authenticated individual (e.g., birthdays, social security numbers, car purchases, and pet names)), it is difficult for a malicious individual to increase their success through preparation.

In example embodiments, the dynamically generated passphrase(s) may be presented to the user in relation to a verification question and one or more incorrect phrases, with the dynamically generated passphrase being the correct answer to the verification question. By presenting the passphrase as a possible answer to a verification question, the system can decrease the likelihood of a malicious actor being validated by increasing the amount of work that the malicious user has to complete or process in real time (e.g., a bot may need to incorporate decision making aspects in addition to video mimicking capabilities).

The verification question and the dynamically generated passphrase can be based on one or more data objects storing a plurality of structured data records associated with the authenticated individual. For example, the verification question may incorporate or be based on a transaction history within a profile associated with the authenticated individual (e.g., "How many months ago did you spend $100 with your credit card?"), and the passphrase may be set of words that is the correct answer (e.g., "five").

The verification question and the dynamically generated passphrase allow for efficient and user-friendly two-factor authentication—the first factor requiring the captured media data to match a reference media data, and the second factor requiring knowledge of information stored in the profile.

A technical challenge associated with generating verification questions and dynamically generated passphrases is that they should not be related to obscure or trivial actions which an authorized individual may forget. In example embodiments, the proposed system fits the one or more entries in the profile into a plurality of clusters via cluster analysis and generates the verification question based on a prioritized list of features which define the clusters. For example, cluster analysis for banking transactions may determine the plurality of clusters to include spending, payment choice, timing, location, store name, etc. Features of the entries which are grouped into the timing cluster (alternatively referred to as features) may be ranked according to importance using the SHAP method. By generating questions based on the prioritized list of features, the system may increase the likelihood that an authenticated user will recall the subject matter of the question. For example, instead of asking an obscure question such as "When did you purchase gum?" where/when gum was purchased does not have a large influence on the cluster groups formed, the system may ask "Where do you usually purchase gum"? Indicative of the increased importance of the name of the retailer in fitting the clusters.

A further technical challenge associated with generating verification questions and dynamically generated passphrases is that the entries may be limited, reducing the amount of unique questions that may be asked. In example embodiments, the verification question is a fill in the blank question (e.g., "Yesterday, you shopped at to purchase an article of clothing"), which may have blanks within the question that vary each time the question is generated (e.g., "Yesterday you shopped at Walmart to purchase_").

Another technical challenge associated with generating verification questions and dynamically generated passphrases is that the questions should, similar to the passphrases, be dynamically selected or generated. In example embodiments, the proposed system includes one or more natural language processing (NLP) type neural networks, which are trained based on an example set of questions to generate new question based on the one or more entries in the profile.

For example, the NLP may learn to generate intelligible questions based on one or more entries related to amounts loaned to an individual (e.g., "When did you refinance your home?").

In example embodiments, the set of words that constitute the passphrases, or passphrases and verification questions, are generated to satisfy a readability threshold. For example, the system may be set to generate passphrases and verification questions between a $9^{th}$ and $11^{th}$ grade level to mimic a newspaper, or levels that are responsive to the population expected to interact with the system.

In example embodiments, the system may be set to generate passphrases and verification questions that satisfy a readability threshold associated with the expected authenticated individual. For example, the authenticated individual may be a child (e.g., a child seeking to use their credit card), and as a result the generate passphrases and verification questions may be required to satisfy a readability threshold specific to the child (e.g., fifth grade level).

In example embodiments, the generated passphrases and verification questions must satisfy a readability threshold sensitive to a detected cultural feature associated with the authenticated user. For example, where the reference media data indicates that the individual is from a culture that does not produce particular phonemes, words including those phonemes may be avoided. Alternatively, the culturally variable phoneme may be given a reduced weight in determining authentication.

In example embodiments, the set of words that constitute the passphrases, or passphrases and verification questions, are generated to satisfy an accessibility metric. For example, words that are difficult for dyslexics to produce may be avoided. Similarly, sets of words that exacerbate a stutter or other speech disorders (e.g., long words, words that have repeating phonemes, etc.) may be avoided.

The reference media data including the features (facial or auditory) of the authenticated individual saying the plurality of phonemes may be stored as a secured token(s). The token may be secured because of being signed by a private key of a trusted entity (e.g., a bank, government, etc.), with subsequent recipients of the reference media data set being able to verify that, the token is a secured copy of the reference media data with an available public key of the trusted entity. In a further embodiment, the tokens can also include additional features, including, for example, phoneme transition information, facial expression shifts between phonemes, lip movements, among others, extracted from the reference media data. These tokens are stored for future usage for authentication (e.g., as a factor for two or more factor authentication).

In an illustrative example of generating secured tokens:

Alice captures and provides a video of her reading a set of words (e.g., a phoneme pangram): "That quick beige fox jumped in the air over each thin dog. Look out, I shout, for he's foiled you again, creating chaos" to a trusted entity. The set of words may be provided by Alice in a physical location associated with the trusted entity, after Alice has provided identification (e.g., a passport, etc.).

Alice's video (i.e., the reference media data) is received by the trusted entity, which may be the computer system controlling access to the computing resources. The computer system includes a neural network for tokenizing media data, and Alice's video is converted into a feature set (e.g., using optional encoder compression with an autoencoder), with the features corresponding to Alice saying the set of words tokenized into elements (e.g., phonemes, phoneme transitions, syllables). The neural network may use the video to train one or more transfer functions therein (e.g., for each token or transition) to predict whether image, video, or audio data contains Alice (as opposed to another individual) saying the particular phoneme, phoneme transition, or syllable. In an embodiment, the neural network is originally a baseline neural network that is then trained individually for each authenticated individual (e.g., customized using the reading of the set of words one or more times, for example, until a threshold accuracy or confidence level is reached).

Subsequently, the trusted entity (e.g., via a branch manager) signs the tokenized reference media data with a private key associated with the trusted entity, generating the secured token(s). Signing the tokenized reference media data may ensure that it cannot be practically accessed without the private key of the trusted individual, or cannot be modified without the private key, and can be readily verified with a public key corresponding to the private key. The secured tokens may be subsequently transmitted back to Alice's mobile device for her to use with other cooperating authenticators or retailers.

Alice may subsequently use the secured token on her mobile device to access computing resources. Continuing the example:

Alice presents the secured token to an access control device (an automated teller machine (ATM)). The access control device, in response to verifying that the secured token was signed by the trusted entity, generates or selects a passphrase, and uses the passphrase in an authentication challenge (e.g., "Please say the word: Kingfisher'").

Alice then provides a video of her saying: "Kingfisher". Each of the tokenized parts of the "Kingfisher" are compared against the neural network parameters stored in the secured token and the system determines that it is 99.8% confident that the video is of Alice saying the "Kingfisher" based on her facial features.

Alice is given access to her bank account.

The passphrase authentication challenge may be required in response to the computer system controlling access to the one or more resources (e.g., a bank authentication system or online banking), monitoring access logs for access attempts be indicative of a level of suspicion (e.g., authenticated individual has never accessed from IP address in this geographic region before, and it is far away from the authenticated individual's address). Accordingly, an authentication challenge can be instantiated on an authenticated individual interface (e.g., ATM window, online banking interface).

The authentication challenge can be generated by a backend computing device for rendering on the authenticated individual's personal device (e.g., a mobile phone), or on a display connected to the backend computing device (e.g., an automated teller machine (ATM), or point of sale (POS) terminal), or the phrase can be generated on the respective devices. The backend computing device can be a separate authentication challenge generation server that resides in a data center, for example.

A further technical limitation that may be overcome includes, the lack of portability or the difficulty in implementing traditional authentication systems with the use of secured tokens including, the reference data used for comparison of a requesting individual's features when speaking the phonemes. For example, instead of a centralized location including all the authentication information of the individual, the requesting individual may be required to store their own reference data as a secured token, digitally signed by a trusted party so that it cannot be changed. In this way, the system does not require large amounts of storage for the reference data, nor complicated network architectures to control access to said information, as the user can be responsible for carrying their own reference data.

In another scenario, the authentication via dynamic passphrase is not a substitute for, but rather, an additional layer of security. For example, authentication via a dynamic passphrase may be used in conjunction with username/password authentication, and other types of authentication.

FIG. 1 is a schematic block diagram of a physical environment for a system 100 for facial recognition.

The computer system 100 is used for authenticating a requesting individual to access one or more computer resources. System 100 may be purpose specific software (e.g., code segments compiled into machine code), hardware, embedded firmware, or a combination of software and hardware, according to various embodiments.

System 100 is configured to receive or store one or more data sets (alternatively referred to as media data sets) representative of an individual speaking words. The data sets may be received in furtherance of a user registering to use the system 100, or in the alternative the data sets may be received in furtherance of authenticating a requesting user The data sets may be data reflective of images, audio recordings, or videos, taken by a two dimensional (2D) camera 130 or a three dimensional (3D) camera 140. The images may be received from the 3D camera 140 and the 2D camera 130 via network 150, or 3D camera 140 and 2D camera 130 may be integrated into system 100. The 3D camera 140 may be configured to record images or videos with a depth component. In some embodiments, a pixel in a 2D image may be represented as a data set containing three values, respectively, red, green and blue (RGB). In some embodiments, a pixel in a 3D image may be represented as a data set containing RGB values, and further containing a value representing a depth component. A depth component may, in some embodiments, refer to information regarding a depth of a pixel, for one or more pixels of an image, and for some or all images of a video. In some embodiments, a depth component may also be a value representing a distance of the points on the object being filed or photographed from the camera aperture.

The media data can include a series of frames (e.g., a video), which capture visible facial features of an individual, and over a period of time facial features can be extracted from the media data to capture facial (e.g., lip) movements in relation to individual phonemes of a spoken word. For example, the video data may capture the lip movements of an individual when saying the word "patent", which includes the individual's lip movements to speak each of the phonemes present in "patent".

A processor or processing device 101 can execute instructions stored in memory 109 to configure or implement various components or units 111, 113, 115, 117. In example embodiments, each of units 111, 113, 115, 117 are contained on separate processors. The processing device 101 can, for example, be microprocessors or microcontrollers, a digital signal processing (DSP) processor, an integrated circuit, a field programmable gate array (FPGA), a reconfigurable processor, or any combination thereof. In a variant embodiment, the system 100 can be implemented using special purpose computing hardware and be adapted as a computing appliance adapted specifically for generating and interacting with dynamically generated passphrases.

Communication interface 105, of which there may be a plurality, enables the system 100 to communicate with other components, exchange data with other components, access, and connect to network resources, serve applications, and perform other computing applications by connecting to a network or multiple networks (e.g., network 150) capable of carrying data.

Each I/O unit 107 enables the system 100 to interconnect with one or more input devices, such as a keyboard, mouse, camera, touch screen, and a microphone, or with one or more output devices such as a display screen and a speaker.

Data storage 108 can be, for example, one or more NAND flash memory modules of suitable capacity, or may be one or more persistent computer storage devices, such as a hard disk drive, a solid-state drive, and the like. In some embodiments, data storage 108 comprises a secure data warehouse configured to host authenticated individual profile data.

In example embodiments, the data storage 108 is located on a computing device separate processor 101 or memory 109, the includes a plurality of structured data records associated with an individual, each structured data record of the plurality of structured data records including at least a plurality of data values corresponding to a feature data field of a plurality of feature data fields.

For example, a structured data record can include a record of a credit card or other types of transactions, and the feature data field can store a value having data associated with the transaction, such as the amount, the instrument used to pay (e.g., a particular credit card), and the data value can be reflective of the feature used in the particular transaction (e.g., $100, a credit card). In example embodiments, the structured data record can include a record of a interaction between an individual and various channels of the organization, such as an advice center (e.g., investment advice centers), the branch locations (e.g., interactions an individual has at a banking branch, such as withdrawing money, setting up accounts, or any action which requires access to a customers account), mobile or online platforms.

Memory 109 may include a suitable combination of computer memory.

The video processing unit 111 is configured to record raw image and audio data captured by 2D camera 130 or 3D camera 140. In example embodiments, as described herein, the video processing unit 111 may validate (e.g., validation as described in step two of FIG. 3) the captured raw image and audio data.

The machine-learning unit 113, may be configured to train one or more machine learning models during registration of an individual in to system 100. The machine learning unit 113 trains the one or more machine learning models with the one or more data sets (in the present example, alternatively referred to as registering data) processed by the video processing unit 111, wherein the registering data represents the registering individual speaking a sets of words. The one or more machine learning models are trained to extract one or more features of the registering individual from the registering data, the one or more features representing the state (e.g., a facial expression or feature, an auditory feature, etc.) of said individual while speaking phonemes present in the set of words.

For example, where the registration data is approved to be used as a reference media data set (e.g., by an entity which will be relying upon the reference media data set), the machine-learning unit 113 is configured to train the models for extracting specifically the registering individual's lip movements or lip movement characteristics when the registering individual is speaking the one or more phonemes. In some embodiments, a facial recognition unit 117 may be used by machine-learning unit 113 to locate and recognize features of the registering individual's face in an image or video.

Examples of phonemes with which features of the registering individual can be associated include: IPA (international phonetic alphabet) phonemes, of which there are 44 in the English language (e.g., vowels, front, near-front, central, near-back, back, close, near-close, close-mid, mid, open-mid, near-open, open, consonants, nasal, plosive, labial, labiodental, dental, alveolar, post-alveolar, retroflex, palatal, velar, uvular, approximant, lateral-approximant). In this example, it is noted that lip reading may be as unique as a fingerprint—and allows for distinguishing between legitimate and illegitimate access. The set of words spoken by the individual during the course of registration may be dynamically generated, as described herein.

In example embodiments, the one or more machine learning models being trained are at least to some degree pre-trained or preconfigured. For example, the one or more machine learning models may be pre-trained on a large training corpus, and subsequent training by the machine learning unit 113 may further tune the constituent parameters of the machine learning models for extracting the specific features of the registering individual. In some embodiments, unit 113 may operate machine learning model implementing deep learning techniques.

In example embodiments, the trained one or more machine learning models are digitally signed by machine learning unit 113, preventing changes to the trained one or more machine learning models (e.g., alternatively referred to as a secured token). In example embodiments, the extracted features associated with the one or more phonemes alternatively referred to as tokens (each feature being separate token), and the machine learning unit 113 digitally signs the tokens to generate secured tokens.

A verification unit 115 may be configured to, for example during a verification method, receive processed images and videos (referred to in this example as the request data) from video processing unit 111 of an individual requesting access to one or more computing resources associated with an authenticated individual, and verify whether the registering individual should be granted said access. In example embodiments, verification unit 115 determines whether features of the requesting individual present in the request data are sufficiently similar to features of the authenticated individual represented in the reference media data.

A verification unit 115 may in some embodiments be configured to detect if a person present in the image or video at the time of image or video capturing is an actual person, or a fake person. For example, the facial recognition unit 117 may check for an image or video quality based on captured data using one or more algorithms.

In some embodiments, verification unit 115 may retrieve stored data (e.g., reference media data generated by machine learning unit 113 stored on a data storage 108) from a corresponding authenticated individual profile, and use the stored data to determine if a requesting individual represented in the request data is the same as the authenticated individual.

The stored data may relate to one or more biometric features of the authenticated individual associated with the corresponding authenticated individual profile. The one or more biometric features may include, for example, an authenticated individual's facial movement such as lip movements, eye shape, or any feature (e.g., facial or auditory) which changes in response to the authenticated individual speaking one or more phonemes.

The facial movements (e.g., micro movements) can be tracked at the phoneme-by-phoneme level (or transitions between phonemes), represented as a particular vector encompassing change in the facial movement during the course of speaking the following.

The passphrase generation unit 116 may be configured to, during verification, dynamically generate one or more passphrases to be spoken by the requesting user in the request data. The dynamically generated one or more passphrases require the requesting user to speak one or more phenomes present in the reference media data, and is different for each verification. Accordingly, rather than comparing against a static passphrase, the dynamically generated passphrase is generated using, for example, a dictionary of words which are selected having a subset of specific phonemes or phoneme transitions that the secure token is adapted for. Accordingly, a malicious authenticated individual cannot use advance knowledge of the passphrase in attempting to overcome the system (because advance knowledge of the passphrase is much less likely as it is dynamically generated in this example).

The dynamically generated one or more registration phrases may include a set of words which captures all phonemes and/or phoneme transitions, or may be an incomplete set of phonemes (does not necessarily need to be a phonetic pangram). The dynamic passphrase can be generated or selected from a dictionary constrained to only words that have some combination of the phonemes or phoneme transitions present in the words used to generate the reference data set.

Compared to static passphrases, the system requires additional programming complexity and storage requirements for the tokens. However, the technical improvement is that the system is more robust and utilizes the extracted features provide a technical solution to address the weaknesses of static passphrases, namely that they are vulnerable to malicious authenticated individuals who may have other means to access information about the authenticated individual (e.g., birthdays, social security numbers, car purchases, pet names).

Furthermore, an authenticated individual does not need to remember personal verification questions, and there may be advantages for the elderly or the forgetful. As the passphrase is difficult to guess ahead of time, a malicious actor cannot prepare for the phrase by simply accessing a database of personal information.

According to some example embodiments, the passphrase generation unit 116 generates passphrases based on a readability threshold. For example, the passphrase generation unit 116 may be configured to generate passphrases that require a reading ability similar to a newspaper. In example embodiments, the readability threshold is based on the specific authenticated individual. For example, where the authenticated individual is a child in grade five, the passphrase generation unit 116 may only generate passphrases, which require a grade five reading ability to be read.

Similarly, according to some embodiments, for example, the passphrase generation unit 116 generates passphrases based on an accessibility metric. The accessibility metric may for example be associated with the ability of certain subsets of users to pronounce words. For example, the passphrase generation unit 116 may be configured to avoid passphrases including words commonly mispronounced by dyslexic individuals. This can avoid the technical challenge associated with training machine learning models specifically for small subsets of the population that can have sparse amounts of training examples.

In some embodiments, system 100 may include an API unit (not illustrated) configured for providing or facilitating an interface, such as a user interface, to connect to external databases and systems. The interface may allow one or more administrators and trusted individuals to configure the settings of system 100, such as for example, the quality of an image or video (e.g., at 1080p or 2064p).

In operation, the system 100, a registering individual reads a set of words and provides audio and/or video received by video processing unit 111, and video of the set of words being read is used by machine learning unit 113 to automatically train a model data architecture stored on data storage 108 for feature extraction to correlate features relating to facial recognition by facial recognition unit 117 of the registering individual with the phonemes present in the set of words. In some embodiments, auditory features can also be tracked.

These feature—phoneme correlations (alternatively referred to as a reference data set) can be stored as secure tokens indicating their verification by a trusted entity. The features can be stored, on a higher security data repository 109 after extraction, in some embodiments, or in further embodiments, be stored directly on secured storage media coupled to the user's device.

A set of words for registration can include a phonetic pangram (e.g., or a holo-alphabetic sentence, or other passages) which include phonemes or phoneme transitions present in or required to build the reference data set. For example, the trusted individual may only digitally sign reference data sets including a specific amount of examples of the individual saying the phonemes.

The video processing unit 111 may access the video, and automatically identify the phonemes present in the images using a phoneme classifier based on mouth shape, sound, expected sequence of words (as the sequence of the registration script is known a priori). These identified phonemes can be tracked using timestamps or time durations (e.g., 0.03 s-0.05 s, the /eng/sound was made, which then transitioned at 0.05-0.06 s to a ʃ sound).

The machine learning unit 113 can be configured to generate secure tokens that secure tokens represent specific speech characteristics that can be extracted from the registration set of words, including, for example, facial expressions, micro-movements, auditory features, and combinations thereof. These features can be extracted from image data, depth image data (e.g., 3-D image data), and facial dot projection mapping data, among others. The secure tokens can be digitally signed tokens that incorporate data sets whereby the extracted features represent biometric verification credentials. In a further embodiment, the tokens can also include additional layers of detail, including, for example, phoneme transition information, facial expression shifts between phonemes, lip movements, among others. These tokens are stored for future usage for authentication (e.g., as a factor for two or more factor authentication).

During future authentication (e.g., at a bank authentication system or online banking), the system's monitored access logs showing access attempts may be indicative of a level of suspicion (e.g., authenticated individual has never accessed from IP address in this geographic region before, and it is far away from the authenticated individual's address). Accordingly, a challenge request can be instantiated on an authenticated individual interface (e.g., ATM window, online banking interface).

To complete authentication, a requesting individual is required to provide a video of themselves speaking the dynamically generated passphrase. The model data architecture extracts features from the provided passphrase video, and determines whether the features in the passphrase video match the features of the authenticated individual that are associated with the phonemes present in the passphrase.

Figure 26:
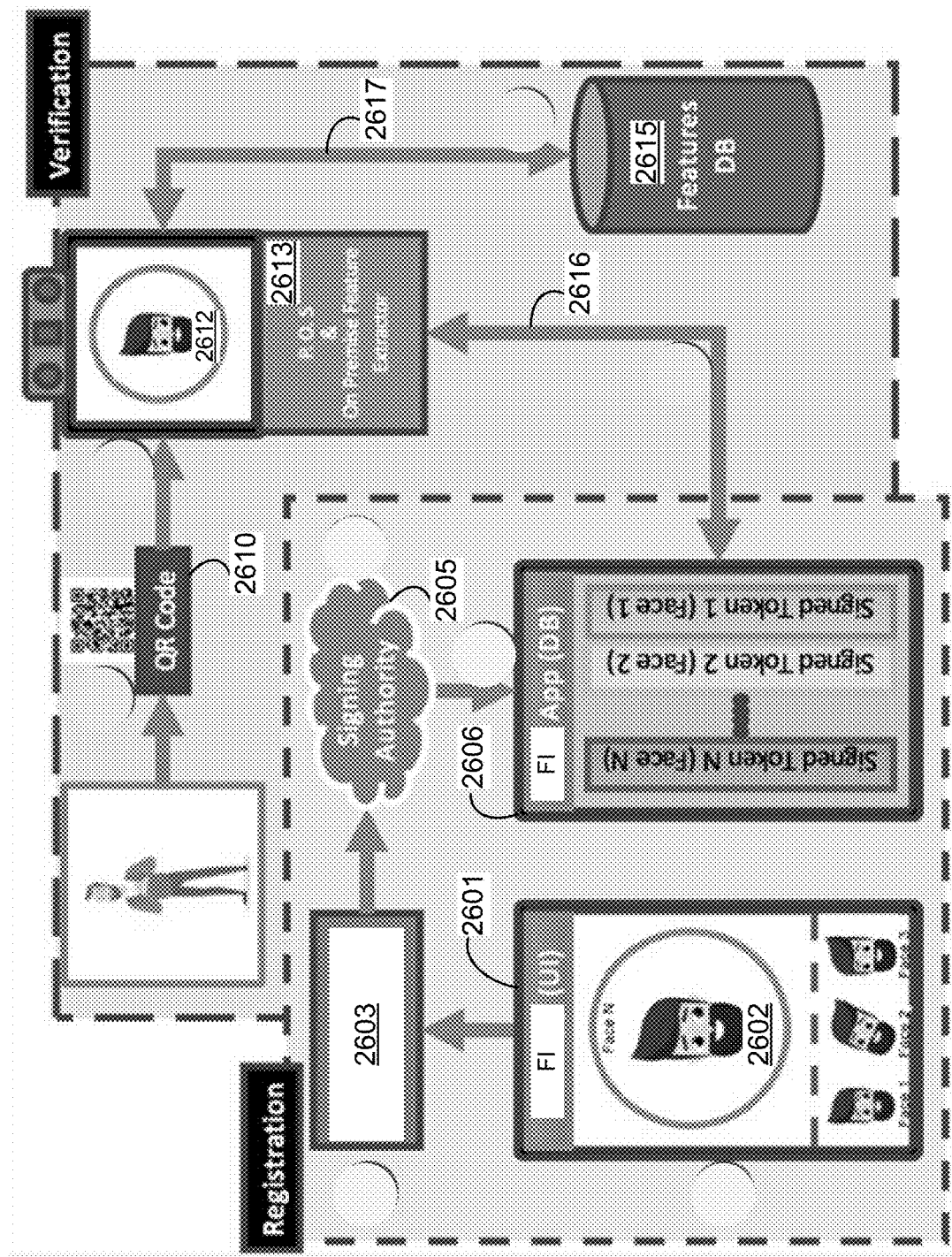
FIG. 26 is an example block diagram representing a system architecture for registration and verification process using facial image processing.

Referring now to FIG. 26, which shows an example block diagram representing a system architecture for registration and verification process using facial image processing. A portable electronic device 2601, such as a mobile device or a laptop, may have a camera 2602, which may take a picture or a video of a person. A neural network model 2603, implemented by a processor on the mobile device, may receive the one or more images or videos, and process them, for example in accordance with a process illustrated in FIG. 27, to generate one or more signed tokens signed by a signing authority 2605. The one or more signed tokens may be stored in a database 2606 on the mobile device 2601.

During verification process, which is further disclosed herein in association with FIG. 28, an authenticated individual may scan a QR code or a bar code 2610 using his mobile device 2601, to associate his phone with a POS. The POS 2613 may has a camera 2612 to take image or video of the authenticated individual. The POS 2613 may contain a model similar to the model 2603 stored on authenticated individual's mobile device, to process the image or video, to generate one or more tokens, which can be sent via a network connection 2616 to either the database 2606 on authenticated individual's mobile device, if the mobile device is available, to authenticate the authenticated individual. If the authenticated individual's mobile device is not available, the POS 2613 can send the token via a network connection 2617 to a remote features database 2615 to authenticate the authenticated individual.

The neutral network model 2603 may in some embodiments output a 256 bit floating point latent vector. The model 2603 may learn to represent facial features namely eyes, nose, mouth in a lower dimension. For example, it may be a machine learning based system that looks at a picture, or a frame of a video, processes it to determine that the picture contains a face, and identify the facial features. Training of the model may require large amounts of data. The training process teaches the model 2603 to generate a meaningful vector, which may be 256 floating point numbers that reduce a higher dimension (e.g., 256×256×3) image to a lower dimension (256).

In some embodiments, the neutral network model 2603 may include a first neural network model, which may be a Multi-Task Convolution Neural Net (MTCNN), this model can detect the human faces in an image, even if the image is blurred. The model can determine the location (x, y coordinates) of the pixels if various facial features such as eyes, lips, nose and ears. This data output may augments the entire face analysis and is added to a second neural network.

The MTCNN can include a model data architecture for face detection, implemented, for example, in Tensor-Flown™. The detector can return a list of JSON objects, where each object contains three main keys: 'box', 'confidence' and 'key points': bounding box is formatted as [x, y, width, height] under the key 'box'; confidence is the probability for a bounding box to be matching a face; and key points can be formatted into a JSON object with the keys 'left_eye', 'right_eye', 'nose', 'mouth_left', 'mouth_right'. Each key point is identified by a pixel position (x, y).

A convolutional neural network (e.g., VGG-19) can be used that is pre-trained on more than a million images from the ImageNet database. The example network VGG-19 is 19 layers deep and can classify images into 1000 object categories. Data sets can be obtained, for example, using available data sets, such as labelled faces in the wild (13,000 images from 1680 people, JAFF with emotions, and Lip-FaceID™ for faces with different pose variations).

The approach can include: preprocessing images from the public data sets, by cropping the face area from the image; invoking MTCNN to detect the face from an image; and using VGG 19 model to get feature representation from an image.

After faces are detected, each image is compared with all other images in the data set, determining similarity matching between faces by using Euclidian and cosine distances, or optionally L1 distance, Spearman correlation.

GPU processors can be used to provide parallel processing for all datasets tested. Model metrics can be determined as follows: true positive, true negative, false positive, false negative, precision, recall, Matthews Correlation Coefficient, F1, F2, F0.5 scores.

Model 2603 may include a second neural network. The second neural network may be, for example, a trained 2D CNN (e.g. SA-SC) to generate pixel segments on eyes, nose, and lip corners. That is, knowledge in the form of data output from the first neural network (e.g. MTCNN) may be fed into a second neural network SA-SC. In addition, the 2D CNN may be trained in parallel to recognize people. The second model may output a 256-bit vector.

The model may process one or more, likely a plurality of dimensions (e.g. distances) in a human face contained in the image. The model may select a number of distances (e.g. 256) to figure out how to compute and generate a vector. The model 2603 may be trained to look at the picture, and decide what are the eyes and nose, and generate distance between the eyes and nose. The model 2603 may then compute all the distances to generate the vector (token). Lighting and other factors may affect the vector. The model may create several vectors describing the face. That is, a face may have several different vectors and tokens.

In some embodiments, the model 2603 may have a size suitable for storing on a mobile device. For example, it may has a size of 80 MB.

Figure 29A:
FIG. 29A is example pictures containing human faces used to train a neural network model.

FIG. 29A shows example pictures containing human faces used to train a neural network model, either by the first neural network model or the second neural network model. Training deep learning models to learn to extract meaningful features from 2D and 3D facial images can be done using MegaFaces™. The number of unique authenticated individuals may be for example 16,540 and the number of data points maybe for example 694,771.

Figure 29B:
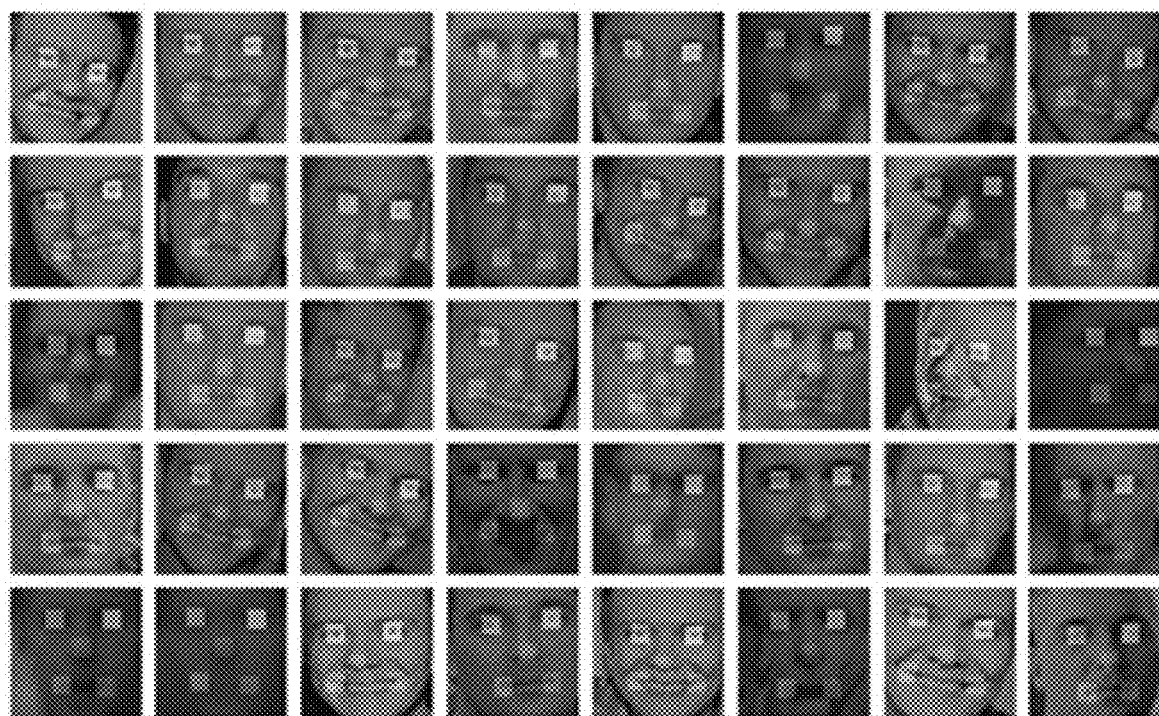
FIG. 29B is example segmentation results from the neural network model in FIG. 29A.

FIG. 29B shows example segmentation results from the neural network model in FIG. 29A. The five colors are in the images used as the target. The mask is shown exaggeratedly superimposed on the actual face images for clarity. The x, y coordinates of the facial features in the mask is provided by a first neural network model MTCNN.

Figure 30:
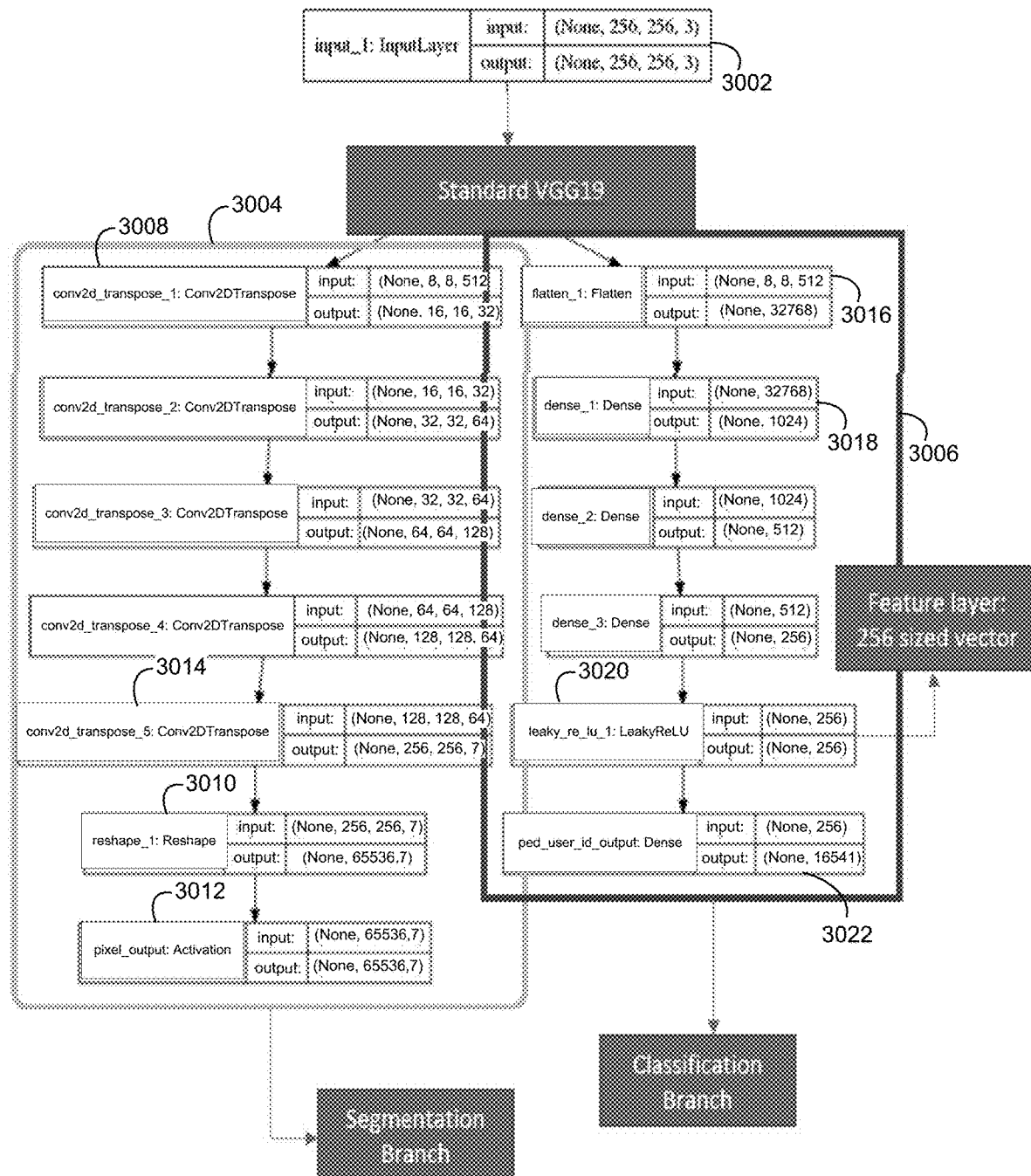
FIG. 30 is an example neural network model used for segmentation and classification of facial images.

FIG. 30 shows an example neural network model used for segmentation and classification of facial images. For example, this may be a VGG19 based segmentation and classification (VGG-SC) model. As illustrated, the input may be a 256×256×3 image, and the output may be a 256-bit vector (feature layer) during the classification branch, which may be a token available for signing.

Figure 31A:
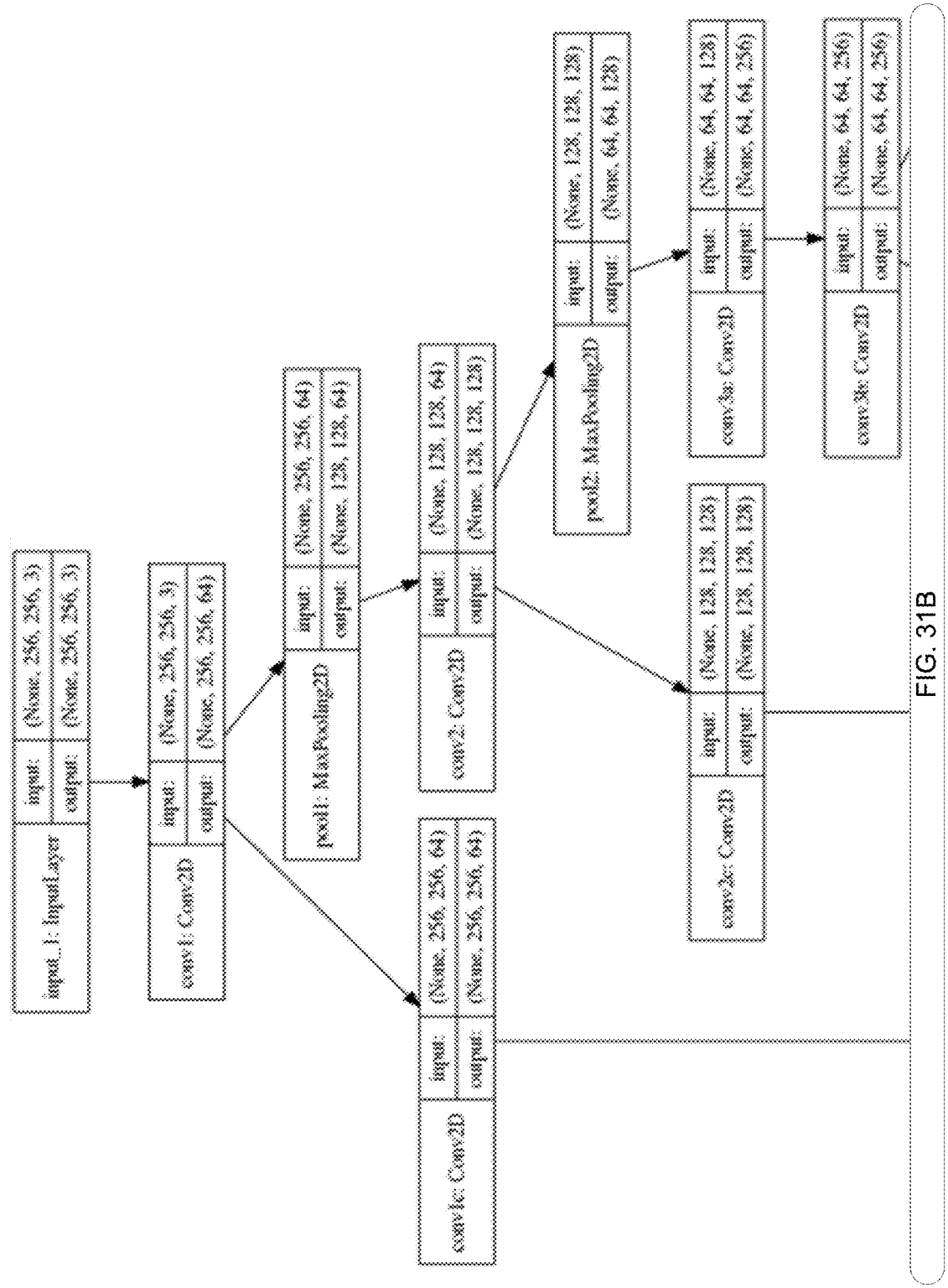
FIGS. 31A, 31B, and 31C are examples of neural network models used for segmentation and classification of facial images.
Figure 31B:
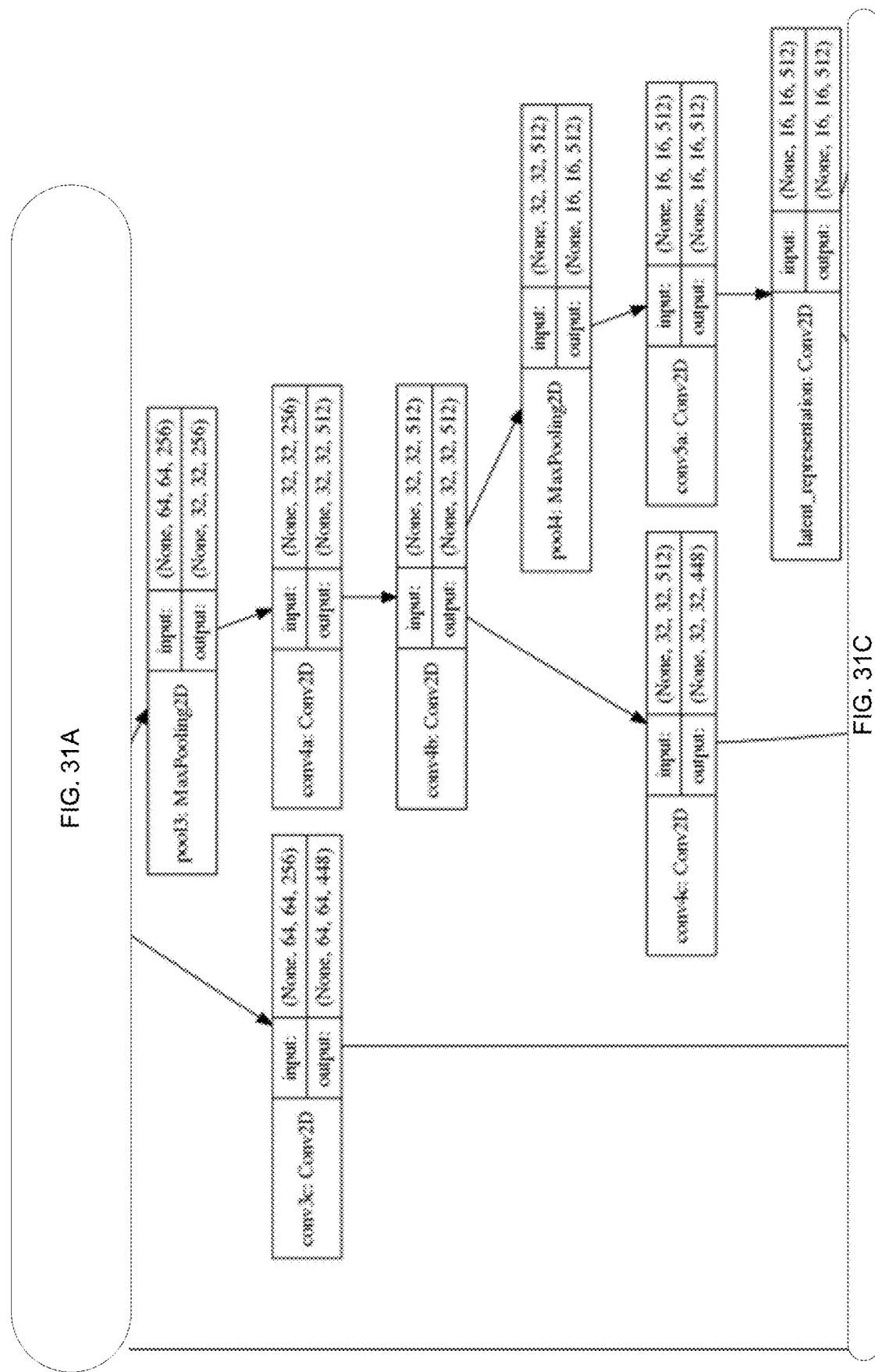
Figure 31C:
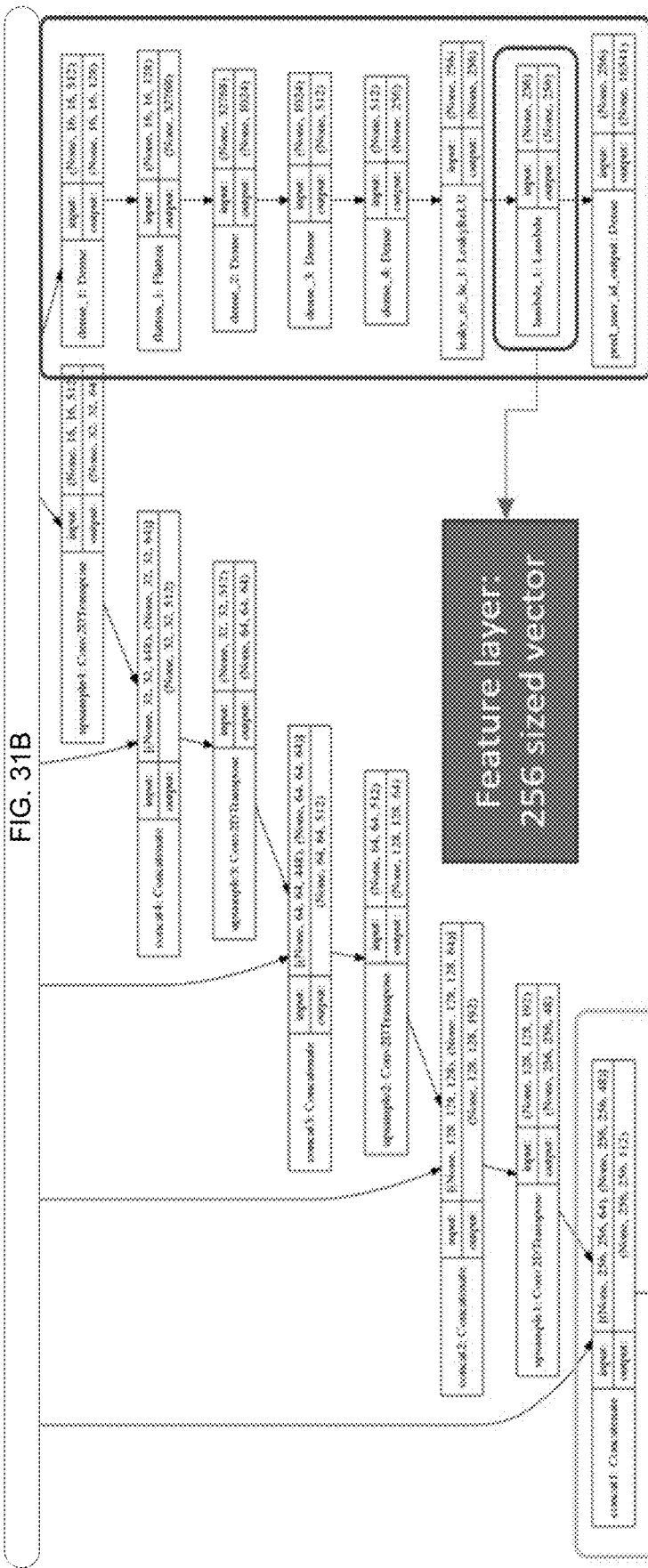

FIGS. 31A, 31B, and 31C show another example neural network model used for segmentation and classification of facial images. For example, this may be Skip auto encoder based segmentation and classification (SA-SC) model.

Figure 32:
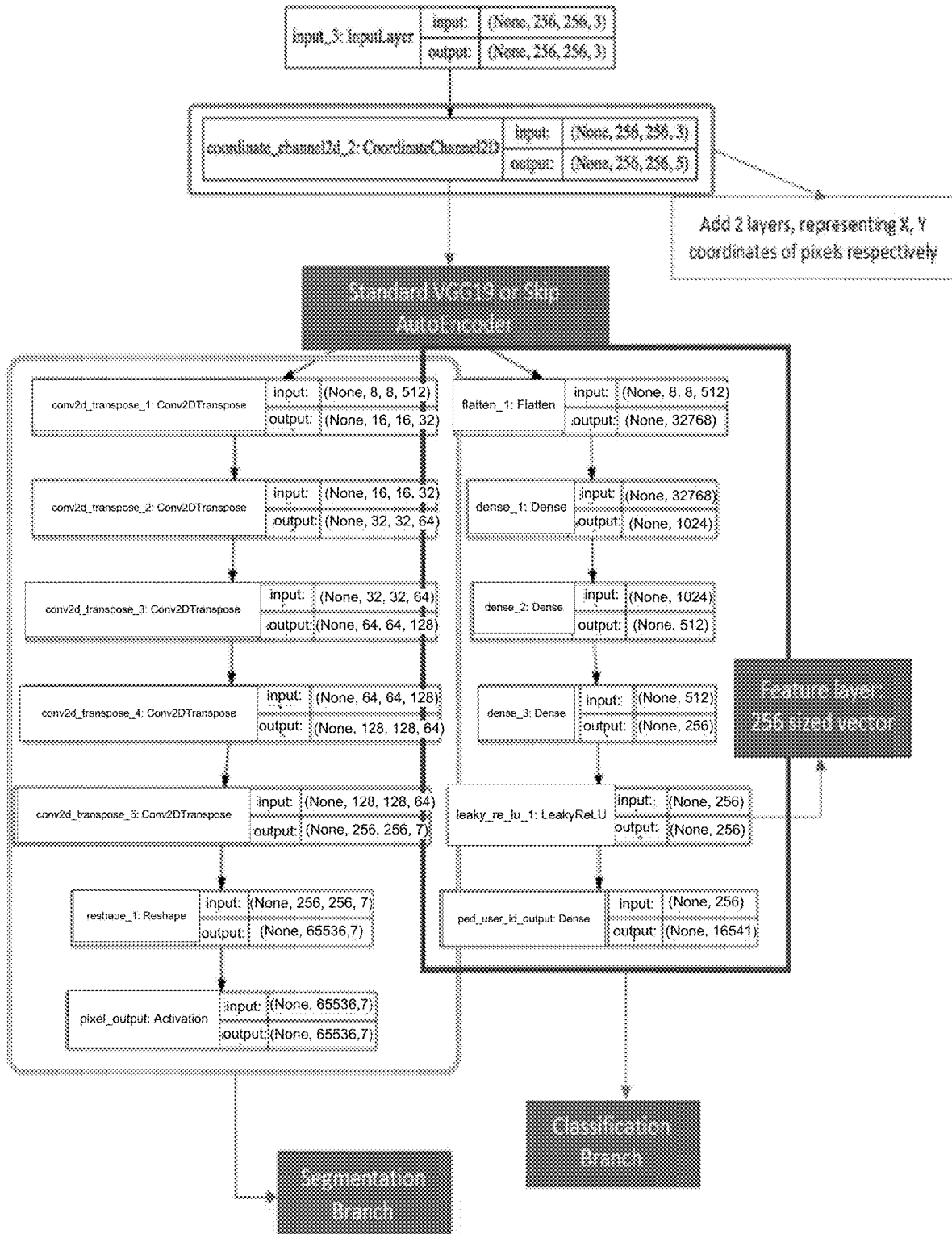
FIG. 32 is yet another example neural network model used for segmentation and classification of facial images.

FIG. 32 shows yet another example neural network model used for segmentation and classification of facial images. For example, this may be a VGG-SC and SA-SC model with additional input of coordinate map. The initial input may be an image of size 256×256×3. Once the segmentation branch has generated x, y location coordinates of various face features (e.g., eyes, nose, lips, ears and so on), the coordinates may be fed into the standard VGG19 or Skip Autoencoder model as a second input, which can be used to, during the classification branch, generate the 256-bit vector, also referred to as a feature token or simply a token. This token may be sent for signing to a signing authority.

Segmentation branch reduces the categorical cross entropy loss (Ls) while converting data points from RGB domain to one-hot pixel domain. Classification branch reduces the SoftMax loss (Lc) while learning features to recognize faces. So a total loss (L)=Ls+Lc. The model may focus on letting the model learn more from important facial features and enhance the distance of distribution between various persons.

Figure 33:
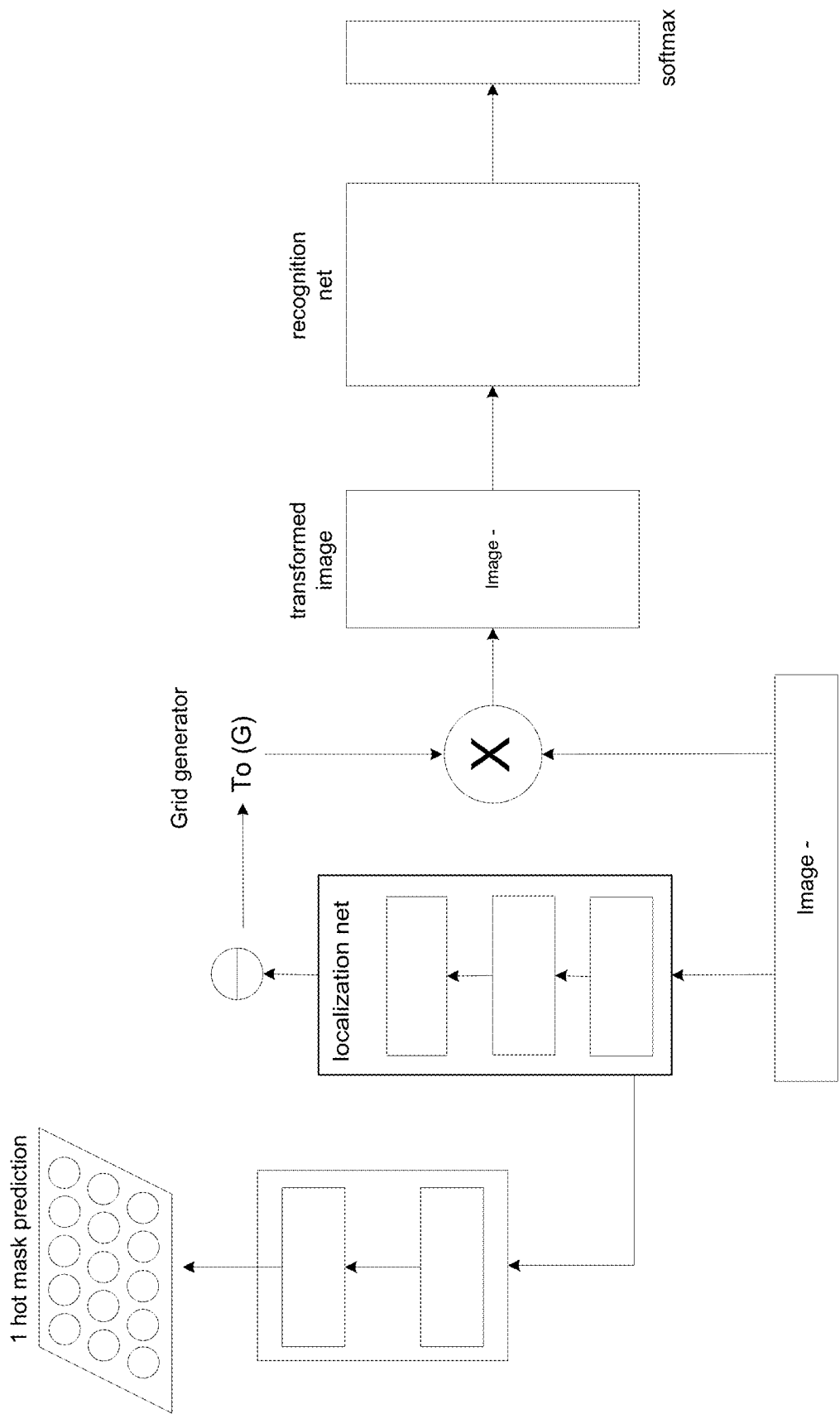
FIG. 33 is a system block diagram of an example spatial transformer network (STN) to align faces.

FIG. 33 shows a system block diagram of an example spatial transformer network (STN) to align faces, which may get more robust features.

In some embodiments, depth domain may be added to train the network 2603 and train a 3D convolution network.

In some embodiments, a computer-implemented method 2700, shown in FIG. 27, for facial image processing is disclosed herein. The method may be performed, at least in part, by a processor in a mobile device 2601. The method may include at 2701, receiving, by a first neural network, one or more images or videos containing a face of an authenticated individual. The images or videos may be taken by a camera 2602, which can be a camera on an authenticated individual's mobile device or another portable electronic device (e.g. laptop). At 2702, processing the image, by the first neural network, to generate data sets representing location coordinates of one or more facial features of the face in the image. The facial features may also be referred to as facial landmarks, and may include one or more of: eyes, nose, lips, ears, and so on.

At step 2703, receiving, by a second neural network, the image and the location coordinates of one or more facial features of the face in the image, and processing the image and the location coordinates of one or more facial features of the face in the image, by the second neural network, to generate a token associated with the face.

At step 2704, a signing authority 2605 may verify identity of the authenticated individual and sign the token with a signing algorithm, such as a public/private key pair.

At step 2705, the corresponding signed token is transmitted from the signing authority 2605 to the authenticated individual's mobile device 2601, subsequently saved in a token database 2606 on the mobile device.

In some embodiments, additional attributes can be contained in the signed token that is stored on the phone, to form an enhanced token. For example, if a facial feature vector (i.e., a token) and an age attribute are stored and signed, enhanced token, then at a Point-of-Sale (POS), a particular picture of a face may be authenticated and verified to meet a particular age threshold.

In some embodiments, a token may be signed by different authorities and enhanced with different information to form corresponding enhanced tokens. For example, a person may register himself as a person who is over 21 years old. This person may be required to visit a Driver's License Office (e.g. a signing authority), which may take his image and generate a token in accordance with the embodiments disclosed herein.

The office may check his driver's license to confirm that he is over 21 years old. This office may then proceed to sign the token with enhanced information, e.g. birthday, name, address and so on, so that a signed enhanced token has embedded information regarding the authenticated individual. The enhanced token may be signed with a public/private key system. The signed, enhanced token may then be stored on one or both of authenticated individual's mobile device and a remote database.

The authenticated individual may then, when visiting a bar and required to show proof of age, uses his phone to connect with the bar's POS system, which may take an image of him, generates a token thereof, and checks the authenticated individual's mobile device and/or a remote database to see if the authenticated individual is indeed over 21 based on the signed enhanced token.

In addition, a separate sign authority, such as a government office, may sign a token with enhanced information proving that an authenticated individual is eligible to vote in one or more elections. The enhanced token may include information such as authenticated individual's name, age, address, and nationality.

Referring now to FIG. 28, a process 2800 for verifying an authenticated individual at a Point-of-Sale (POS) is illustrated. At step 2801, an authenticated individual can scan a QR or bar code using a mobile device to associate the mobile device with the verification process. At step 2802, vendor POS takes a picture or image of authenticated individual's face.

At step 2803, POS can extract one or more facial features of the face from each of the images or videos by processing through a first neural network the image or video to generate location coordinates of each of the one or more facial features.

At step 2804, POS can use the image and location coordinates to generate a token, for example using a second neural network.

If an authenticated individual's mobile device is available, at step 2805, the generated token is compared against signed tokens stored in the authenticated individual's mobile device to check for and authenticate authenticated individual's identity, by comparing the token from POS with one or more tokens in the authenticated individual's mobile device and finding a best match.

At step 2806, if an authenticated individual's mobile device is not available, or the device does not have a token database, POS may reach an external database (e.g. feature or token database) for the purpose of identity verification.

In another aspect, a system for facial image processing is provided. The system may include a portable electronic device (PDA), the PDA may include: a processor; a non-transitory computer-readable medium storing data representative of a first neural network and a second neural network; and one or more programs, wherein the one or more programs are stored in the memory and configured to be executed by the processor, the one or more programs including instructions for: receiving, by the first neural network, an image containing a face; processing the image, by the first neural network, to generate data sets representing location coordinates of one or more facial features of the face in the image; receiving, by the second neural network, the image and the location coordinates of one or more facial features of the face in the image; and processing the image and the location coordinates of one or more facial features of the face in the image, by the second neural network, to generate a token associated with the face.

Figure 2:
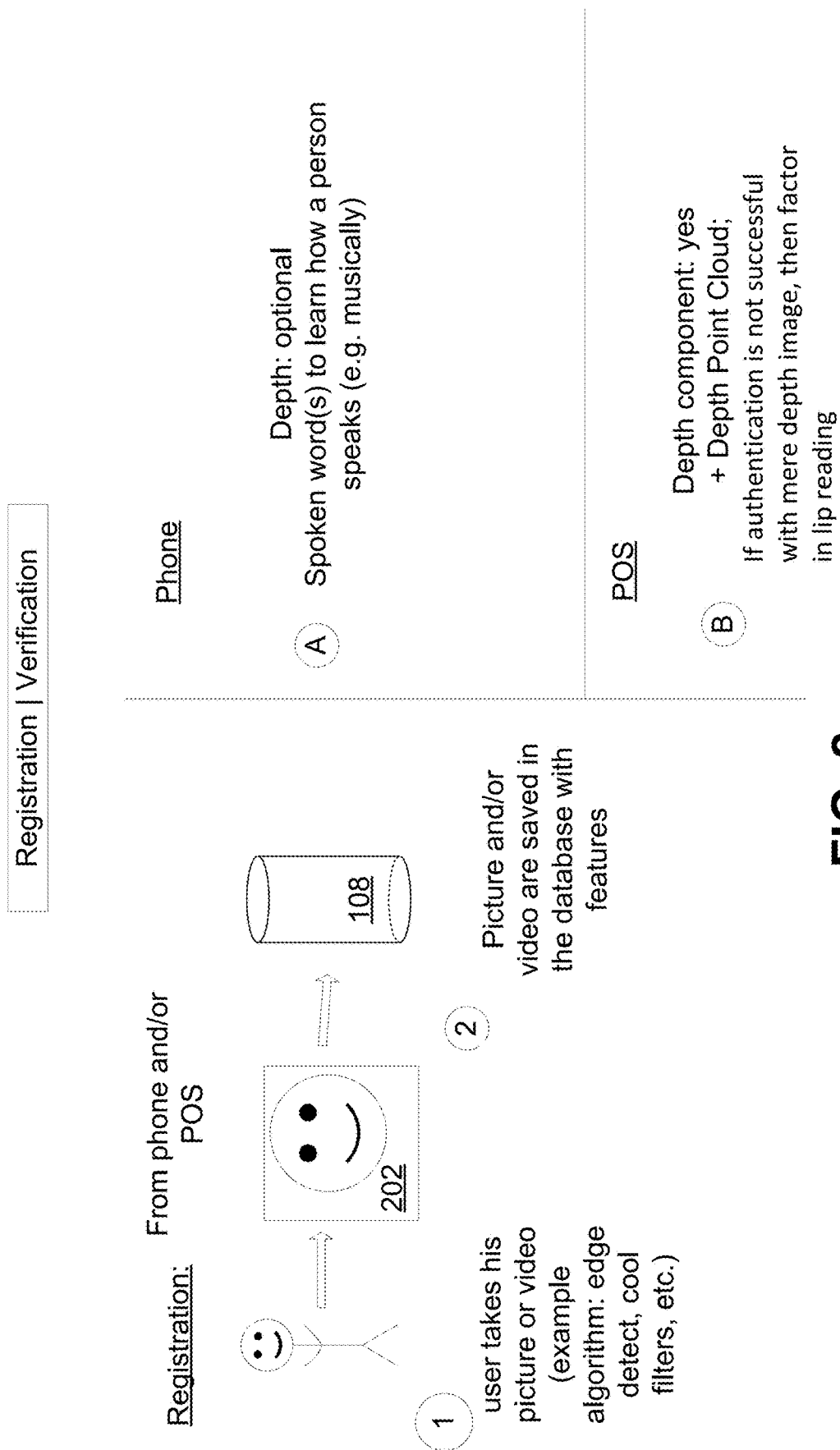
FIG. 2 is an example registration process using the example facial recognition system, in accordance with one embodiment.

FIG. 2 shows an example registration process and subsequent verification process using system 100, in accordance with one embodiment. During registration, an authenticated individual may use a mobile device to take a digital image or video 202 of himself. The authenticated individual may also visit a Point-of-Sale (POS) to do the same. The mobile device or POS has a camera. The camera may be 2D or 3D. A 3D camera can capture images or videos with a depth component. A POS may be equipped with a 3D camera. A mobile device may have a 2D and/or 3D camera.

The image or video 202 may be transmitted to a data storage device 108. Data storage 108 may store the image or video 202 in a database. In some embodiments, the authenticated individual image or video 202 may be processed by a video processing unit 111 of system 100, which may extract features from the image or video 202. The extracted features may be also stored in the database.

In some embodiments, instead of or in addition to images or videos of authenticated individuals, storage 108 may be configured to save extracted features from the images or videos.

In some embodiments, the authenticated individual may, during the capturing of video 202, speak a word or phrase. The word may be provided by a vendor or a third party, and may include alphabets, numbers, and/or words. For example, the word may be "1A3CB" or "hello world." System 100 may be able to process the video 202 and determine in real time or near real time that the authenticated individual in the video 202 is a real human being, as opposed to a robot, an image, or a spoofing attack. For example, system 100 may execute algorithms to detect depth, edges, motion liveliness, facial movements, and/or filters of the video. System 100 can then map and store the authenticated individual's face in the video as a series of 2D or 3D images taken from the video 202, depending on if the camera capturing the video is a 2D or 3D camera. Each of the 2D or 3D images may include pixels, each pixel represented by a set of data indicating a respective value for each of red, blue, green (RGB) colours. A set of data for a pixel in a 3D image may also include an additional value representing a depth component, which may contain information regarding a depth of the pixel in the 3D image. System 100 can also capture an authenticated individual's facial movements, including lip movements and store in data storage 108. In some embodiments, extracted features of images depicting an authenticated individual's facial movements including lip movements may be stored in data storage 108.

In some embodiments, system 100 may be configured to take multiple images of a person's face and convert the multiple images into pixelated masks, which may be an implementation of a point cloud. A point cloud may be a set of data points in 3D space measuring a large number of points on external surfaces of objects including a human face. The pixelated series of images may be further processed for authenticated individual registration and/or verification purposes.

In some embodiments, system 100 may execute algorithms in machine-learning unit 113 to analyze an authenticated individual's lip movements in the video 202 when speaking the provided word. The output from the machine-learning unit 113 may be stored as a feature in the database in data storage 108.

In some embodiments, an authenticated individual may choose to register a 2D image or video of himself via a mobile phone, and then proceed to complete the registration at a POS with a 3D camera. At the POS, system 100 may first validate that the person in front of the camera is a real person, instead of a robot, an image, or a spoofing attack, based on analysis of the 3D video being captured by the 3D camera.

For example, system 100 may validate that it is a real person based on a depth component of the 3D video captured. Next, system 100 may process the 3D video and compare it to the video data stored in data storage 108 based on an authenticated individual profile that was created or updated at the time the authenticated individual registered himself with a 2D image or video. The system may compare various features of the two videos (i.e., the 2D video and the 3D video), such as facial features, facial movements, lip movements, eye movements, and so on. The system can at this stage, based on the comparison of the two videos, determine that the person appearing in the first video (i.e., the 2D video) is the same person appearing in the second video (i.e., the 3D video).

In some embodiments, system 100 may validate that it is a real person based on a depth component of the 3D video captured. Next, system 100 may process the 3D video and compare it to the video data stored in data storage 108 based on an authenticated individual profile that was created or updated at the time authenticated individual registered himself with a 2D image or video. In some cases, if authentication is not successful with a depth image, then facial movements such as lip movements may be required in order to authenticate the authenticated individual.

In some embodiments, an authenticated individual may be requested to speak a word provided to the authenticated individual when the 3D video is being captured. The provided word may be the same word provided to the authenticated individual while capturing the 2D video during the initial registration process with a mobile phone, if a word was provided to the authenticated individual at all during the 2D video filming process. This way, system 100 can, through the machine-learning unit 113, further validate that the person appearing in the 2D video is the same person appearing in the 3D video, based on analysis of the lip movements of the authenticated individual speaking the same word.

Once system 100 has validated that the authenticated individual in the 3D video is a real person, and the same person as the authenticated individual in the 2D video, system 100 can store the 3D video in data storage 108, and further associate the 3D video data to the authenticated individual's profile associated with the 2D video. In some embodiments, the initial features captured in the 2D video is augmented with the facial features presented in the 3D video, including, for example, facial movements, lip movements, depth component, and so on.

The authenticated individual may then, as an option, make a one-time payment (OTP) to system 100 for registration.

Once successfully registered, the authenticated individual is able to make payments using facial recognition through a POS or through a mobile device, for example, in accordance with the process described below.

Figure 3:
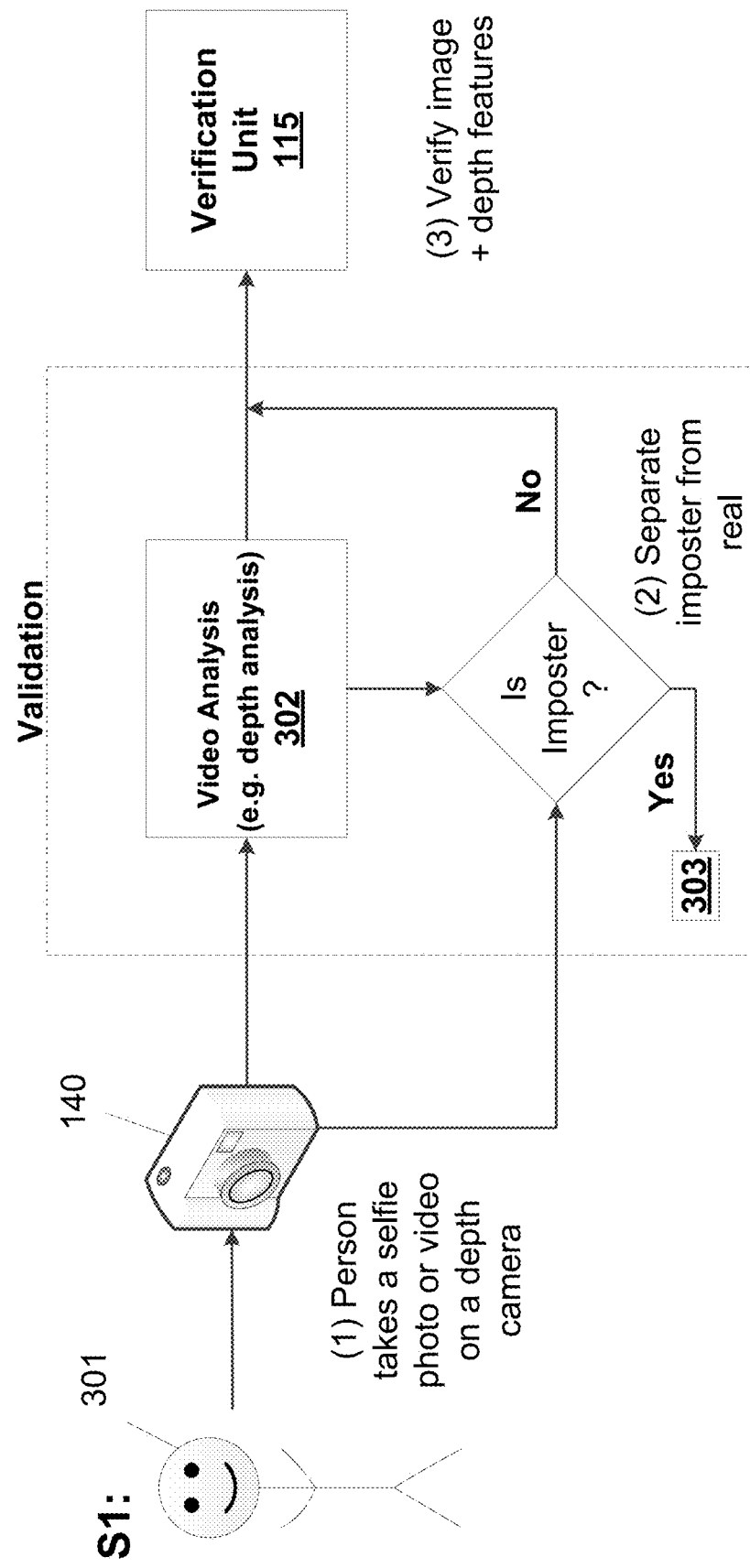
FIG. 3 is an example authenticated individual verification process using the example facial recognition system, in accordance with one embodiment.

Referring now to FIG. 3, which shows an example authenticated individual verification process at a POS using system 100, in accordance with one embodiment. An authenticated individual may wish to make payment for a purchase at a POS. The authenticated individual may at step 301 may use or let a 3D camera 140 take a 3D image or video of himself for the purpose of authenticating identity and making a payment. The authenticated individual may, in some embodiments, choose to take an image or video. In other embodiments, a pre-determined setting may determine if an authenticated individual can take an image or video using camera 140 at a POS.

The camera 140 at a POS may be remotely connected to system 100 and send the captured image or video to system 100. The verification unit 115 on system 100 may receive the processed 3D image or video and verify whether the authenticated individual appearing in the 3D image or video is the authenticated individual in the authenticated individual profile, based on previously stored image and/or video data associated with the authenticated individual profile.

In some embodiments, verification unit 115 first determines, using video analysis at step 302, that the person appearing in the 3D video captured by camera 140 at a POS is a real person, instead of a robot or an imposter, based on features of the 3D video, such as depth component, facial features, lip movements, and so on. If the result of video analysis indicates that the person in the 3D video is actually an imposter, such as a spoofing attack, the system 100 may alert the authenticated individual associated with the authenticated individual profile at step 303. Otherwise, verification unit 115 can proceed to verify that the authenticated individual appearing in the 3D image or video is the authenticated individual in the authenticated individual profile, based on previously stored image and/or video data associated with the authenticated individual profile. The previously stored image and/or video data associated with the authenticated individual profile may, include for example, facial features, facial movements, depth components of the facial features, and so on. Once system 100 has verified and authenticated the identity of the authenticated individual in the 3D video, system 100 may proceed to trigger or request a payment in accordance with the authenticated individual request.

Figure 4:
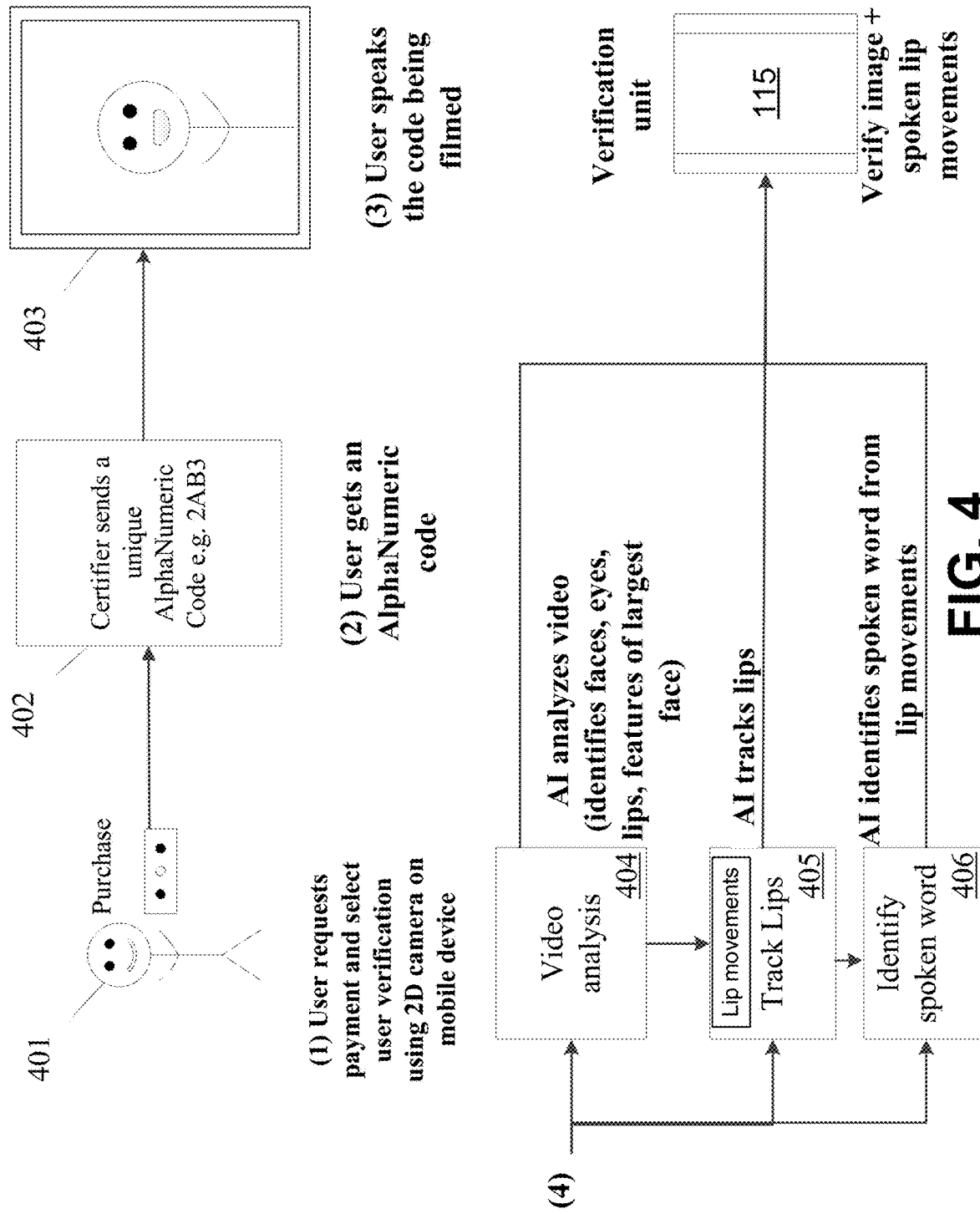
FIG. 4 is another example authenticated individual verification process using the example facial recognition system, in accordance with one embodiment.

FIG. 4 shows an example authenticated individual verification process at a mobile device using system 100, in accordance with one embodiment. The mobile device may be for example a cell phone, a tablet, or a laptop. An authenticated individual at step 401 may request for a payment to be made for a purchase transaction. The authenticated individual may select the 2D camera 130 on the mobile device to verify his authenticated individual identity. At step 402, the authenticated individual may be provided with a word, which may in some cases be a word or code including alphabetic and/or numeric characters, such as "2AB3". At step 403, the authenticated individual may speak the word while being captured in video by the 2D camera. The captured video is then transmitted to system 100 for analysis.

At step 404, system 100 may analyze the video to determine if the person appearing in the video is the authenticated individual in the authenticated individual profile making the request for payment. In some embodiments, a machine-learning unit 113 may be utilized to analyze the video to identify face, eyes, lips, and other features of the video, such as features of the largest face. For example, lip movements may be tracked at step 405 and further analyzed at step 406 to identify a word being spoken by the authenticated individual in the video.

Once system 100 has verified and authenticated the identity of the authenticated individual in the 2D video, system 100 may proceed to trigger or request a payment in accordance with the authenticated individual request.

Figure 5:
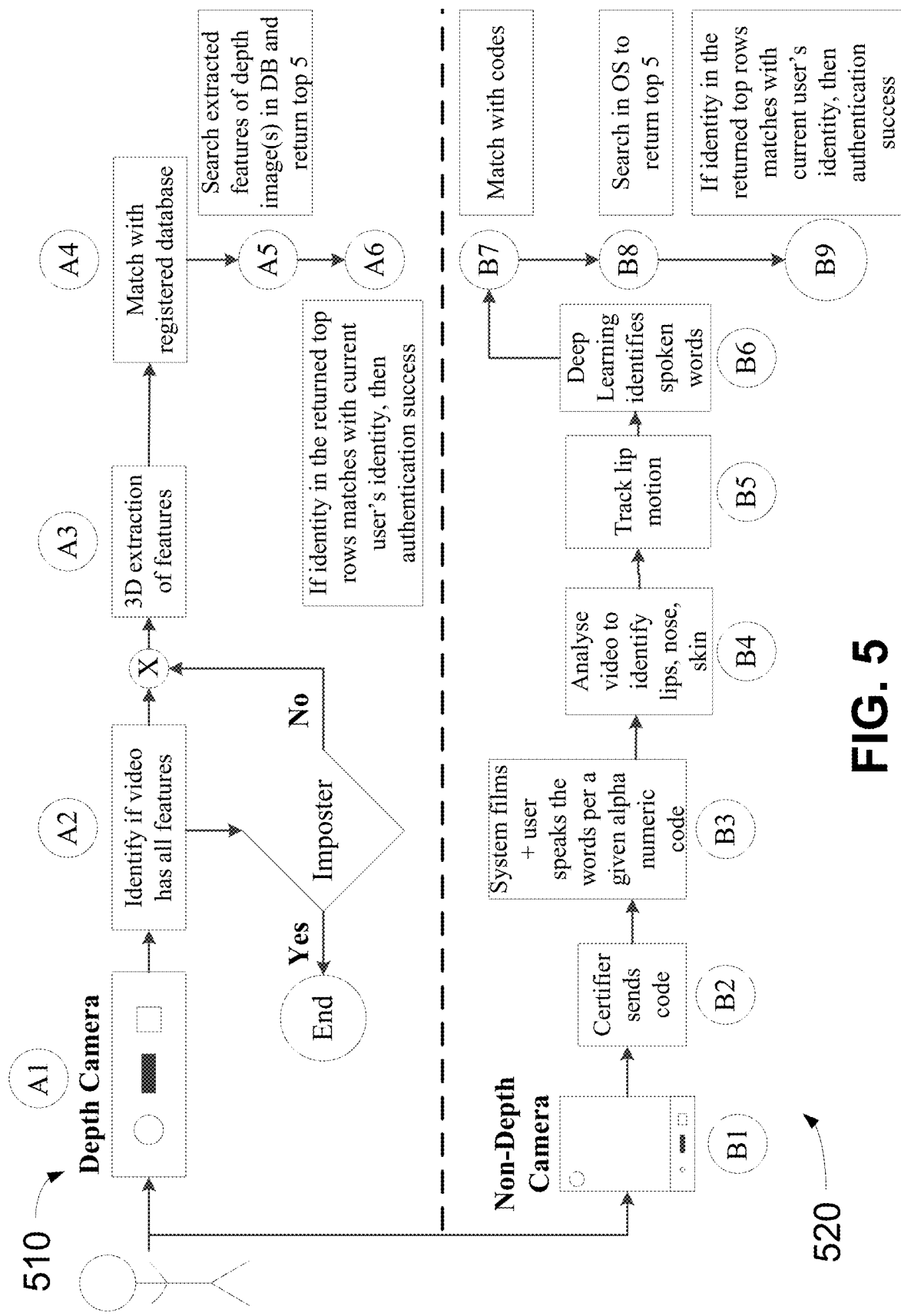
FIG. 5 is another example process for authenticated individual verification, in accordance with one embodiment.

FIG. 5 shows two example processes 510, 520 for authenticated individual verification, in accordance with one embodiment. Process 510 is a process executed by system 100 for authenticated individual verification with a 3D camera that is configured to capture 3D videos with a depth component. At step A1, a 3D camera captures the authenticated individual in a brief 3D video with depth component. At step A2, system 100 receives the 3D video, and analyzes features of the captured 3D video in order to determine if the video shows a real person or an "imposter", which means that the person appearing in the video may be a spoofing attack such as an image or a robot. Once system 100 determines that the person in the video is a real person, system 100 at step A3 may be configured to extract various features from the 3D video, such as facial movements, facial features, lip movements, depth component, and so on. At step A4, system 100 tries to match the person appearing in the 3D video with an authenticated individual in a registered database. At step A5, system 100 may search in the database of video data and return the top five results (i.e. 5 authenticated individuals) that are the best matches based on the extracted features of the 3D video. For example, system 100 may search features extracted from depth images or videos in the database and return the top five results. System 100 at step A6 may perform a video analysis in depth and determine if the person appearing in the 3D video is one among the top five results returned in step A5, and if so, then the authenticated individual verification and authentication is a success, in which case the requested payment may be authorized. For example, at step A6, if an authenticated individual profile in the returned top five results or rows matches with the results from the video analysis, then the authentication step is deemed a success.

Process 520 is a process executed by system 100 for authenticated individual verification with a 2D camera that is configured to capture 2D videos. At step B1, a 2D camera captures the authenticated individual in a brief 2D video. At step B2, system 100 receives the authenticated individual request for authenticated individual verification and sends a code (or word) to the authenticated individual. At step B3, the 2D camera films the authenticated individual speaking the given code, which may be alphabetic and/or numeric. At step B4, system 100 may be configured to extract various features from the 2D video, such as facial movements, facial features, nose, skin, and so on. At step B5, system 100 tracks and analyzes lip movements of the authenticated individual during the time the authenticated individual is heard speaking the code on video. At step B6, system 100 may, through deep learning unit or module, identify a spoken code based on the authenticated individual's lip movements. At step B7, system 100 may match the identified code with the code that has been previously provided to the authenticated individual and if the match of codes is successful, system 100 may at step B8 search in the database of video data and return the top 5 results (i.e. 5 authenticated individuals) that are the best matches based on the extracted facial features of the 2D video. System 100 at step B9 may perform a video analysis in depth and determine if the person appearing in the 2D video is one among the top five results returned in step B8, and if so, then the authenticated individual verification and authentication is a success, in which case the requested payment may be authorized. For example, at step B9, if an authenticated individual profile in the returned the top 5 results matches with the results from the in-depth video analysis, then the authentication step is deemed to be a success.

In some embodiments, lip reading analysis may compliment the facial recognition process in the process of authenticating an authenticated individual.

Figure 6:
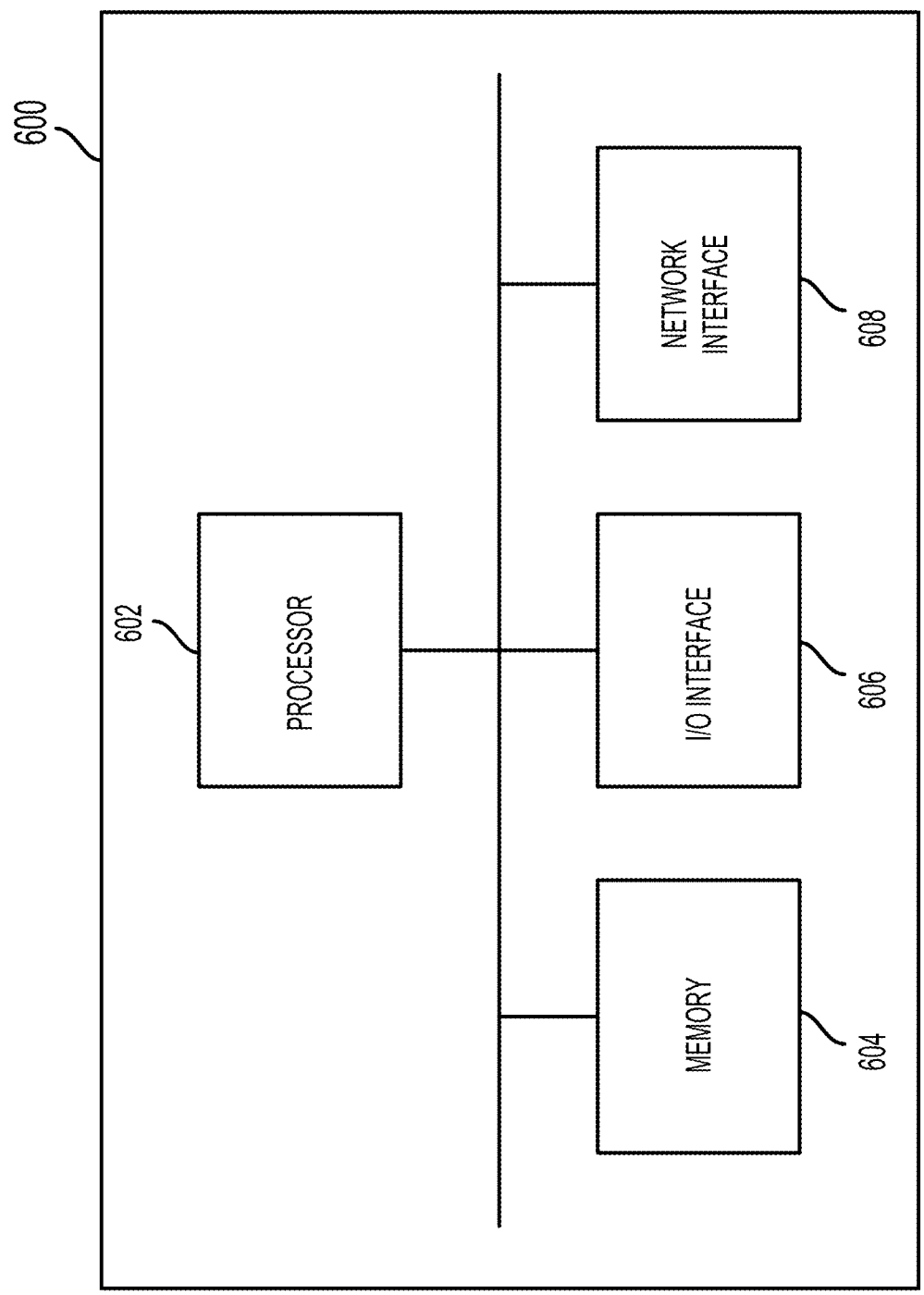
FIG. 6 is an example block diagram of an example computing device, according to some embodiments.

FIG. 6 is a schematic block diagram of an example computing device 600 implementing system 100, according to some embodiments. As depicted, computing device 600 includes at least one processor 602, memory 604, at least one I/O interface 606, and at least one network interface 608.

The computing device 600 may be configured as a machine-learning server adapted to dynamically maintain one or more neural networks.

Each processor 602 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 604 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 606 enables computing device 600 to interconnect with one or more input devices, such as a keyboard, mouse, camera, touch screen, and a microphone, or with one or more output devices such as a display screen and a speaker.

A networking interface 608 may be configured to receive and transmit data sets representative of the machine-learning models, for example, to a target data storage or data structure. The target data storage or data structure may, in some embodiments, reside on a computing device or system such as a mobile device.

Figure 7:
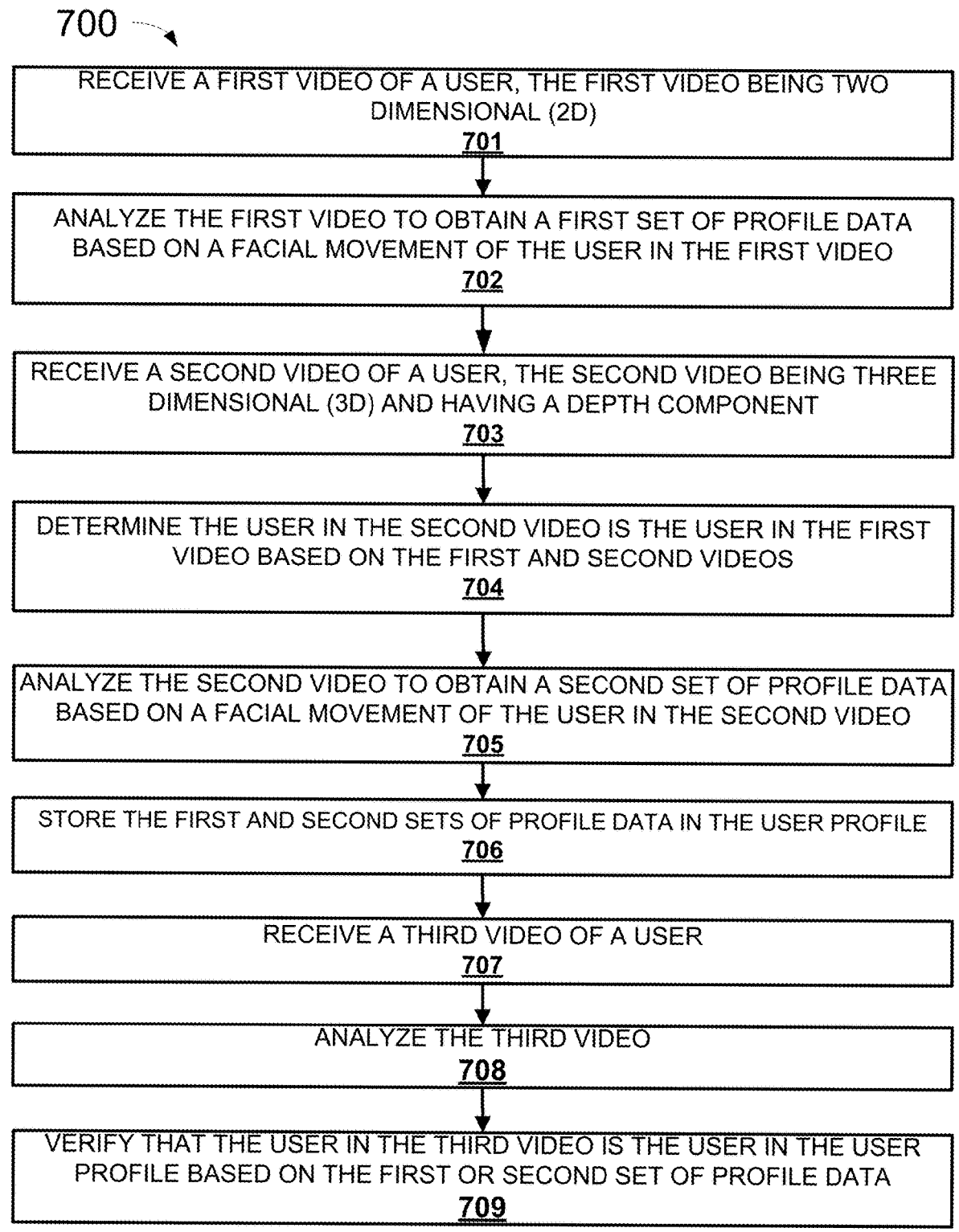
FIG. 7 is an example flow chart representing a process performed by the facial recognition system, according to some embodiments.

FIG. 7 shows an example process 700 performed by system 100. At step 701, a system may receive a first video of an authenticated individual, the first video being two-dimensional. At step 702, the system may analyze the first video to obtain a first set of profile data based on a facial movement of the authenticated individual in the first video. At step 703, the system may receive a second video of an authenticated individual, the second video being three-dimensional and having a depth component. At step 704, the system may determine the authenticated individual in the second video is the authenticated individual in the first video based on the first and second videos. At step 705, the system may analyze the second video to obtain a second set of profile data based on a facial movement of the authenticated individual in the second video. At step 706, the system may store the first and second sets of profile data in the authenticated individual profile. At step 707, the system may receive a third video of an authenticated individual. At step 708, the system may analyze the third video. At step 709, the system may verify that the authenticated individual in the third video is the authenticated individual in the authenticated individual profile based on the first or second set of profile data.

In some embodiments, the facial movement of the authenticated individual in the first or second video may be a lip movement.

In some embodiments, the second set of profile data may include data relating to the depth component of the second video.

In some embodiments, the data relating to the depth component of the second set of profile data may be used to augment the first set of profile data.

In some embodiments, the depth component of the second video may include information regarding a depth of a pixel in an image from the second video for each pixel in the image.

In some embodiments, the lip movement in the first video is of the authenticated individual speaking a word and the lip movement in the second video is of the authenticated individual speaking the same word.

Figure 8:
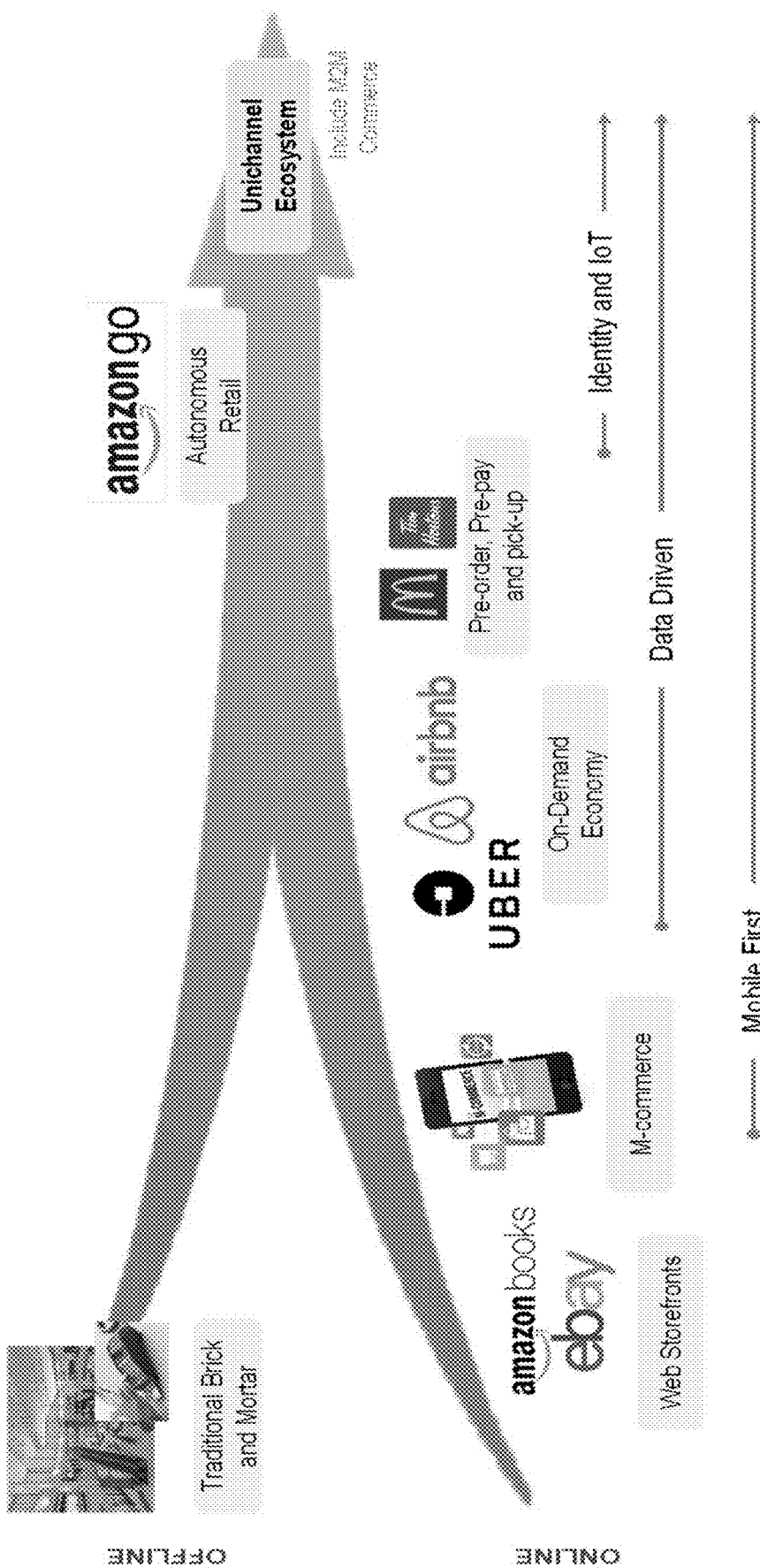
FIG. 8 is an example uni-channel online ecosystem, according to some embodiments.

FIG. 8 is an example uni-channel online ecosystem, according to some embodiments. As shown, eCommerce may evolve into a uni-channel ecosystem that brings online, offline, logistics, data, and identity together. But first, the offline model may need to be re-modernized to deliver the same seamless shopping experience as online.

Figure 9:
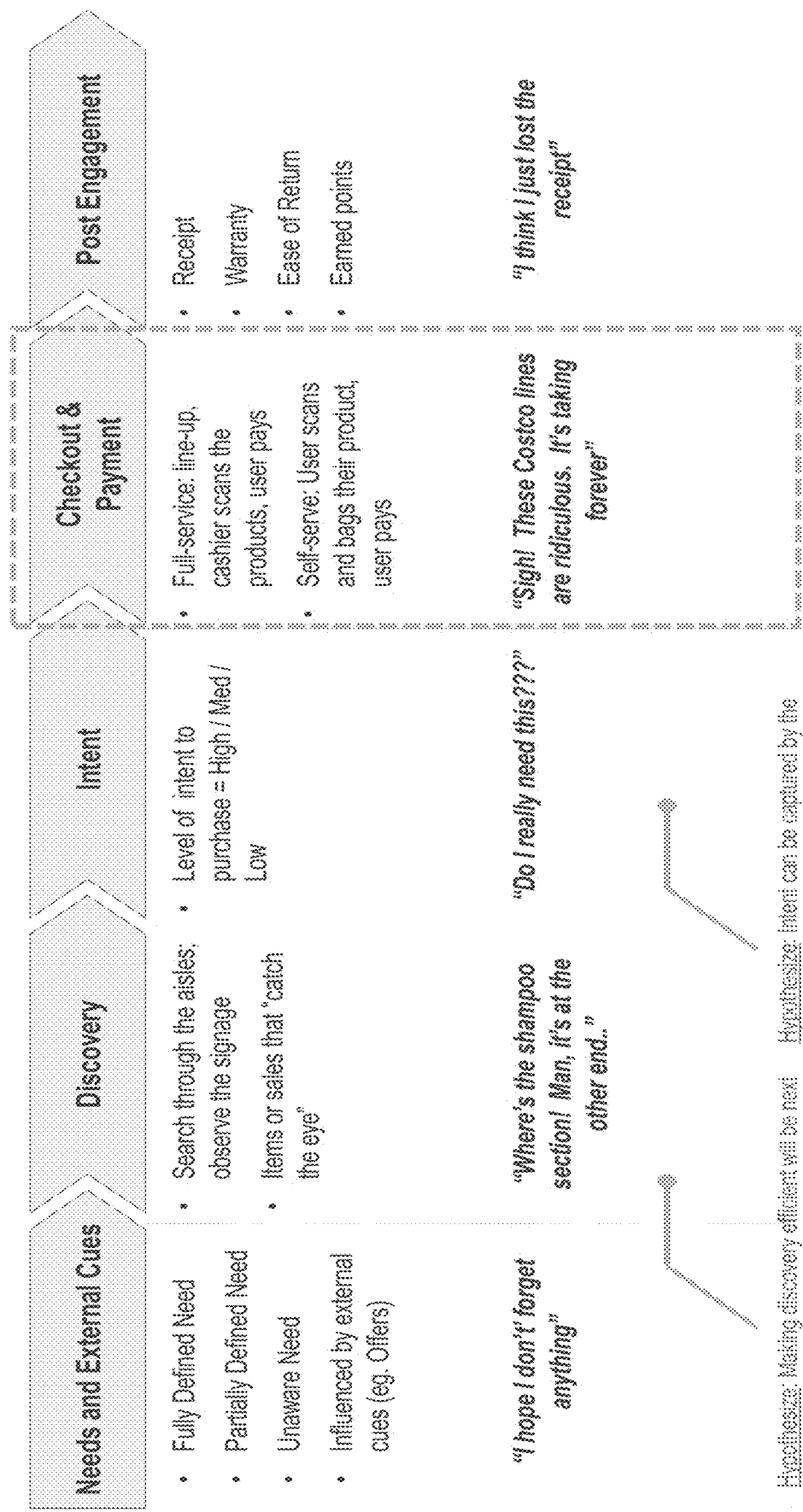
FIG. 9 is an example flow chart of an in-store model for a customer, according to some embodiments.

FIG. 9 is an example flow chart of an in-store model for a customer, according to some embodiments. A few major ecosystem players may focus on autonomous retail by tackling the physical checkout with a "cashier-less" POS, which removes the waiting line and makes payments invisible. These players may utilize facial recognition and Internet-of-Things (IoT) to achieve this experience, and may collect more authenticated individual data as well as identity information.

For example, at FutureMart™ by Alibaba™, customers may enter the store and use facial recognition to provide identification. The customer may then scan a QR code with an Alibaba™ mobile application to shop. A custom application offers discounts for smiling and thereby improving facial identity of the authenticated individual. Facial recognition and RFID at the exit may then recognize the customer and the product.

For another example, AmazonGo™ lets a customer scan a QR code with the AmazonGo™ app to enter the store. Weight sensors and cameras automatically detect when products are taken off or returned to the shelves, and keep track of the authenticated individual's virtual cart. No checkout is required; a customer can simply exit the store and the payment may be charged to the card on file.

For yet another example, at BingoBox™ by WeChat™, a customer can scan a barcode with the WeChat app to access the store. Products are labeled with an RFID tag. At checkout, an authenticated individual places products on a self-checkout machine, which reads the tags, and pays using a custom wallet application. Image recognition may be used to automatically recognize an authenticated individual if items are purchased.

Figure 10:
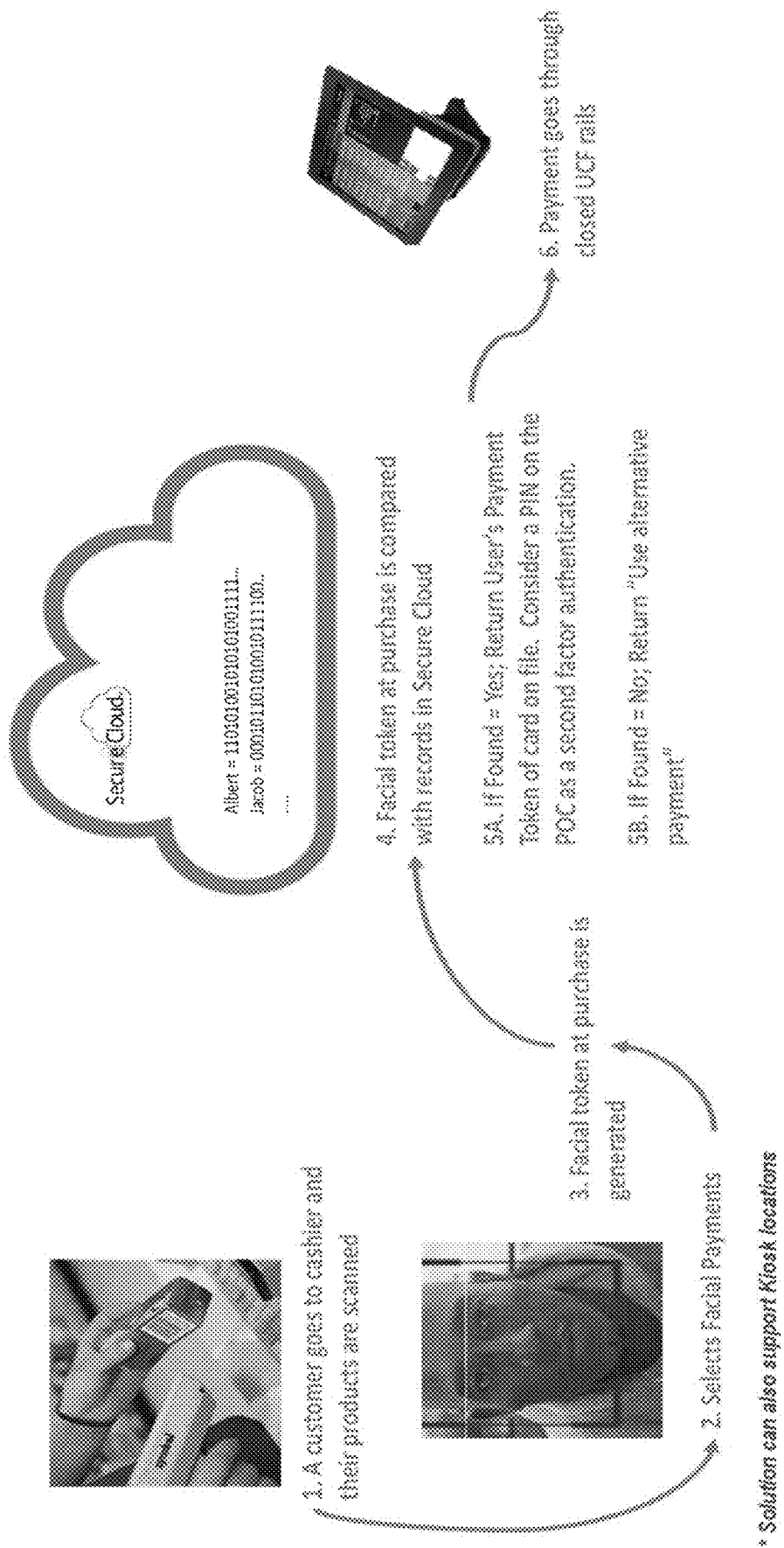
FIG. 10 is an example use case of using facial recognition at a Point-of-Sale (POS), according to some embodiments.

FIG. 10 is an example use case of using facial recognition at a POS, according to some embodiments. At step 1, a customer goes to a cashier and their products are scanned; at step 2, payment using facial recognition may be selected; at step 3, a facial token (which may also be referred to as facial identity token) of the customer may be generated; at step 4, a facial token of the customer may be compared with records in a secure cloud storage; at step 5A, if the facial token is found in the records, the system can return the customer's payment information (e.g. payment token of the customer's card on file) to complete the purchase transaction; at step 5B, if the facial token is not found in the records, then no payment will be made, and alternative payment method may be selected; at step 6, a payment may go through payment rails.

FIG. 11 shows that 2D facial recognition cannot distinguish similar faces, and that current facial recognition technology can be easily spoofed. Today, computer vision is used for facial recognition to authenticate consumers. However, industry offerings are all based on 2D images. This can be easily spoofed, which would lead to problems using 2D facial recognition for financial transactions. Therefore 3D facial feature extraction and matching may be used with facial movements (e.g. lip movement) to fortify the validation of a video of a customer's face, while compensating for 2D cameras in existing mobile devices.

FIG. 12 shows example capabilities of a facial recognition system, according to some embodiments, such as processes involving pixel masks, lip movement, 3D depth video analysis, and facial identity tokens. Generating a pixel mask means applying an AR face mask to an authenticated individual's face via a mobile device extract an authenticated individual's 2D facial features while gamifying the process.

Artificial Intelligence (AI) may extract and interpret the authenticated individual's lip movement against provided words as a way to validate the identity of the authenticated individual. 3D depth video analysis involves extracting and utilizing an authenticated individual's depth facial features in situations where a depth camera is available. Facial identity tokens or facial tokens involve extracted features (e.g., 2D, lip movement, 3D) which may be encrypted and stored as a string in a secure database.

Lip movement, for example, can be read using data that is based, for example, on a data set, such as grid audiovisual corpus for speech perception. This example dataset contains 1000 short videos of 2 seconds each, recording 34 people. It also contains the corresponding ground truth (the words are spoken by each person).

Using 3D convolutional neural networks, which takes into account the audio. In an example use case, the audio is not taken into consideration. Applicant tested the approach with the LipNet™ model, Keras™ and TensorFlown™ implementation for sentence detection.

In this approach, features were taken representing various parts of the lip region, and the model was executed for the entire dataset to generate a log file with utterances both predicted and target (labelled) values. Phrase similarities were obtained for each video, by determining the similarities measures: cosine, Euclidian, Jaccard distances.

Figure 13:
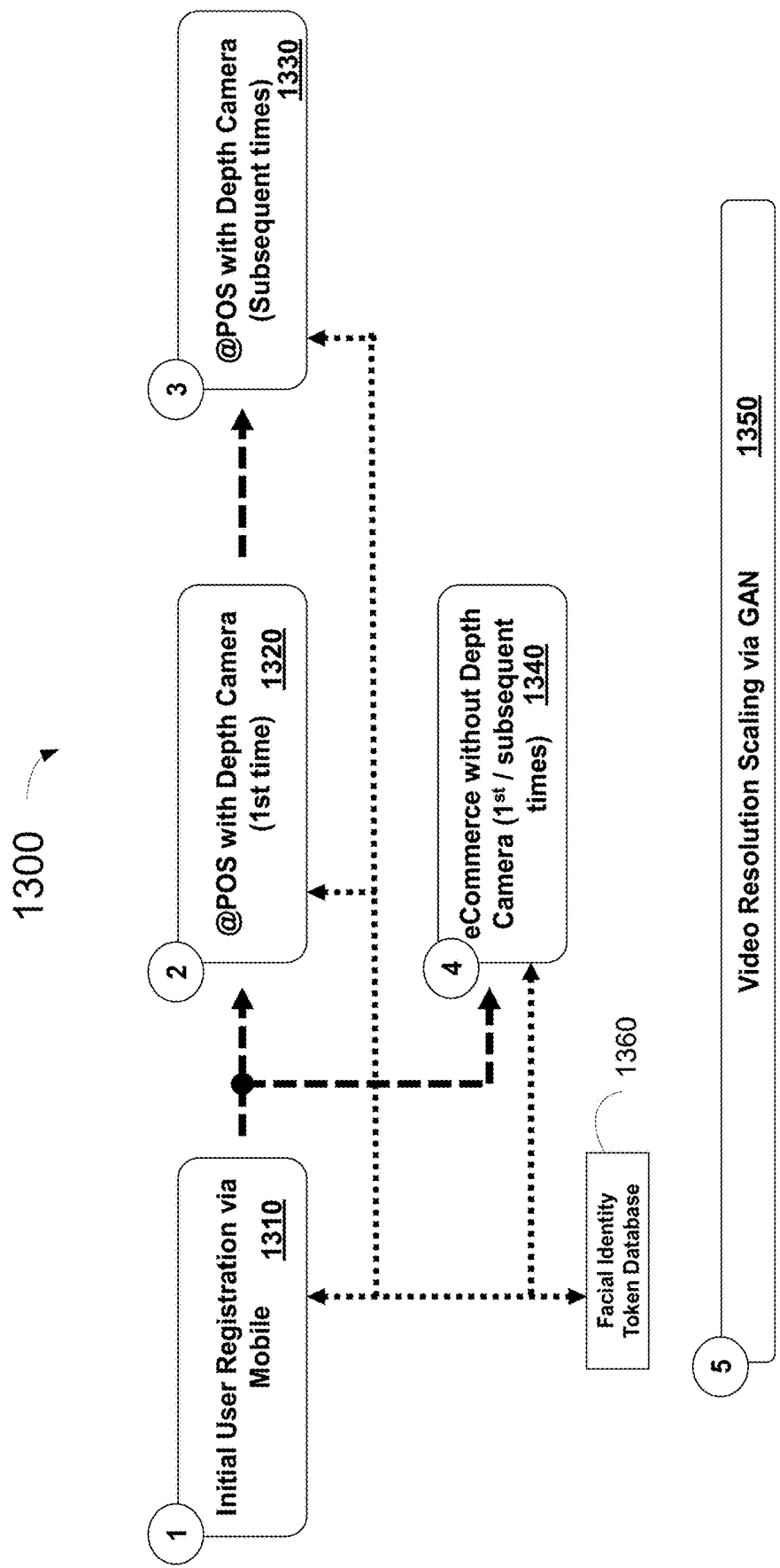
FIG. 13 is an example authenticated individual flow chart of a facial recognition system, according to some embodiments.

FIG. 13 shows an example authenticated individual flow chart 1300 of a facial recognition system, according to some embodiments. At step 1310, an initial authenticated individual registration is completed via mobile device. At step 1320, a customer may use a depth camera, for the first time, at a POS. At step 1330, a customer may use a depth camera in subsequent times to verify their identity and complete a transaction. Step 1340 is when a customer makes a transaction using eCommerce online, without a depth camera. Facial identity token database 1360 may be used to store authenticated individual's initial facial recognition data supplied through the registration process 1310. At step 1350, as an optional step, video resolution scaling may be formed via Generative Adversarial Networks (GAN).

Figure 14:
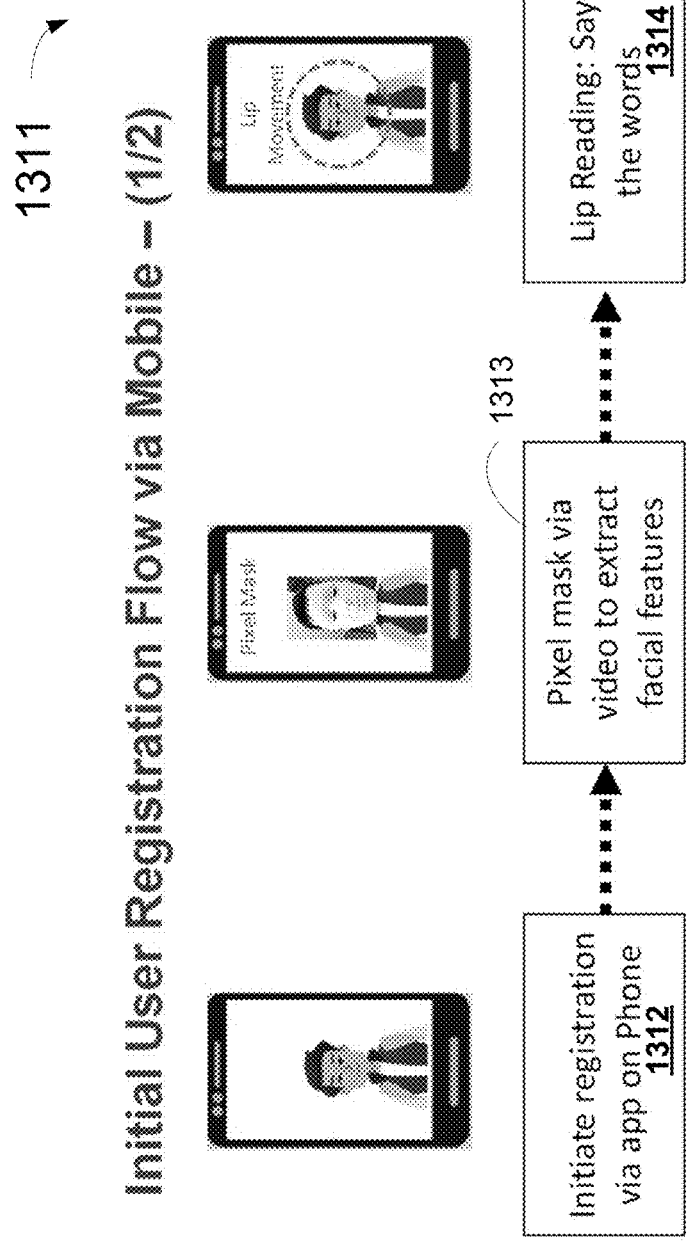
FIGS. 14 and 15 are example initial authenticated individual registration processes using a mobile device, according to some embodiments.
Figure 15:
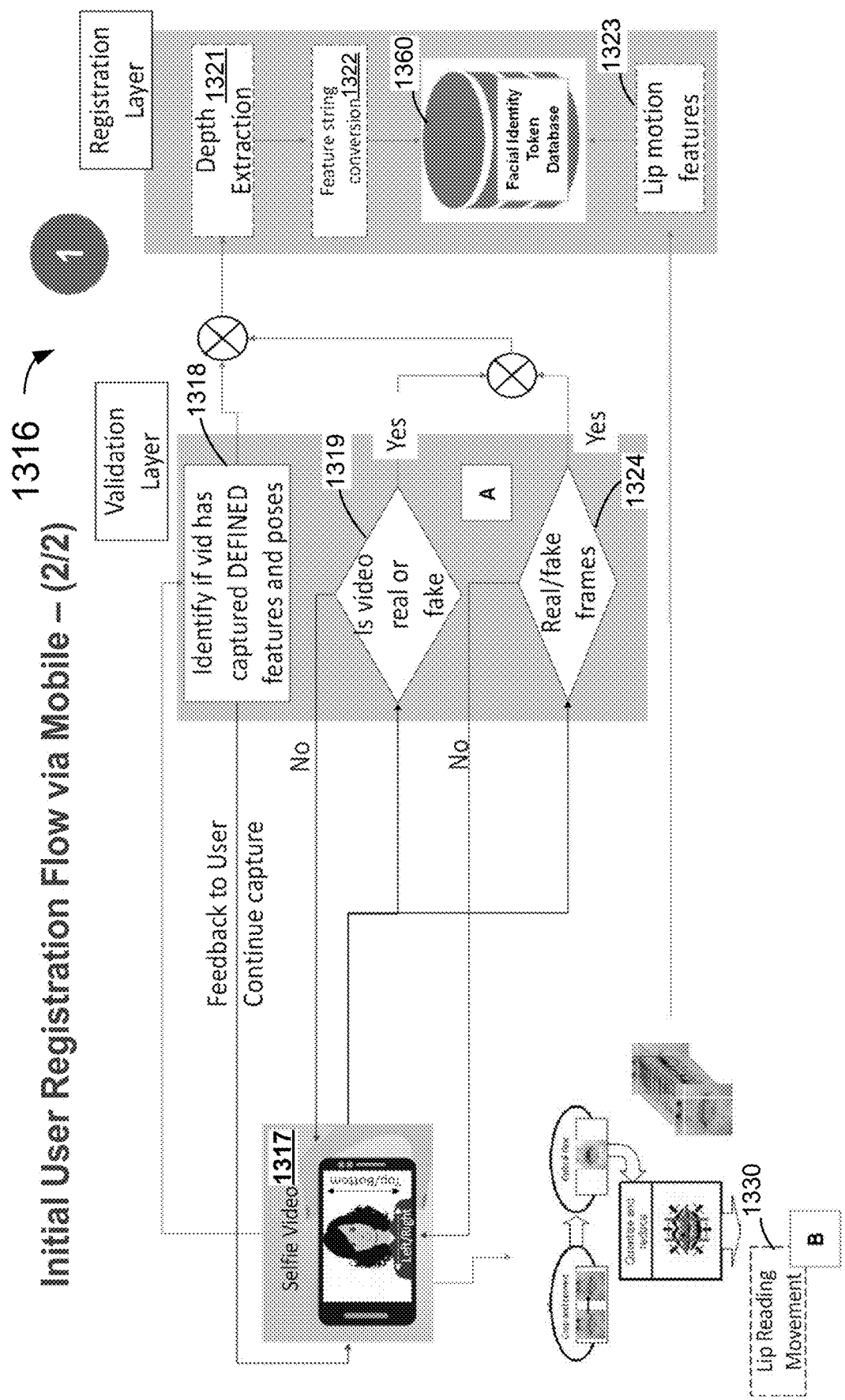

FIGS. 14 and 15 shows example initial authenticated individual registration processes 1311 and 1316 using a mobile device, according to some embodiments.

At step 1312, an authenticated individual may begin a registration process through a mobile device; at step 1313, the authenticated individual may take a video of his or her own face to generate a pixel mask, a process which involves generating an AR-based mask that gamifies the process of extracting 2D facial features (e.g. distance between eyes, etc.) and the system may check if the video is real or fake.

At step 1314, while taking a video of his own face, the authenticated individual may say aloud a set of provided words and the system would capture their lip movement. Saying aloud the provided words is an approach similar to a challenge response, and may be used to verify the authenticated individual is not a robot or an image.

At step 1315, registration is complete, in which case the system may map and store in the facial identity token database: (i) the authenticated individual's face as a 2D token and (ii) output from the AI that captures the way the authenticated individual moves his lips based on the phonemes pronounced.

At step 1317, a selfie video may be taken by the authenticated individual. At step 1318, which may be part of a validation layer, the system may identify if the video as captured has sufficiently defined features and poses. If not, there may be a feedback to the authenticated individual to continue take or capture the video.

At step 1319, the system may determine if the video is real or fake.

At step 1324, the system may determine if the video frames are real or fake. If the video passes the validation process, then a registration process or layer may be performed by the system.

At step 1321, a depth extraction may be performed. At step 1322, feature strings may be converted and stored into facial identity token database 1360.

At the same time validation is being processed, lip reading movement 1330 may be performed by the system. At step 1323, lip motions from lip reading movement process 1330 may be stored into facial identity token database 1360 as well.

Figure 16:
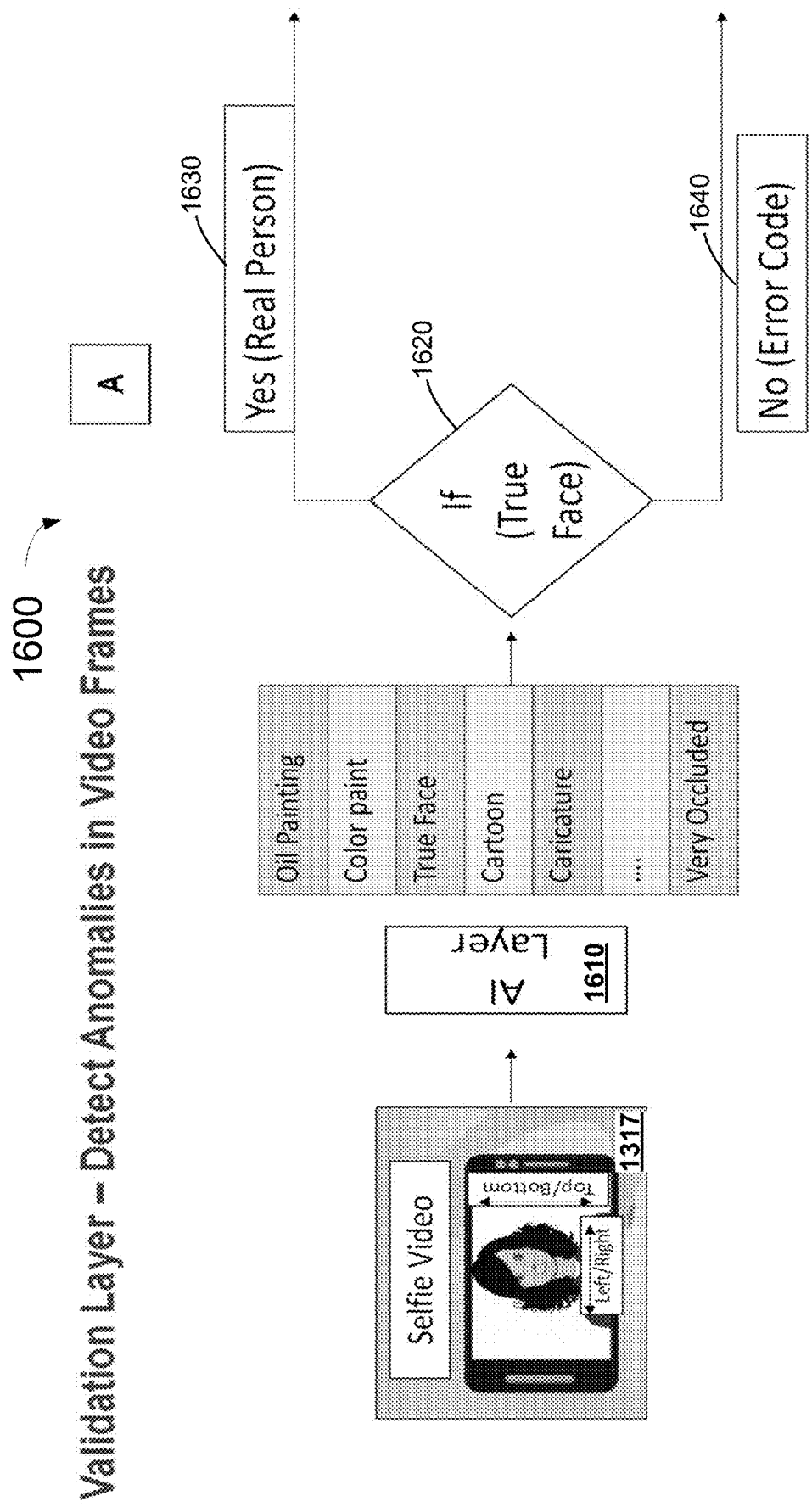
FIG. 16 is an example schematic diagram of a validation process by a facial recognition system, according to some embodiments.

FIG. 16 shows an example schematic diagram of a validation process 1600 by a facial recognition system, according to some embodiments. AI layer 1610 can generate a dataset of true images and their false images (includes cartoon, color paint, oil painting images, picture of photograph, picture of laptop or computer screen, etc.) based on video 1317. The database of true images and false images may help an AI algorithm 1620 to detect true image 1630 from false images 1640. This process may be performed on each video frame to detect spoofing.

Figure 17:
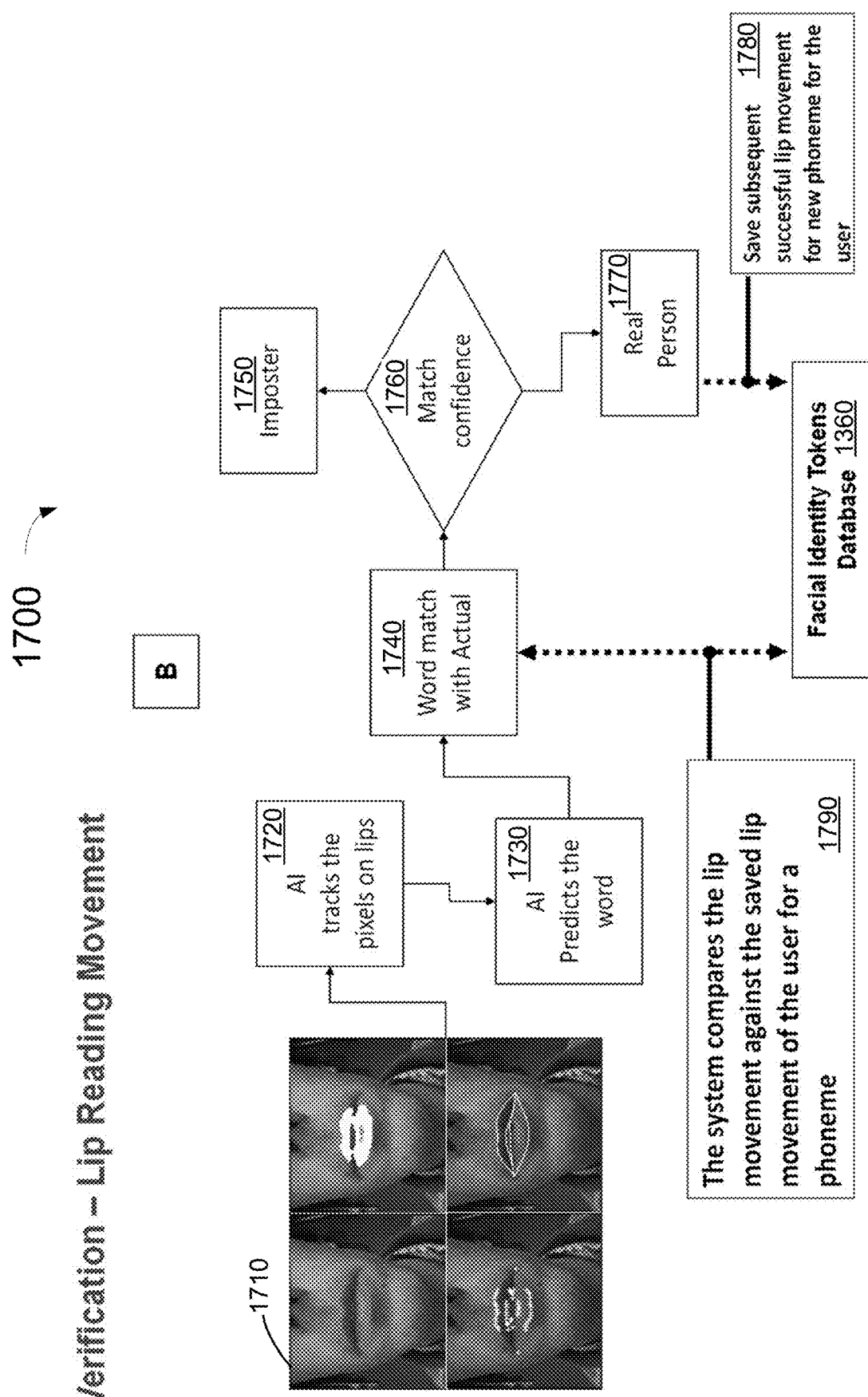
FIG. 17 is an example schematic diagram of a verification process by a facial recognition system, according to some embodiments.

FIG. 17 shows an example schematic diagram of a verification process 1700 by a facial recognition system, according to some embodiments. Video frames 1710 showing various lip movements of an authenticated individual may be sent to AI algorithm at step 1720 to track the pixel on lips.

At step 1730, the trained AI algorithm may predict a word spoken by the authenticated individual in the video. At step 1740, the predicted word is compared to the provided word (i.e. actual word) and a determination is made as to if they match. At step 1760, a match confidence score may be generated. If the score is too low, the person in the video may be determined to be an imposter at step 1750.

If the score is above a certain threshold, at step 1770, then the person in the video may be determined to be a real person matching the provided identity. The system may compare the lip movement against a saved data set of previously captured lip movements of the authenticated individual for a phoneme at step 1790 and save the phoneme to the facial identity token database 1360. At the same time, the system may save subsequent successful lip movements for new phonemes for the authenticated individual at step 1780.

Figure 18:
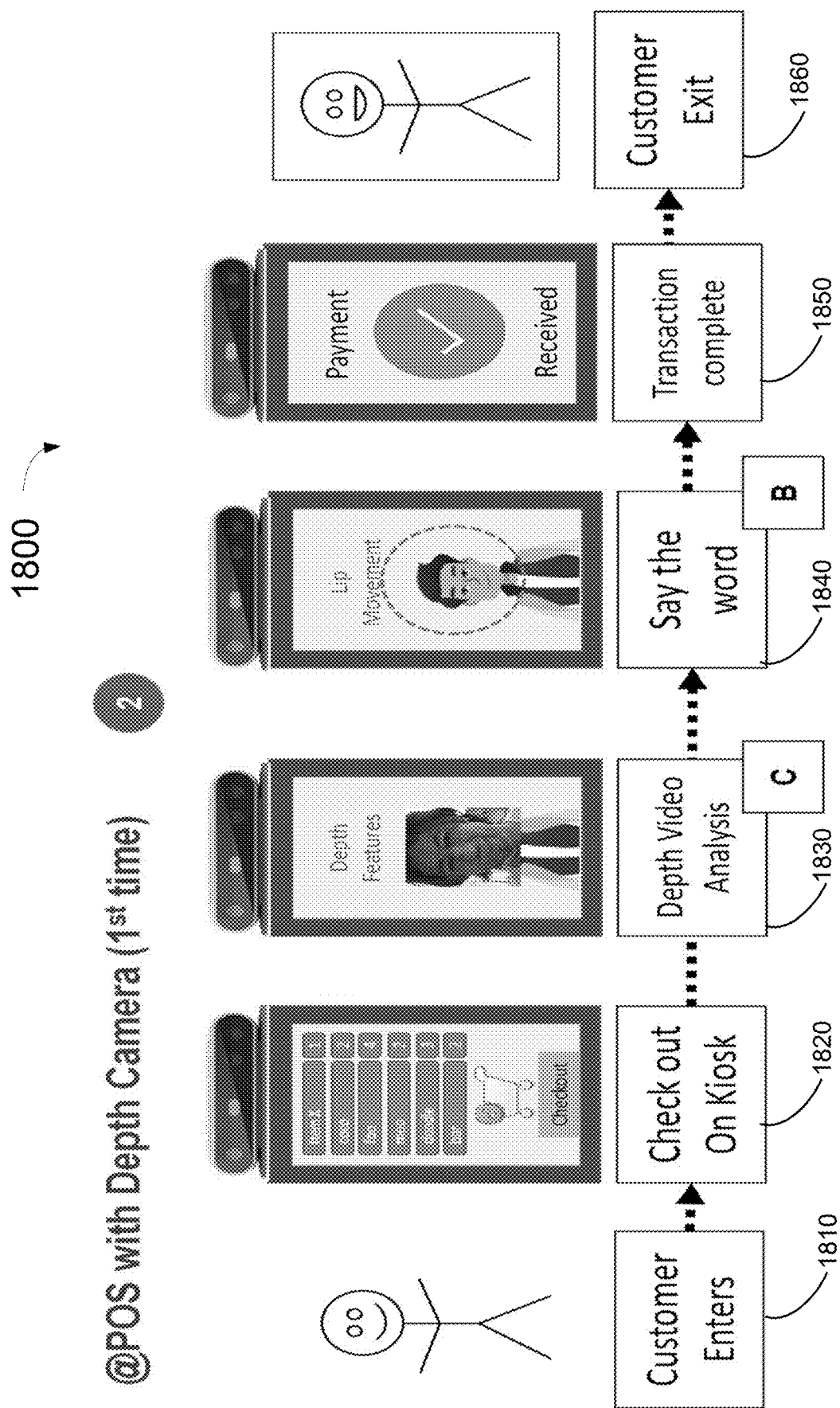
FIG. 18 is an example transaction process with a depth camera performed by a facial recognition system, according to some embodiments.

FIG. 18 shows an example transaction process 1800 with a depth camera performed by a facial recognition system, according to some embodiments.

At step 1810, a customer enters a store; at step 1820 the customer may check out via a kiosk; at step 1830, the system may validate that the customer is a person based the depth component of the depth video, and extract their depth facial features, check the video taken by the depth camera, and compare the 3D video to the 2D facial identity token stored at initial registration via mobile device.

At step 1840, if the system finds a match for the 3D video and the match confidence score is sufficiently high, then a challenge word is provided to the authenticated individual to speak into the depth camera. Upon the authenticated individual saying the challenge word, the AI algorithm may validate that it is the same person based on lip movement. At step 1850, if validated, the transaction may be completed. At step 1860, the customer may exit the store with goods.

As an optional process, upon validation success, the initial facial features captured during registration on the phone may be augmented with the facial features of the depth video, and a payment token tied to the authenticated individual may be passed to the payment network for completing the transaction.

Figure 19:
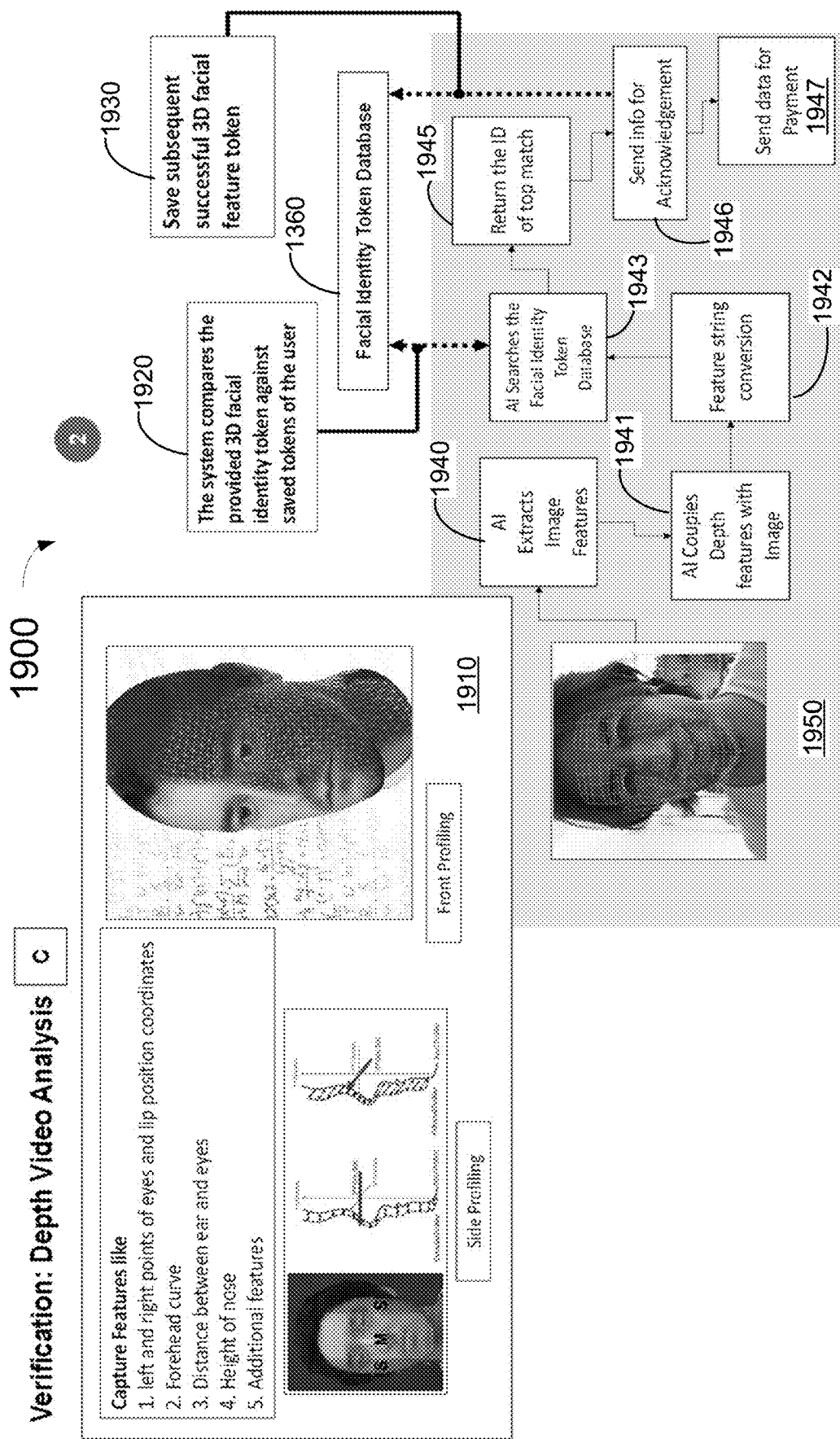
FIG. 19 is an example schematic diagram of a verification process by a facial recognition system, according to some embodiments.

FIG. 19 shows an example schematic diagram of a verification process 1900 by a facial recognition system, according to some embodiments.

As shown at step 1910, a video taken by a 3D depth camera may extract features such as the lateral and medial position coordinates of both eyes, the lateral-position coordinates of the lips, forehead curvature, the distance between an ear and the eyes, the height of nose, and other additional features.

At step 1920, the system may compare the provided 3D facial identity token against saved tokens of the authenticated individual from the facial identity token database 1360. Subsequent successful 3D facial tokens may be saved onto the facial identity token database 1360 at step 1930.

At step 1940, the AI algorithm may extract image features 1950 from a human face shown in the video. At step 1941, the AI algorithm may couple depth features with images, and at step 1942, perform a feature string conversion. At step 1943, the AI may search the facial identity token database 1360, and return the ID of the top match at step 1945.

At step 1946, information may be sent to acknowledge that a match is found for the 3D video; and at step 1947, the system may send payment data tied to the ID of the top match to complete the transaction.

In some embodiments, if an authenticated individual has already completed initial registration, and is at a POS with depth camera, the system may perform the following steps:
1. The system will validate that it's a person based the depth component of the depth video
2. The system checks the video taken by the depth camera and compares it to the fully-registered 3D facial depth identity token stored
3. (Optional)—Lip movement verification or OTP
4. Upon successful recognition, payment goes through
5. The successfully recognized 3D facial depth identity token is saved in the database for future use In some embodiments, if an authenticated individual is conducting e-commerce transactions without a depth camera, (e.g. the authenticated individual may be using a laptop or a tablet to make a payment using facial recognition) the system may perform the following steps:
1. After checkout, the system will record a video of and provide words for the authenticated individual to say out loud.
2. The system will check the video taken as well as track the lip movements and determine if the lip movements match the words provided.
3. (Optional)—OTP
4. Upon successful recognition, payment goes through.
5. The successfully recognized 2D facial depth identity and lip movement tokens are saved in the database for future use.

Figure 20:
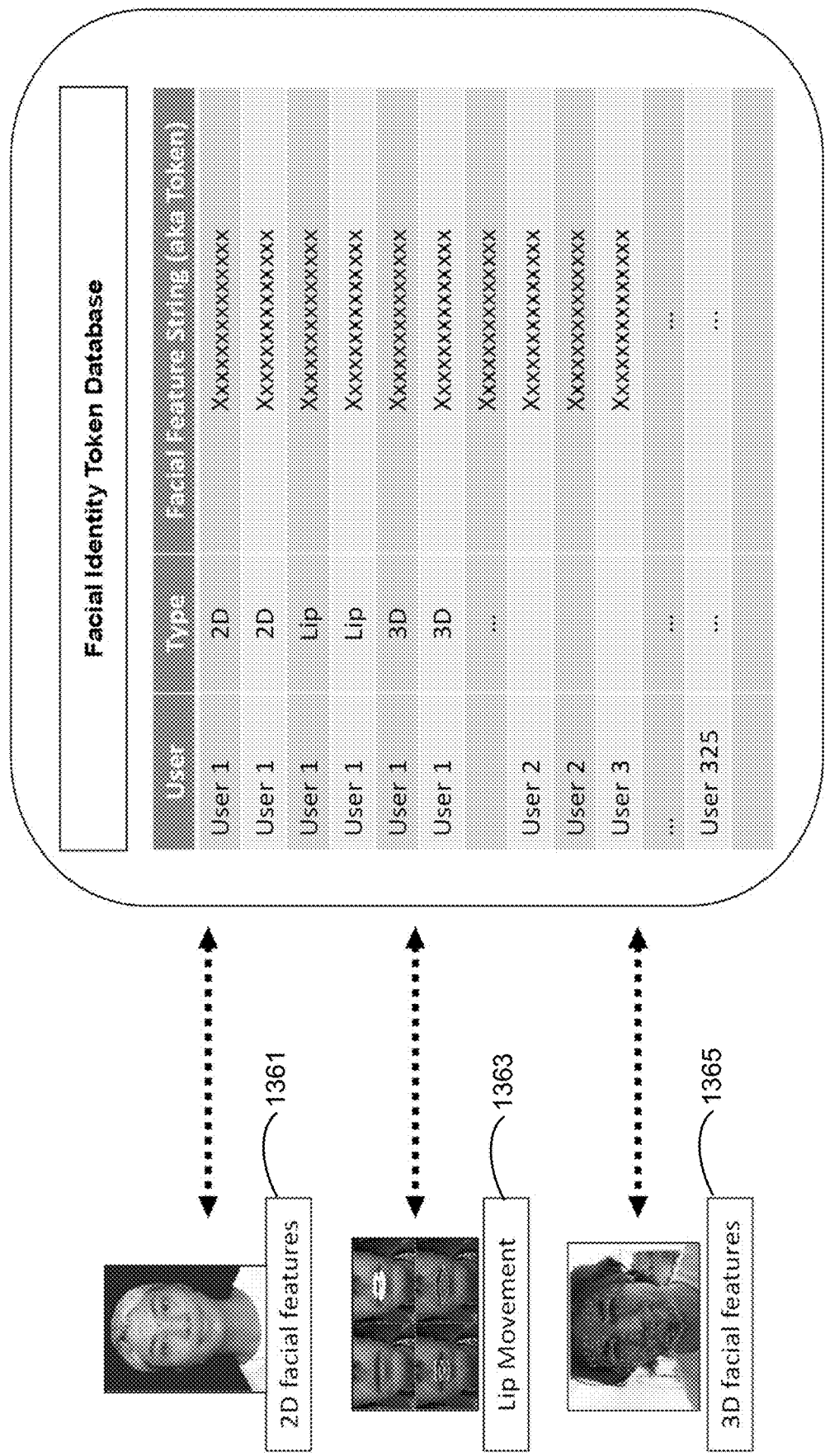
FIG. 20 is an example facial identity token database of a facial recognition system, according to some embodiments.

FIG. 20 shows an example facial identity token database 1360 of a facial recognition system, according to some embodiments.

The database may store 2D facial features 1361, lip movements 1363 and 3D facial features 1365. At registration via mobile devices or the first time using a depth camera, the extracted facial features (2D and/or 3D) or lip movements associated with specific phonemes may be converted into a string and recorded in the database under the authenticated individual.

At a POS with a depth camera or during e-commerce via a non-depth camera, the extracted facial features may be again converted into a string and a lookup of the facial identity token database is initiated to find the matching authenticated individual. The matched authenticated individual may have an attached payment token that is used to initiate a payment transaction.

In some embodiments, some or all of the facial recognition feature strings may be encrypted using a hardware security module.

FIG. 21 shows an example GAN neutral network algorithm 1350 implemented as part of a facial recognition system, according to some embodiments.

GAN 1352 is a deep learning algorithm that may be trained to upscale the frames of a video. Advantages of GANs include, for example, low bandwidth usage, minimal or no lag or interruptions, and better image reconstructions.

In some embodiments, a browser plugin that can use the algorithm to generate and render a better quality video. The image and video quality of offline samples may be enhanced by implementation of GANs within the facial recognition system. Runtime video may also be enhanced in a GPU accelerated environment. (e.g., ATMs). Human tracking and human-object interaction may be implemented in these enhanced videos. (e.g., surveillance video logs from cameras and finding unusual activity).

Figure 22:
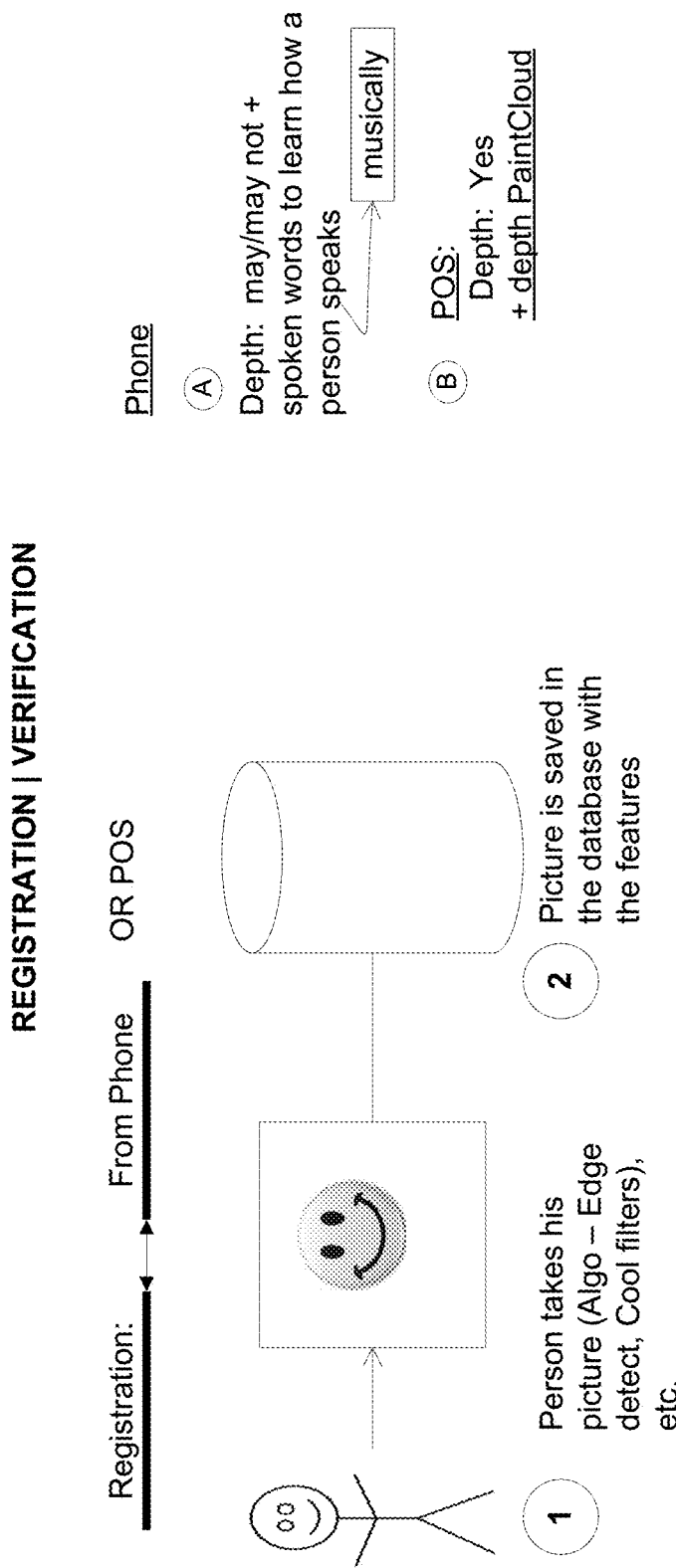
FIG. 22 is an example registration process using the example facial recognition system, in accordance with one embodiment.

FIG. 22, similar to FIG. 2, shows an example registration process using the example facial recognition system, in accordance with one embodiment.

Figure 23:
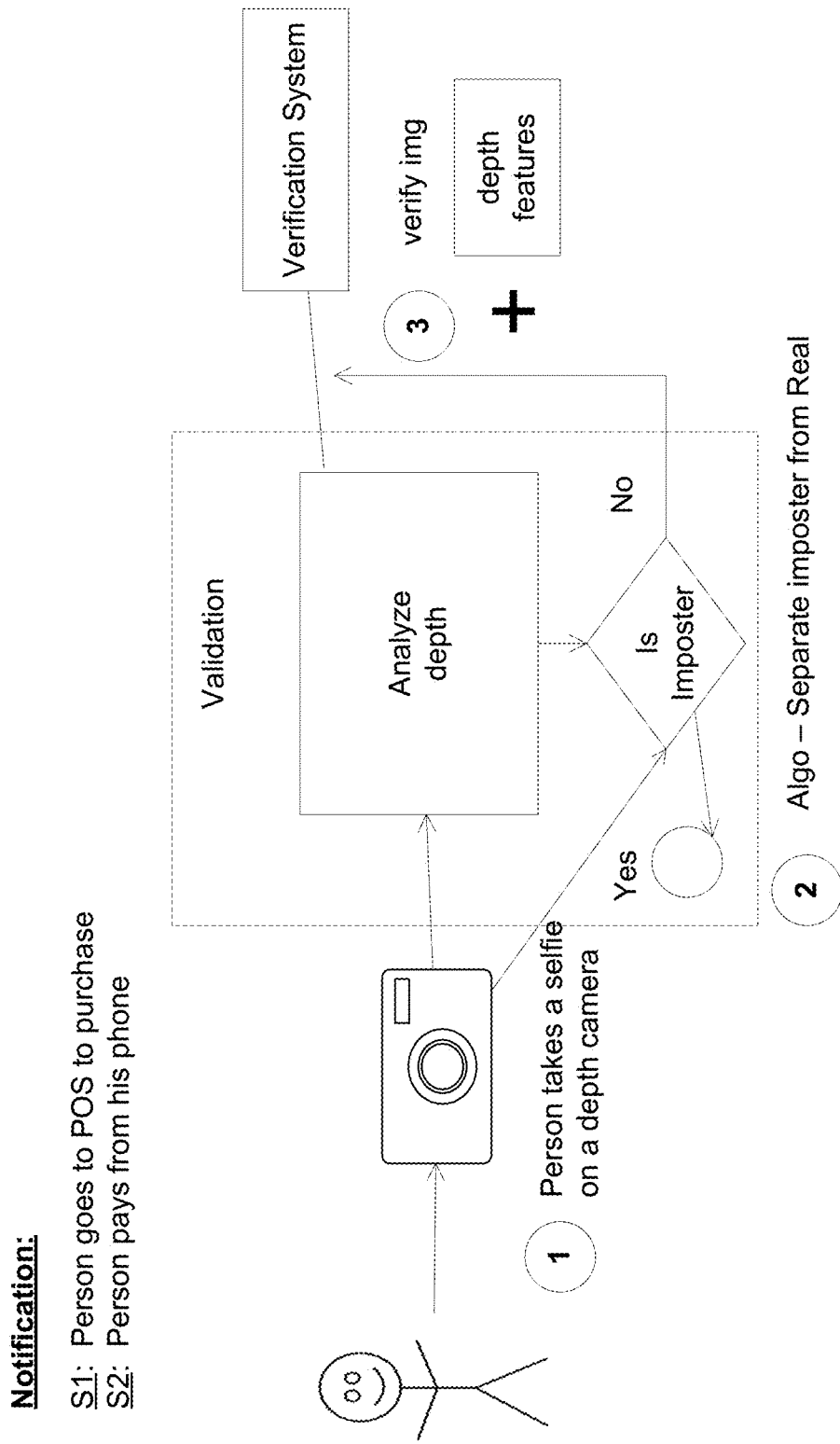
FIG. 23 is an example authenticated individual verification process using the example facial recognition system, in accordance with one embodiment.

FIG. 23, similar to FIG. 3, shows an example authenticated individual verification process using the example facial recognition system, in accordance with one embodiment.

Figure 24:
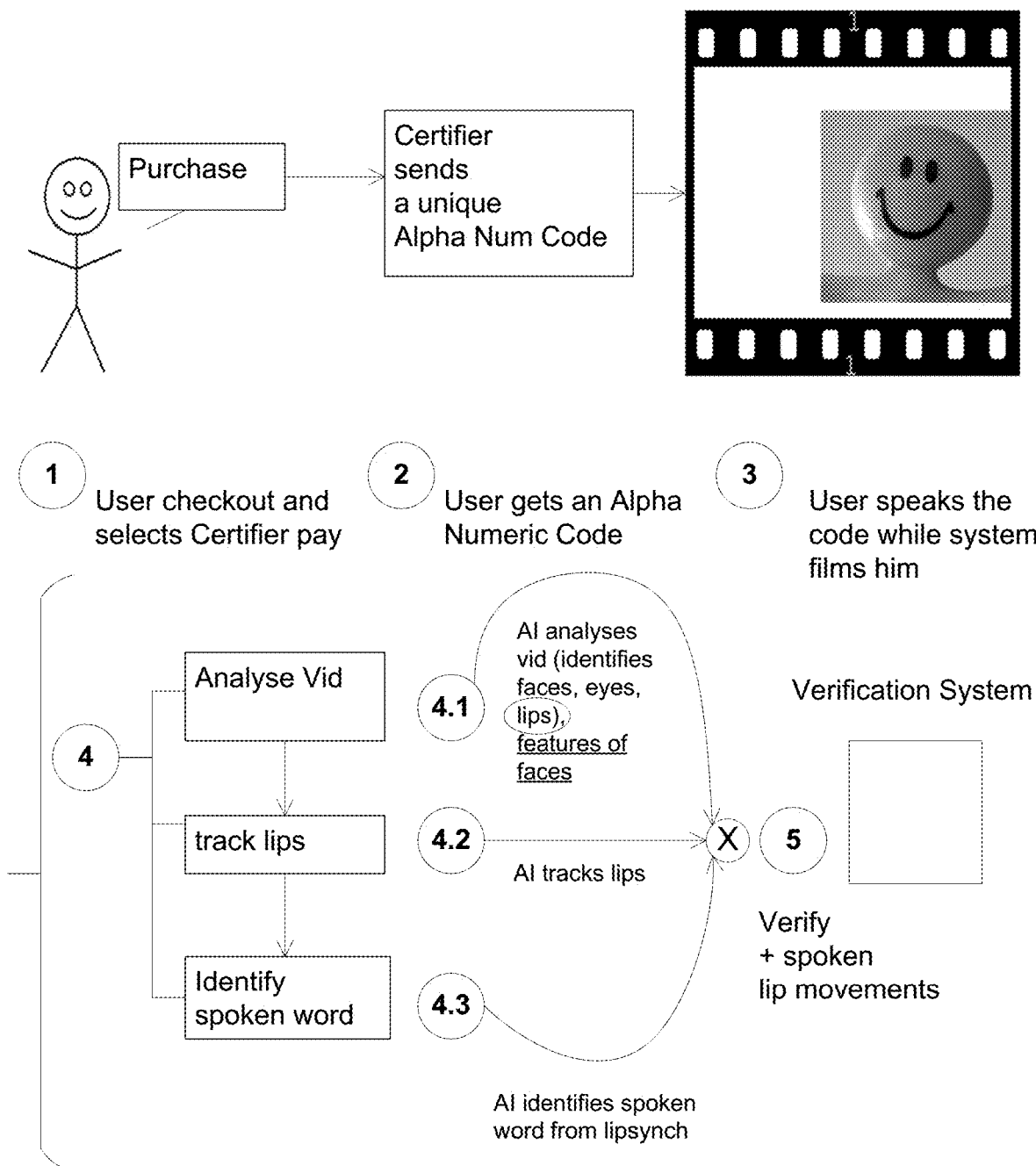
FIG. 24 is another example authenticated individual verification process using the example facial recognition system, in accordance with one embodiment.

FIG. 24, similar to FIG. 4, shows another example authenticated individual verification process using the example facial recognition system, in accordance with one embodiment.

Figure 25:
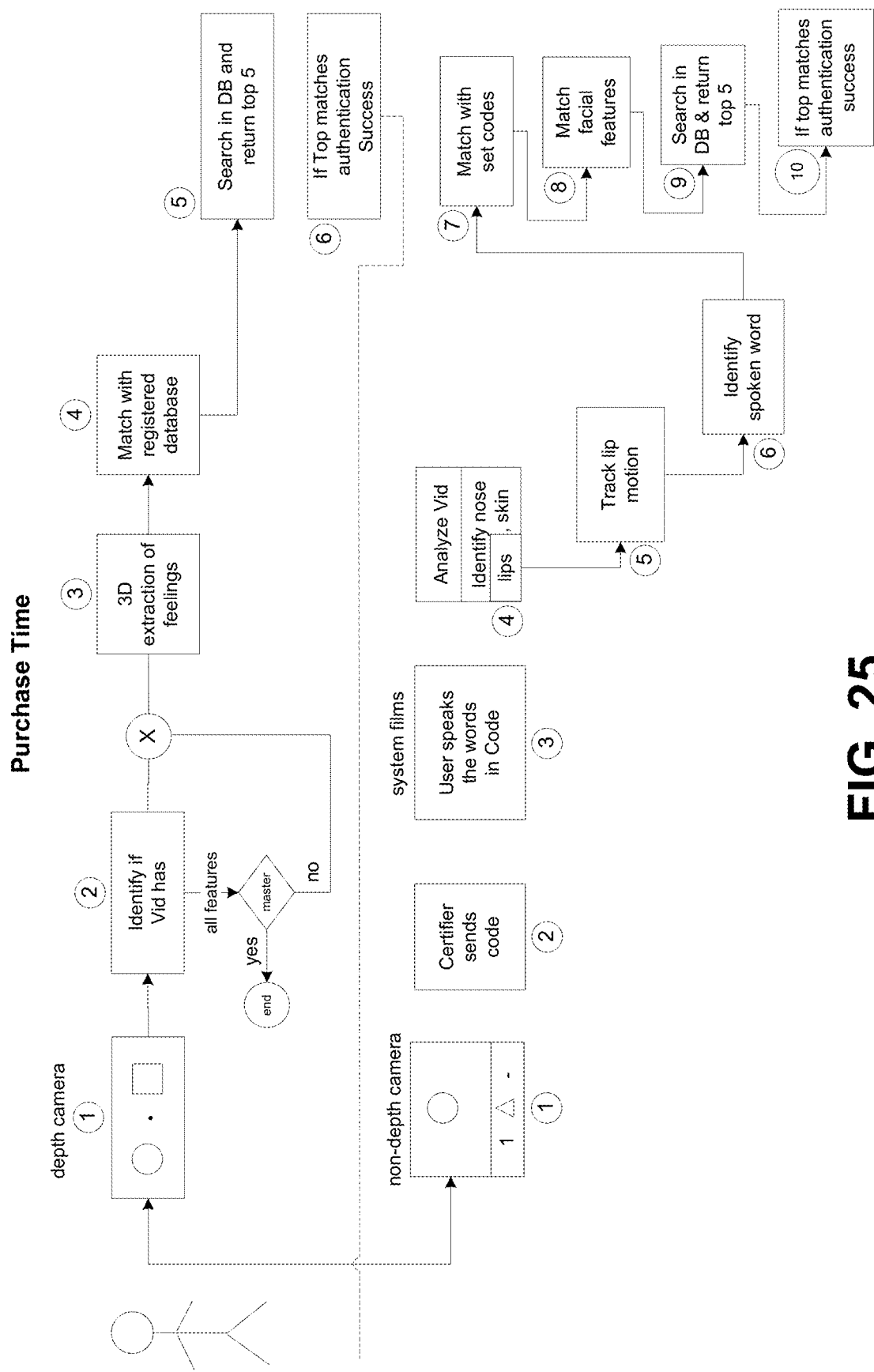
FIG. 25 is another example process for authenticated individual registration and verification, in accordance with one embodiment.

FIG. 25, similar to FIG. 5, shows an additional example process for authenticated individual verification, in accordance with one embodiment.

Usage Examples

A series of different implementation use cases are described in accordance with the method diagrams of FIGS. 34-37.

These examples are provided as non-limiting examples, and describe how aspects described in various embodiments herein operate in concert to implement practical devices that are utilized in regard to authentication using secure tokens.

The authentication utilizes multiple technologies to implement an improved authentication process where an individual's personal information is encapsulated into transformed digitally signed tokens, which can then be stored in a secure data storage (e.g., a "personal information bank") 108.

The digitally signed tokens can include blended characteristics of the individual (e.g., 2D/3D facial representation, speech patterns) obtained, for example, from a video processing unit 111, a facial recognition unit 117, etc. that are combined with digital signatures obtained from cryptographic keys (e.g., private keys) associated with corroborating trusted entities (e.g., a government, a bank) or organizations of which the individual purports to be a member of (e.g., a dog-walking service).

A separate secure data storage 110 can store a private key associated with the individual on the individual's mobile device 100, which is utilized with a paired public key for validating and signing tokens that are provided from the mobile device 100.

The digital signatures stored on data storage 108, for example, can then be used for validation against public keys associated with the corroborating trusted entities or the organizations of which the individual purports to be a member of (e.g., banks, hospitals, governmental organizations). In some embodiments, devices that are interoperating with the mobile device 100, such as door lock controllers, bike rental terminals, etc., may store a series of public keys on local memory such that the public keys can be used to validate signatures from the corroborating trusted entities. For example, the bike rental terminals can store the public keys of a bank that can be used to establish veracity of tokens provided by mobile device 100, in accordance with embodiments described herein.

The secure data storage storing the digitally signed tokens can, for example, be resident or coupled with a mobile computing device of the individual, such that when one or more data sets representing one or more biometric verification credentials are received, for example, from a 2D facial picture from a camera of mobile device 100, or challenge words spoken on a recorded audio file captured on a microphone of mobile device 100, the data subset representing a constrained set of features identifying an individual can be extracted. The size of the constrained set of features may be modified, for example, to modify levels of security or to ensure ease of processing where computing resources are limited (e.g., a slow mobile device).

The constrained set of features can be used for a one-way transformation (e.g., based on a cryptographic hash) in combination with one or more cryptographic keys to generate a digitally signed token, and the digitally signed token can be stored in a data storage 108 resident on the mobile computing device (e.g., a secure enclave or accessible only through a set of secure processing components and/or pathways).

The digitally signed token, when processed by a third party computing device, such as a bike rental terminal, a door lock, indicates that one or more characteristics of the individual are verified in accordance with one or more parties associated with each cryptographic key of the one or more cryptographic keys, and in some embodiments, the digitally signed token can be compared against captured information by the third party computing device to assess veracity as between the captured information and the digitally signed token.

The comparison and provisioning of the digitally signed token may be using the U-Prove mechanism, in some embodiments. Other types of analyses are possible, and U-Prove is preferred in some embodiments, as the token does not need to be transmitted back to a central authority.

For example, a facial recognition scanner can be provided in the context of a bike-sharing or a smart door lock, which takes a picture or a 3D representation of a face of the individual.

This picture or the 3D representation is converted into a feature representation. The individual then utilizes the mobile device to adduce the digitally signed token as a "deposit token", which is then received in relation to a challenge request mapping the picture or a 3D representation of a face of the individual against the available characteristics of the digitally signed token.

FIG. 34 is an example method diagram of an enrollment example, according to some embodiments.

In this example, the enrolment includes a "basic enrolment" that may be suitable for convenient, low security tokens, for example, providing access to a gym. A mobile application resident on mobile device 100 takes a picture of an individual's face, which is then processed on video processing unit 111 and an extraction is performed to, for example, extract a 256 dimension vector from the facial imprint. Accordingly, the features are extracted and a token is generated, for example, signed using the private key stored on secure data storage 110. When the individual seeks access to the gym, the mobile device 100 can provide the token through a wireless transmission method and a corresponding terminal or scanner (e.g., a facial scanner) can take the token, compare it to a captured face, for example, using a neural network, and admit entry if a sufficiently high confidence score is achieved.

Additional security can include challenge words or phrases, which are also combined and blended into the token. Multiple tokens can be generated and directed to different aspects of the characteristics associated with the individual (e.g., device type "Android", has app "Minesweeper").

FIG. 35 is an example method diagram of an enhanced enrollment example, according to some embodiments. In this example, the individual presents him/herself at a higher security location (virtual or physical) and provides proof of identity. The identifier reviews the identification and based, for example, on a picture taken at the location, a token is generated and stored in the personal information bank (e.g., 108).

The token is signed with one or both of the corroborating entity's private key and/or the individual's private key on secure data storage 110. The token can then be provided to other parties to validate characteristics of the individual, and a challenging entity can further validate the corroboration of the trusted entity with the public key associated with the trusted entity. This is particularly, useful, for example, in relation to higher security enrollments, such as health and safety, personal space access, and government/business critical functions.

The trusted entity can also track other information in tokens that are validated by the trusted entity, such as validating whether the individual is of drinking age, an income level associated with the individual (e.g., has >$5K USD per year in income), whether the individual has car insurance and/or how long the car insurance is valid for, etc. These tokens may include only the information that is necessary for meeting a validation challenge, as opposed to providing other information, such as policy numbers, an actual age, etc. The token can also be used to validate aspects of the individual, such as speech patterns, that a particular face template corresponds to the picture taken at the trusted facility, etc. For validation and to meet a challenge request, the individual may select (or the mobile device 100 may select) a subset of tokens that together meet the challenge request (as opposed to providing all tokens).

Figure 37:
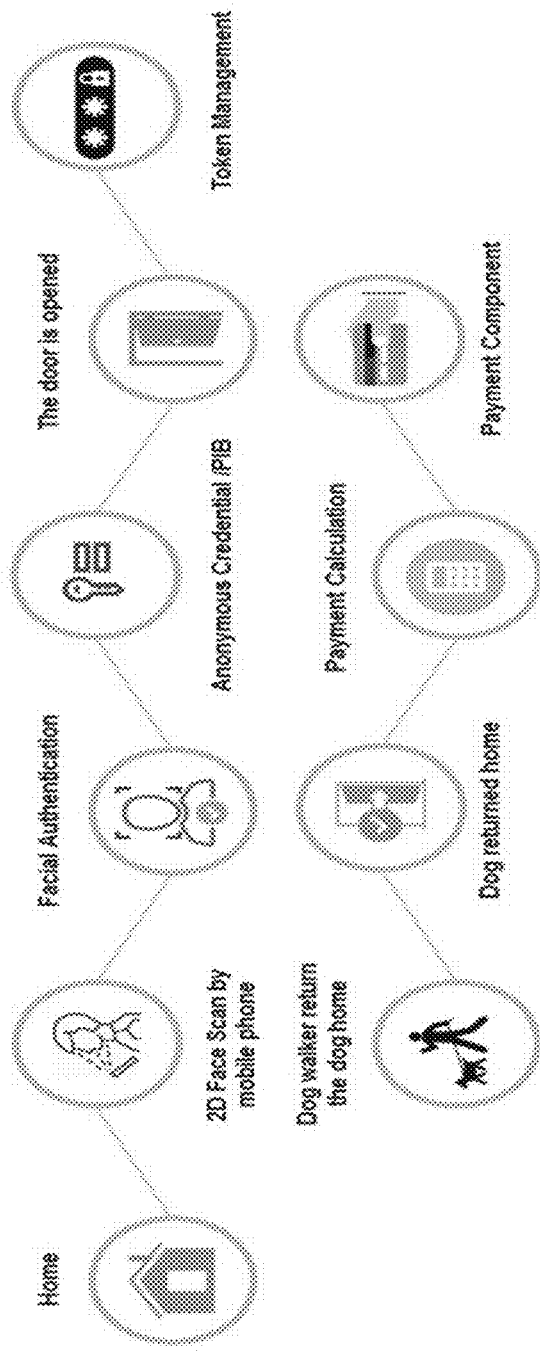
FIG. 37 is an example method diagram of a service provisioning example, according to some embodiments.

FIGS. 36 and 37 are directed to examples where the token is used for commercial transactions.

In these examples, if the third party device is satisfied that the captured picture or a 3D representation of a face of the individual is corroborated by the available characteristics of the digitally signed token, the third party device may then provision access (e.g., unlock a bicycle or unlock a door).

FIG. 36 is an example method diagram of a touchless rental bike example, according to some embodiments.

In this example, a bike is selected at a station, and the station may have a terminal having a station camera. The face of the renter is scanned, and the token is provided for verification by the terminal (e.g., through a request process where a request screen is prompted and an affirmative action causes the mobile device 100 to provision one or more tokens). The verification allows the terminal to assess that the individual is indeed present at the location prior to starting the bike rental, and other tokens or other aspects can be validated. For example, the bike rental may require that the person has a signed token signed either by the bike rental company (e.g., Bikes-r-us signed your token so it can correspond to a valid account), or a financial institution that indicates that the individual has insurance and has an income >5K USD/year so that a damage deposit can be waived.

A new tracking token may be generated that tracks when an access was provisioned, and in response to a signal indicating an event at a future time (e.g., when bicycle was returned), the new tracking token may be used to process a financial transaction in relation to the event (e.g., pay for the bike rental for a duration of time).

FIG. 37 is an example method diagram of a service provisioning example, according to some embodiments. The service being provided is an example dog-walking service. In this example, similarly, the face of the dog walker is scanned, and the token is provided for verification by the terminal. The verification allows the terminal to assess that the individual is indeed present at the location prior to starting the dog walking, and further, a public key can be compared against to ensure that the dog walker is employed by a dog walking company. Location tracking can further be corroborated against GPS coordinates, QR codes provided on a door, etc.

When access is provisioned by unlocking the door, the dog walking transaction begins and similarly, a new tracking token may be generated that tracks when an access was provisioned, and in response to a signal indicating an event at a future time (e.g., when dog was returned), the new tracking token may be used to process a financial transaction in relation to the event (e.g., transfer funds to the dog walker or mark the transaction complete so the dog walker is paid).

Figure 38:
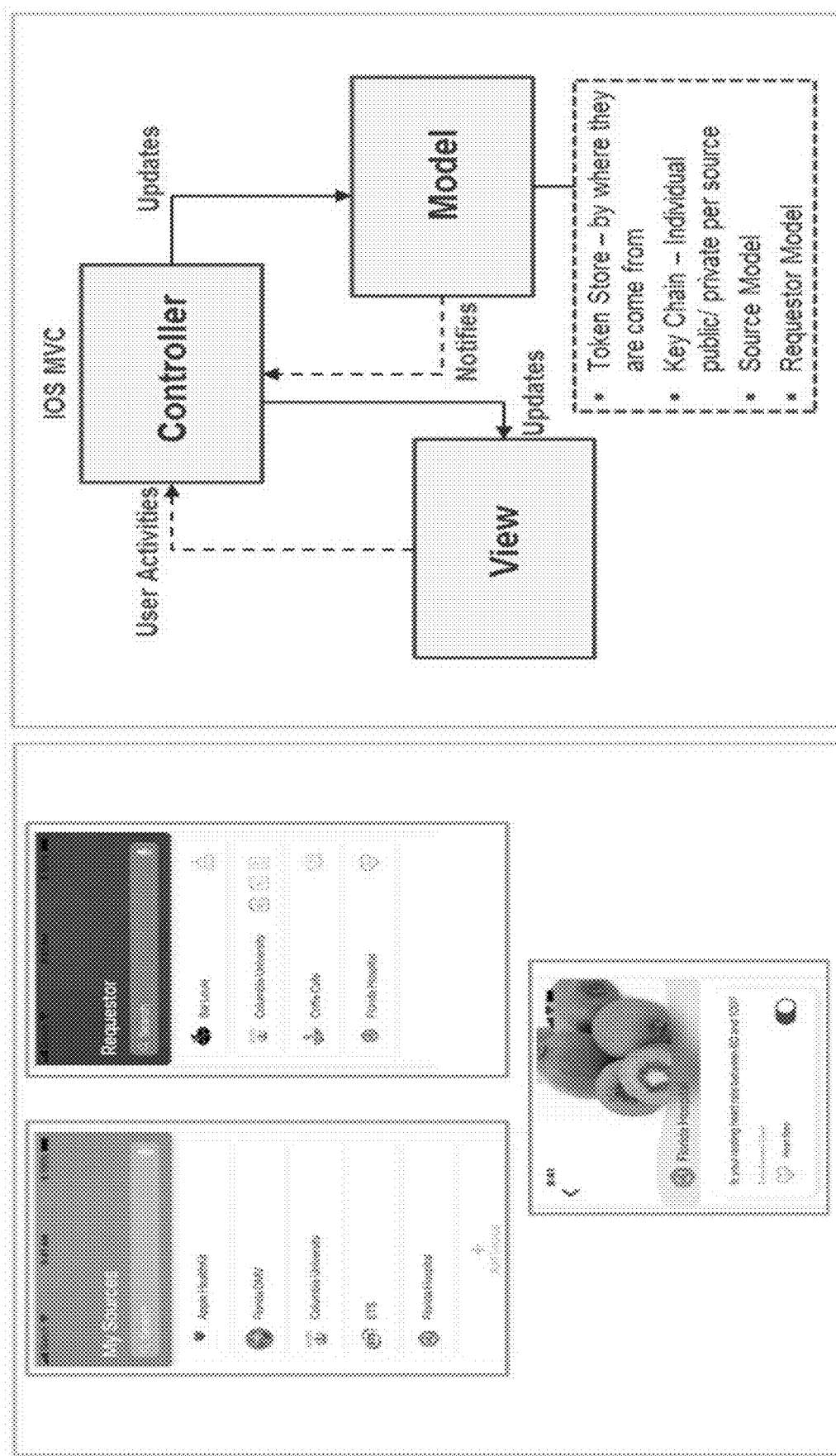
FIG. 38 is an example architecture for controlling an authenticated individual interface, according to some embodiments.

FIG. 38 is an example architecture showing a model-view-controller that is used as a framework for controlling an authenticated individual interface on mobile device 100 for interacting with requestors for the token. In particular, the controller interacts with authenticated individual interface elements present on device 100 to determine which tokens or which aspects of tokens to present. The controller of the architecture of FIG. 38 controls interfaces, for example, provided in FIGS. 39-54.

Figure 39:
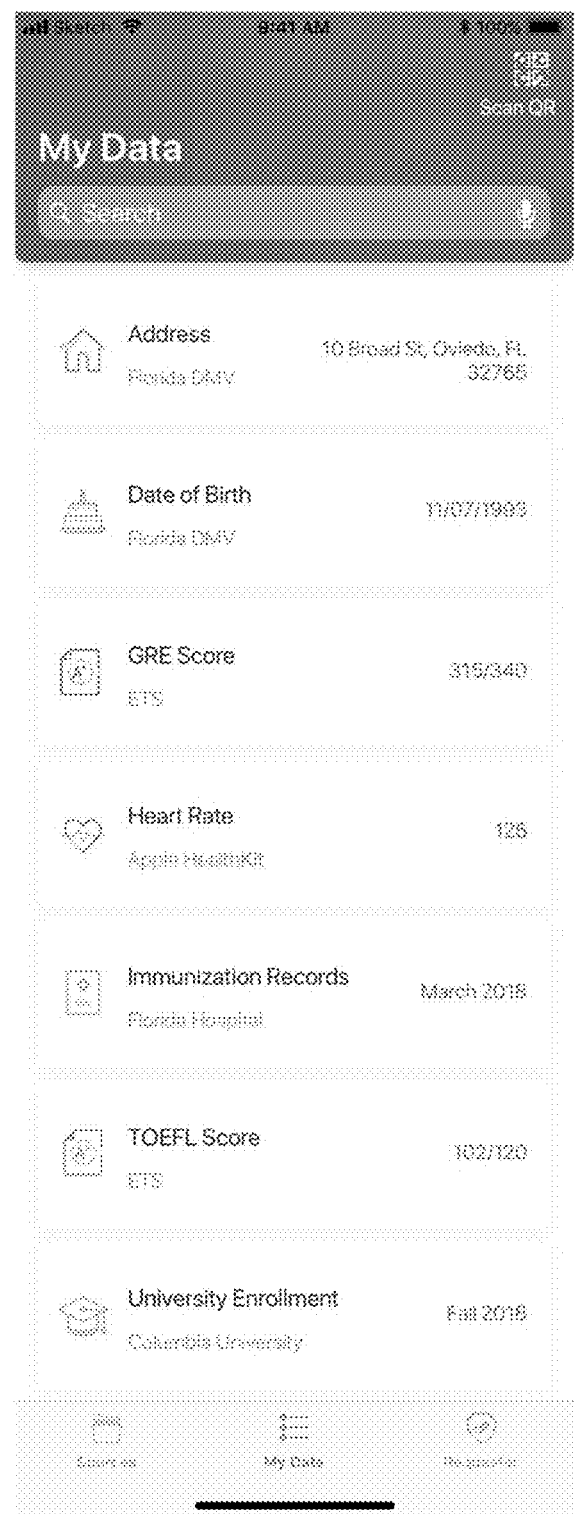
FIGS. 39-54 are screenshots of example interfaces screens on a mobile device in accordance with a series of interactions whereby the digitally signed tokens are utilized in validating characteristics of the individual, according to some embodiments.
Figure 40:
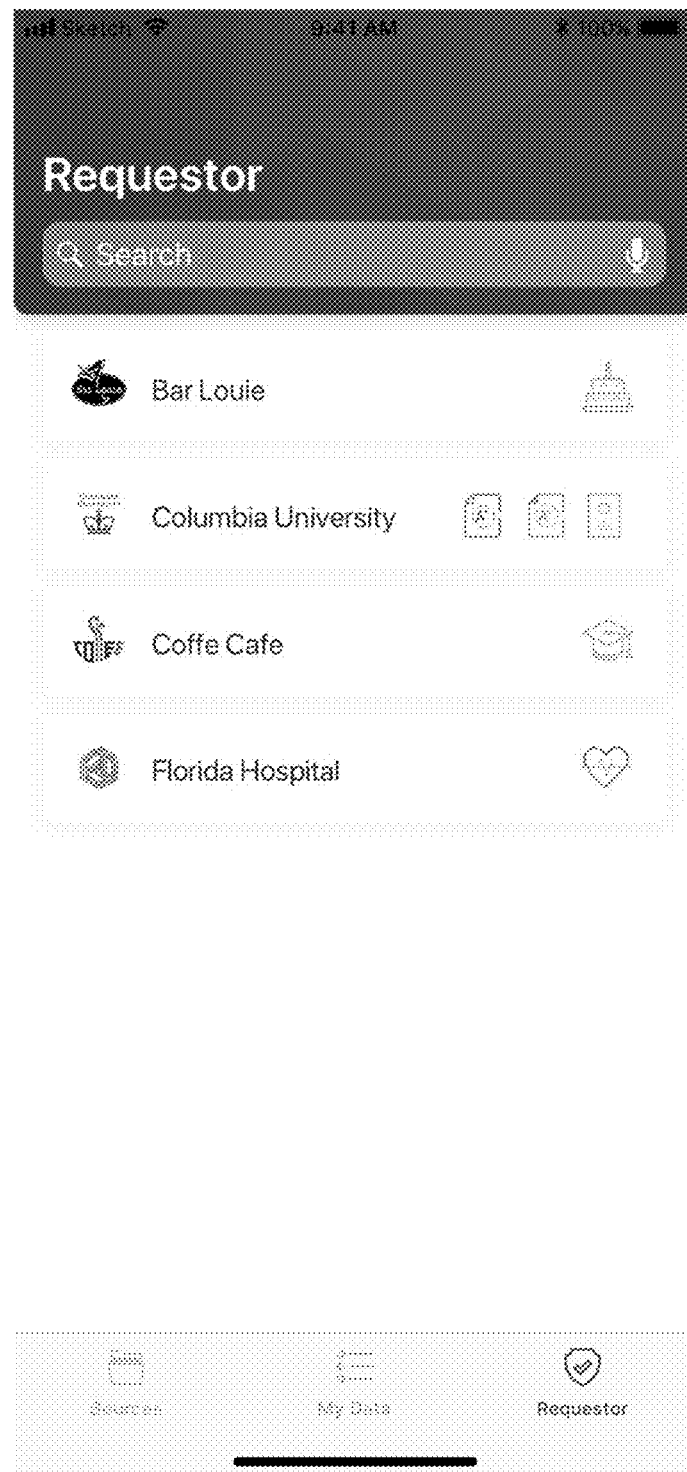
Figure 41:
Figure 42:
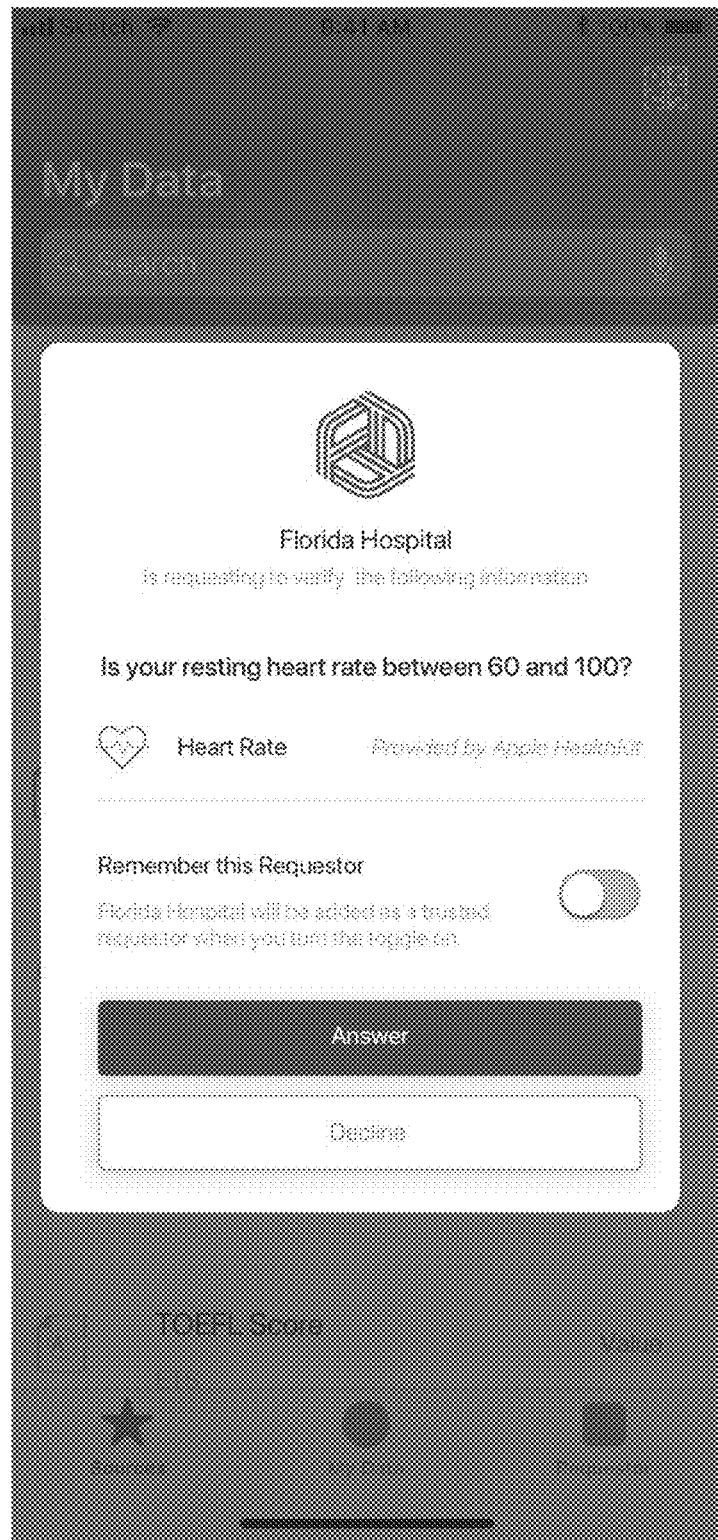
Figure 43:
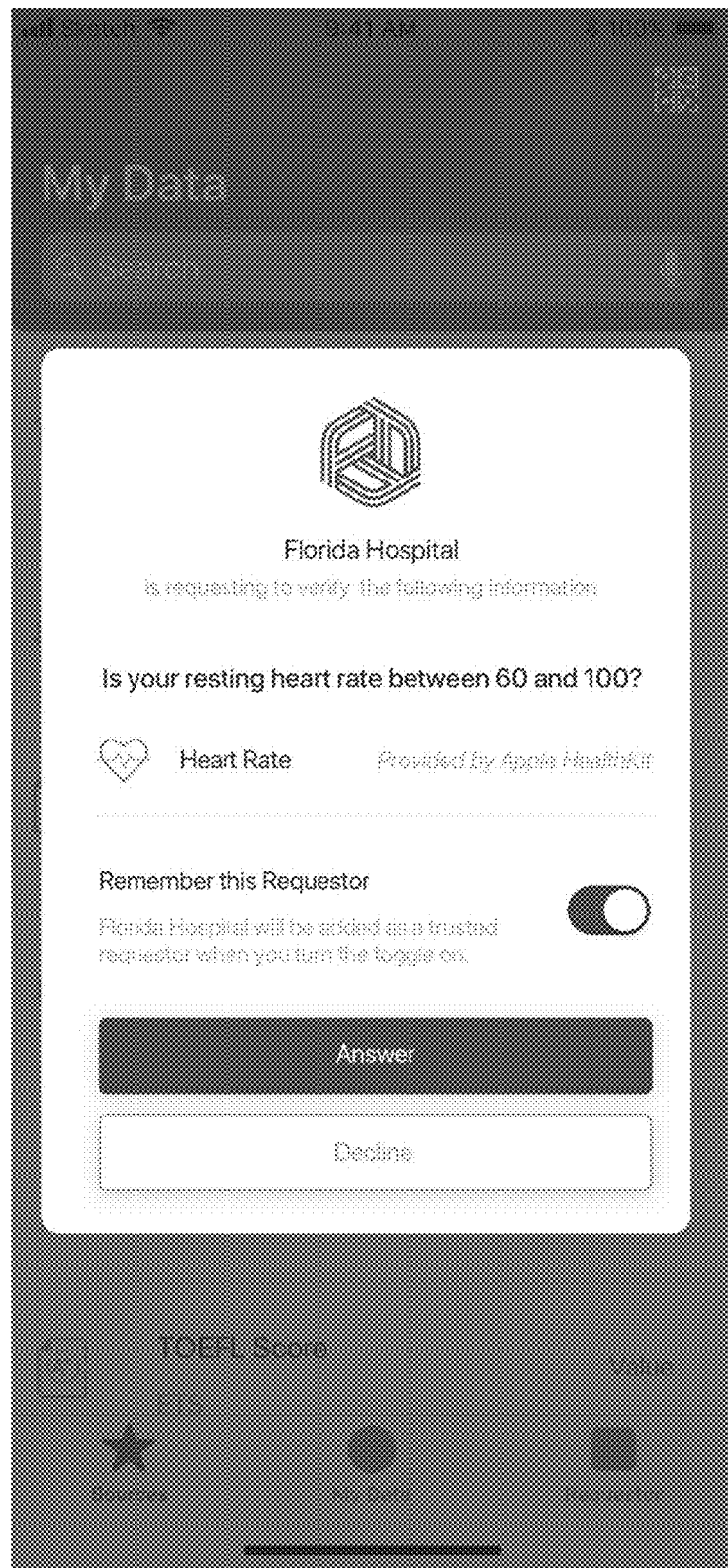
Figure 44:
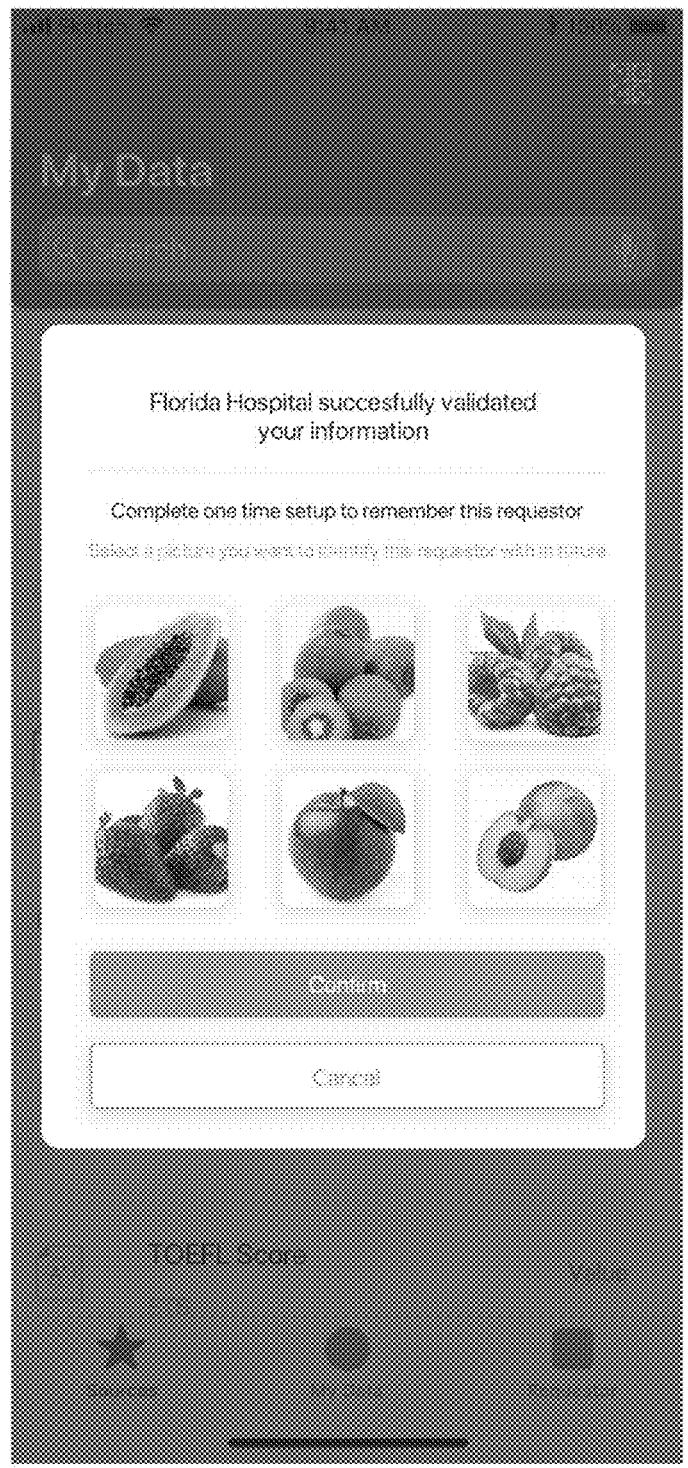
Figure 45:
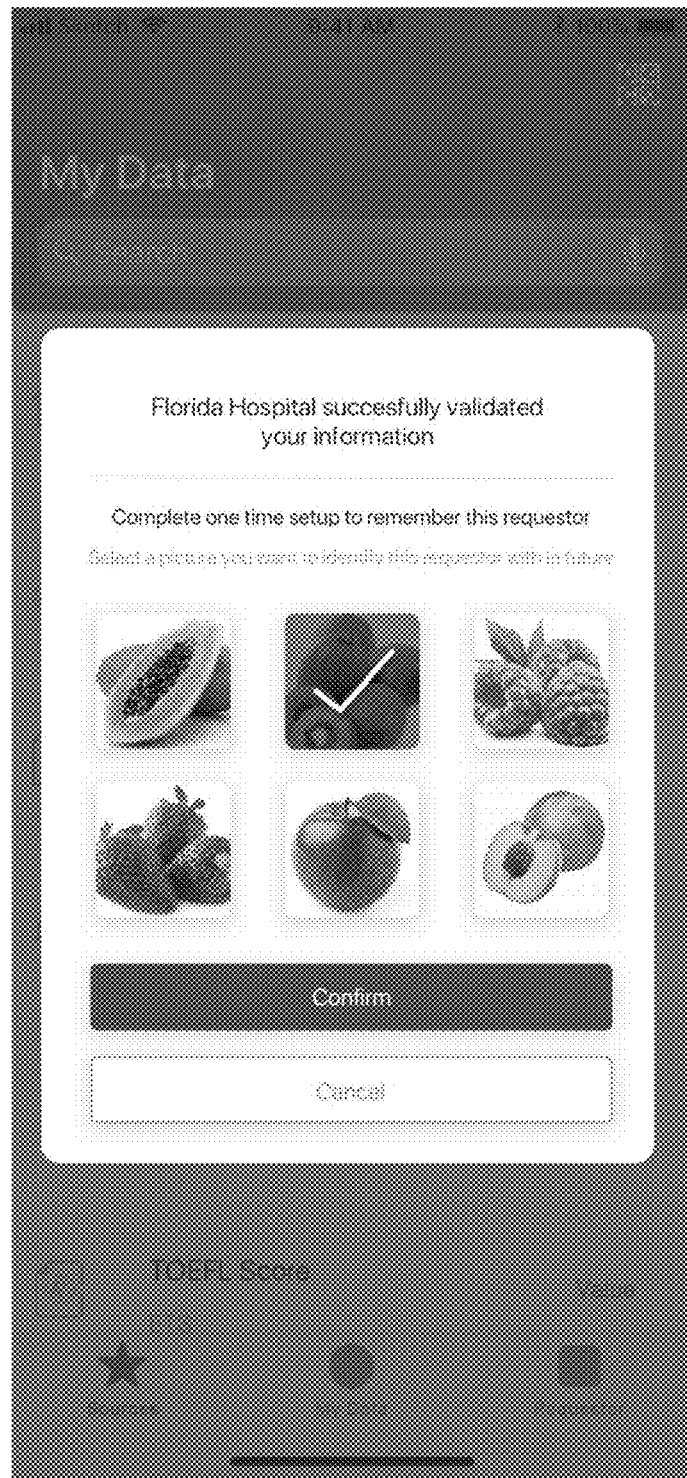
Figure 46:
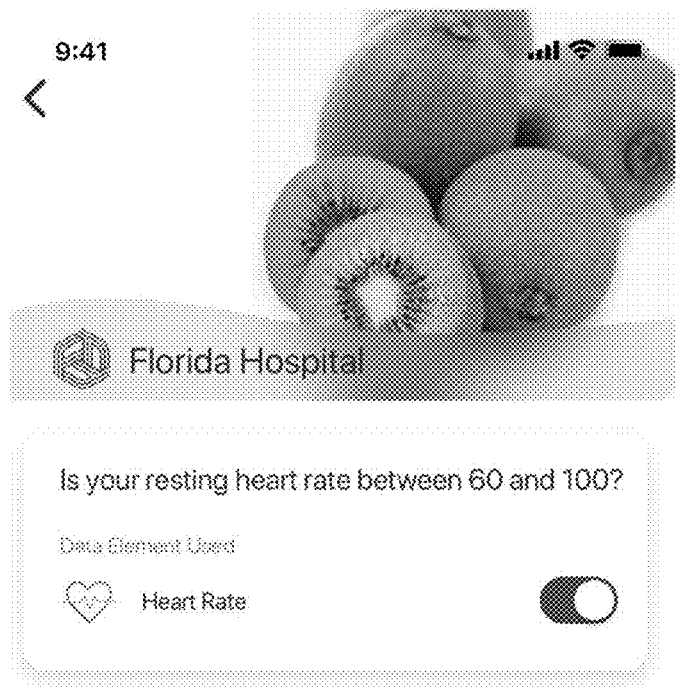
Figure 47:
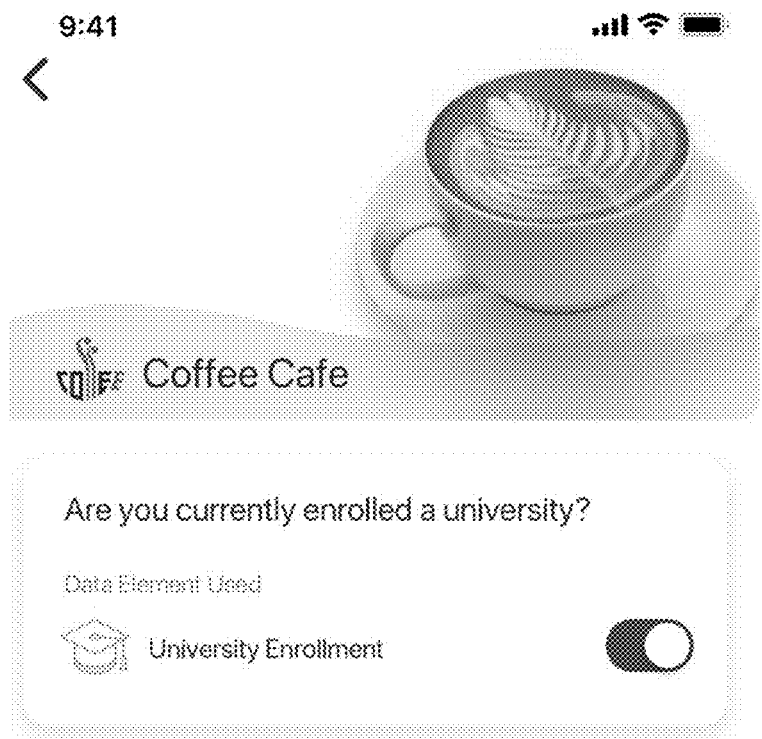
Figure 48:
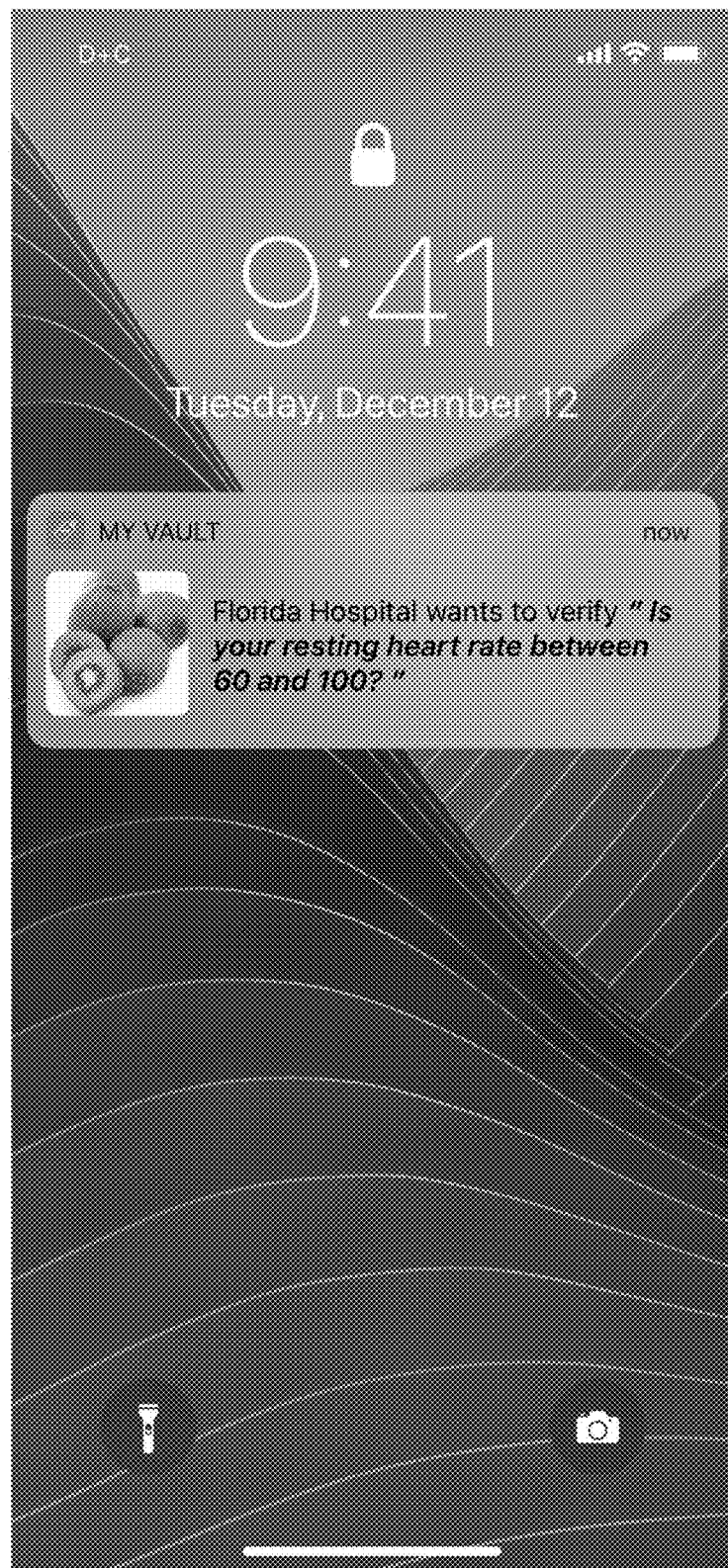
Figure 49:
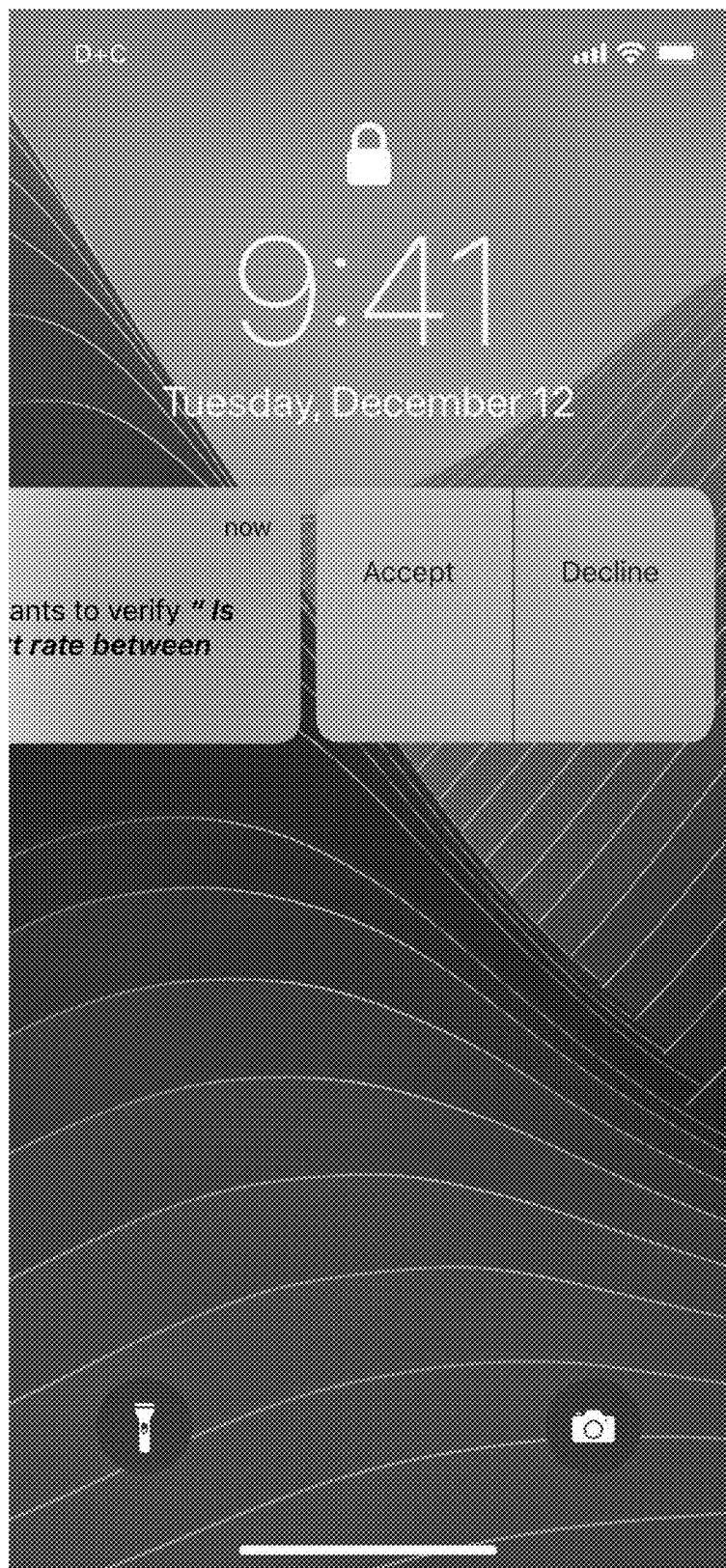
Figure 50:
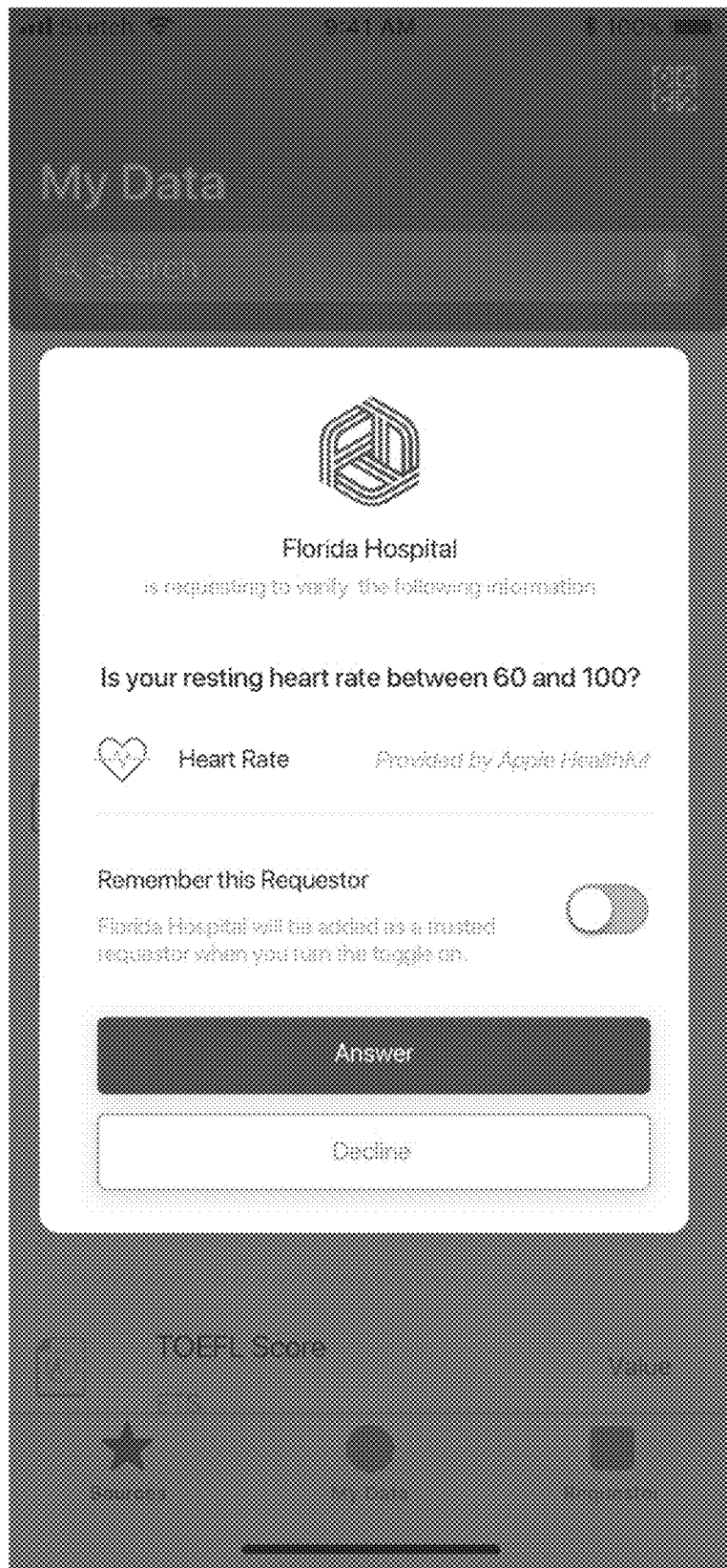
Figure 51:
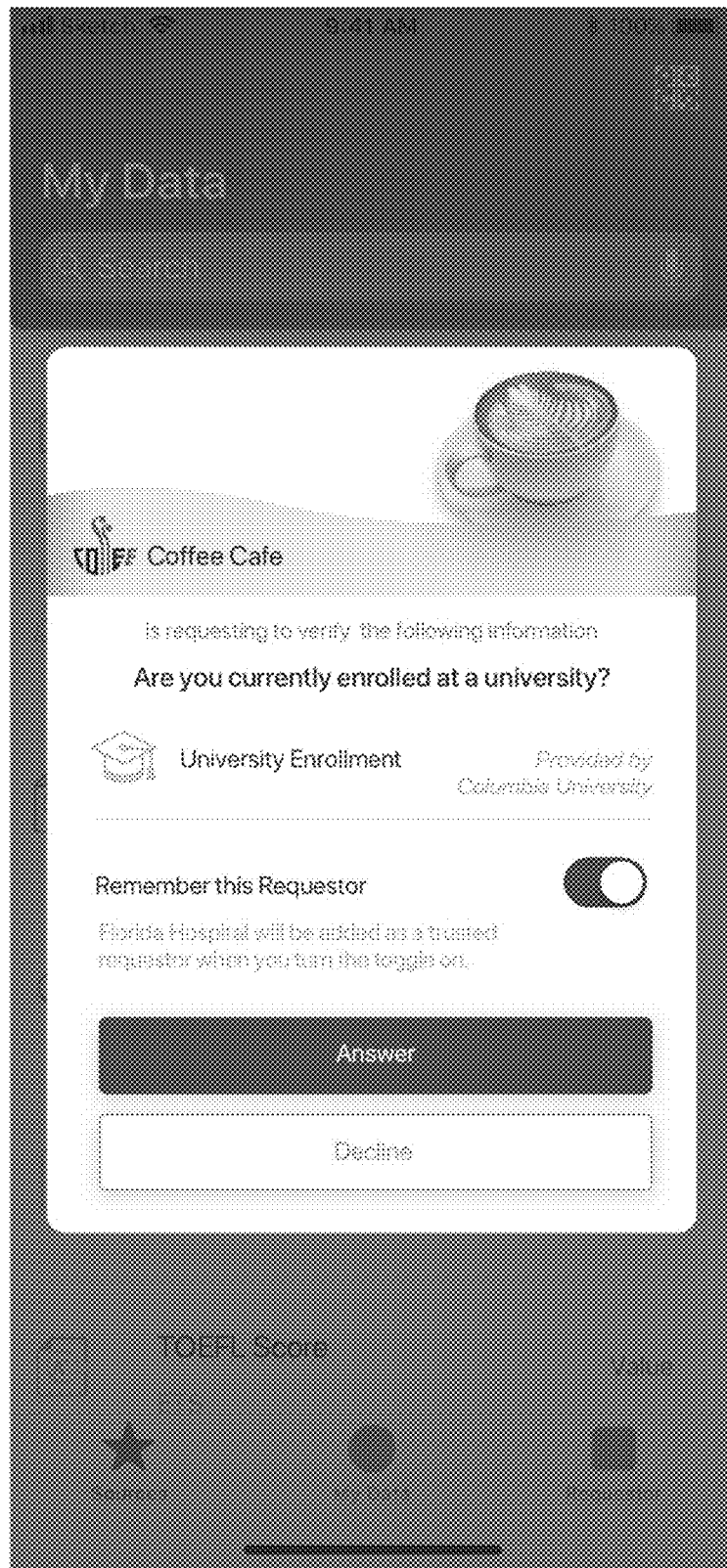
Figure 52:
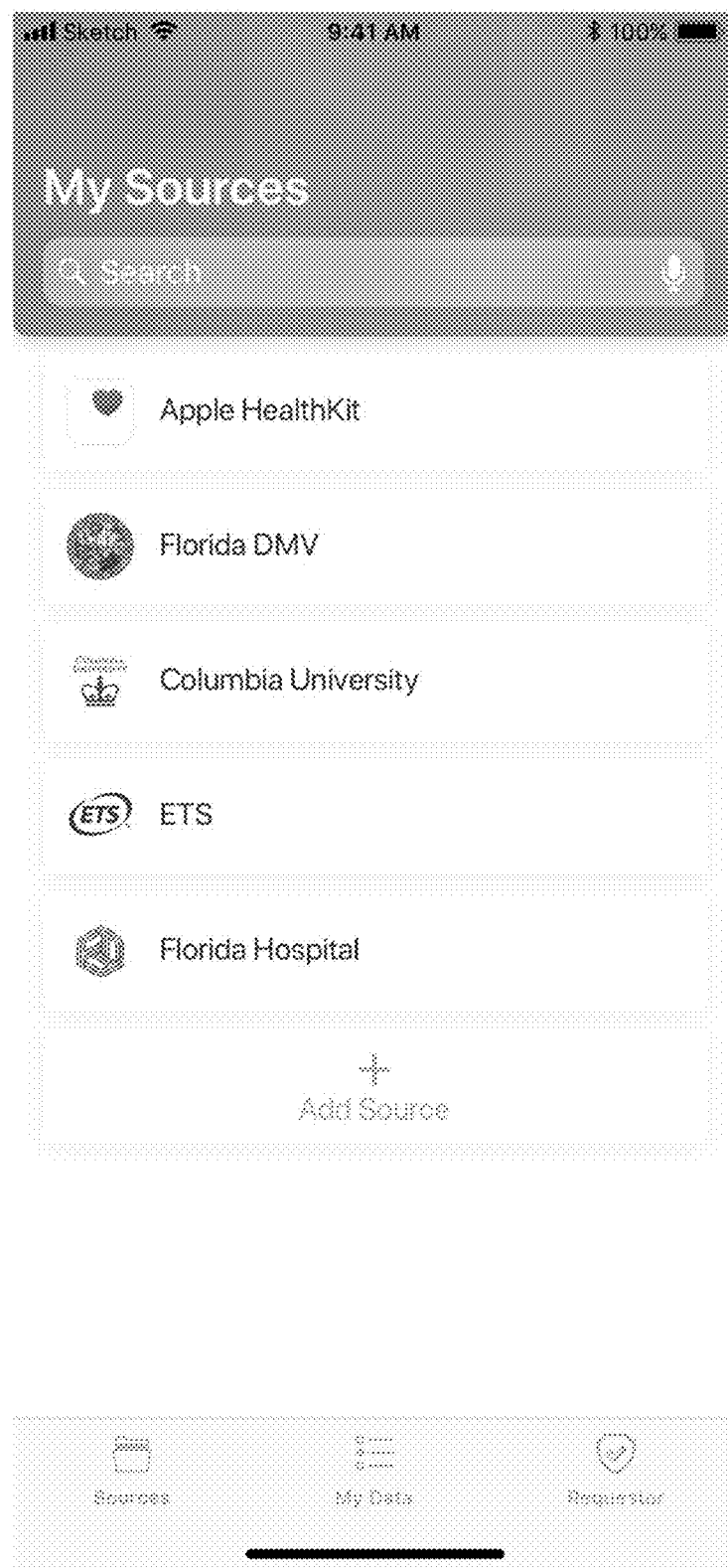
Figure 53:
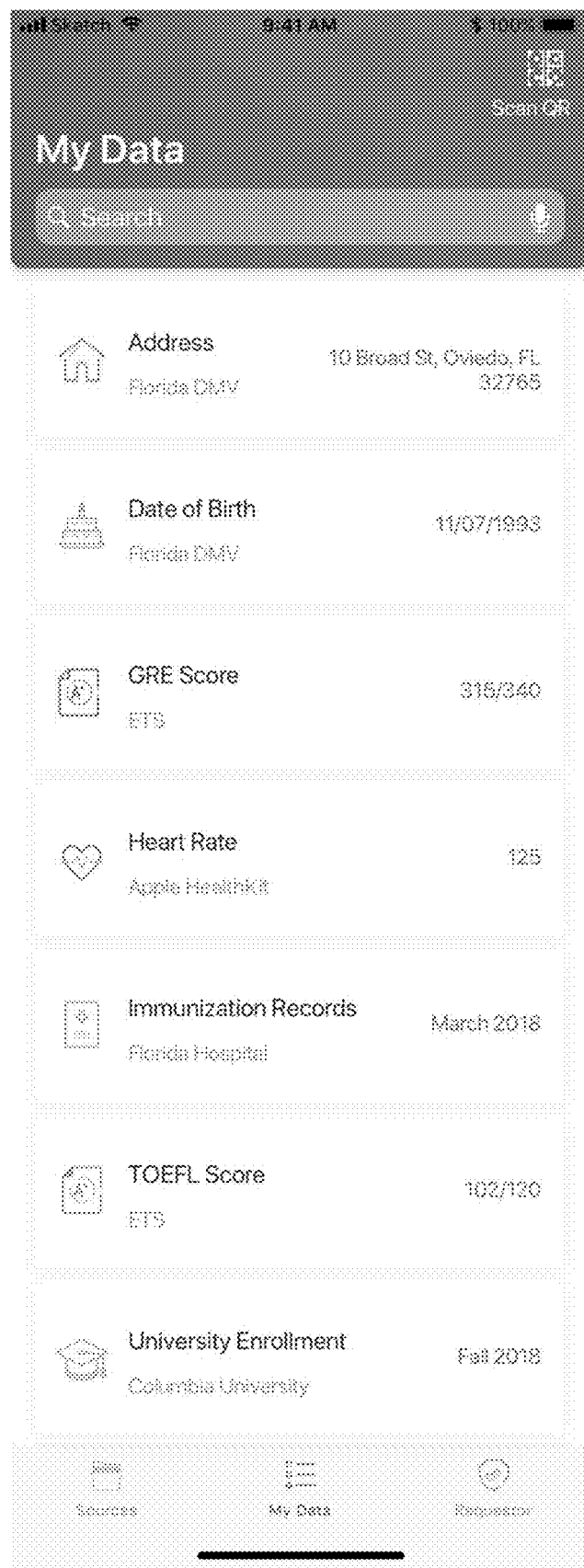
Figure 54:
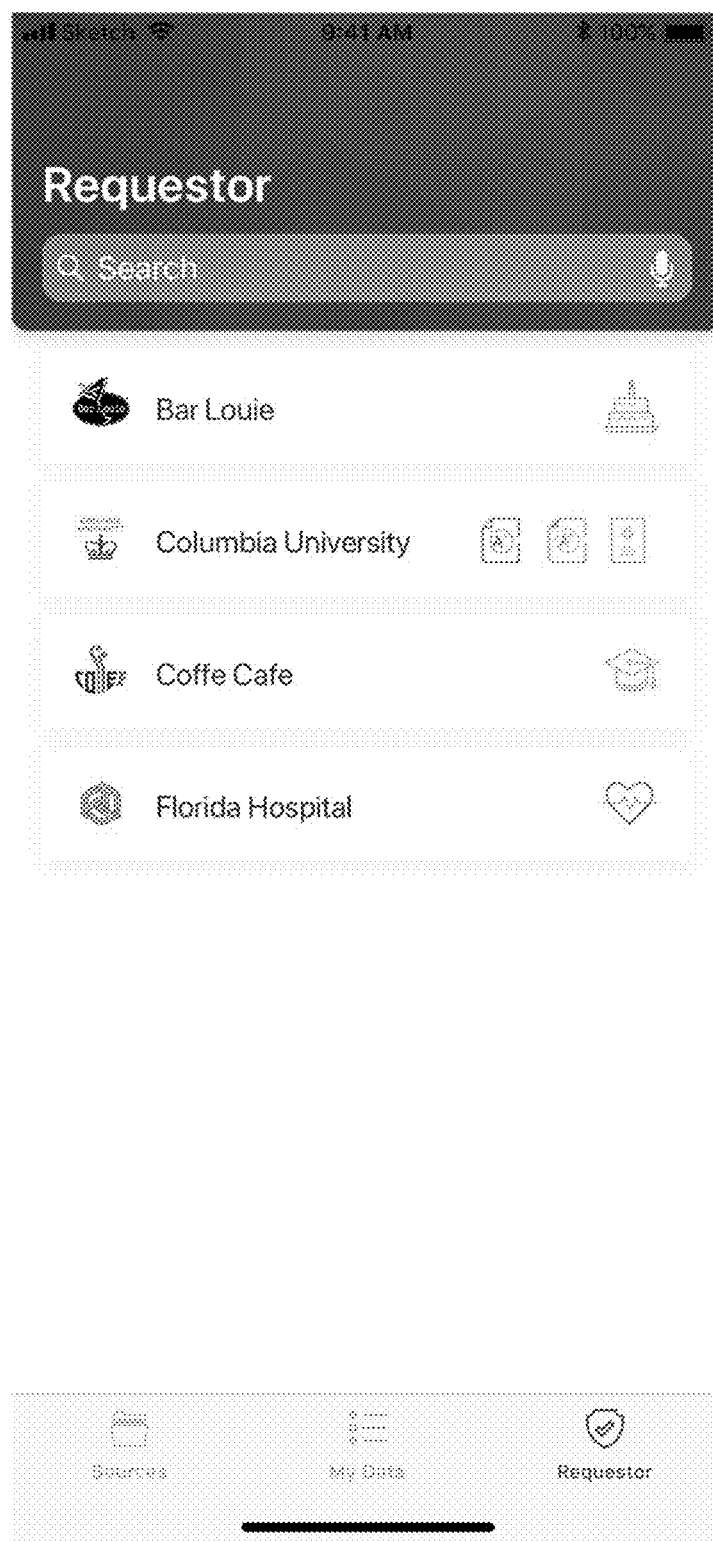
Figure 57A:
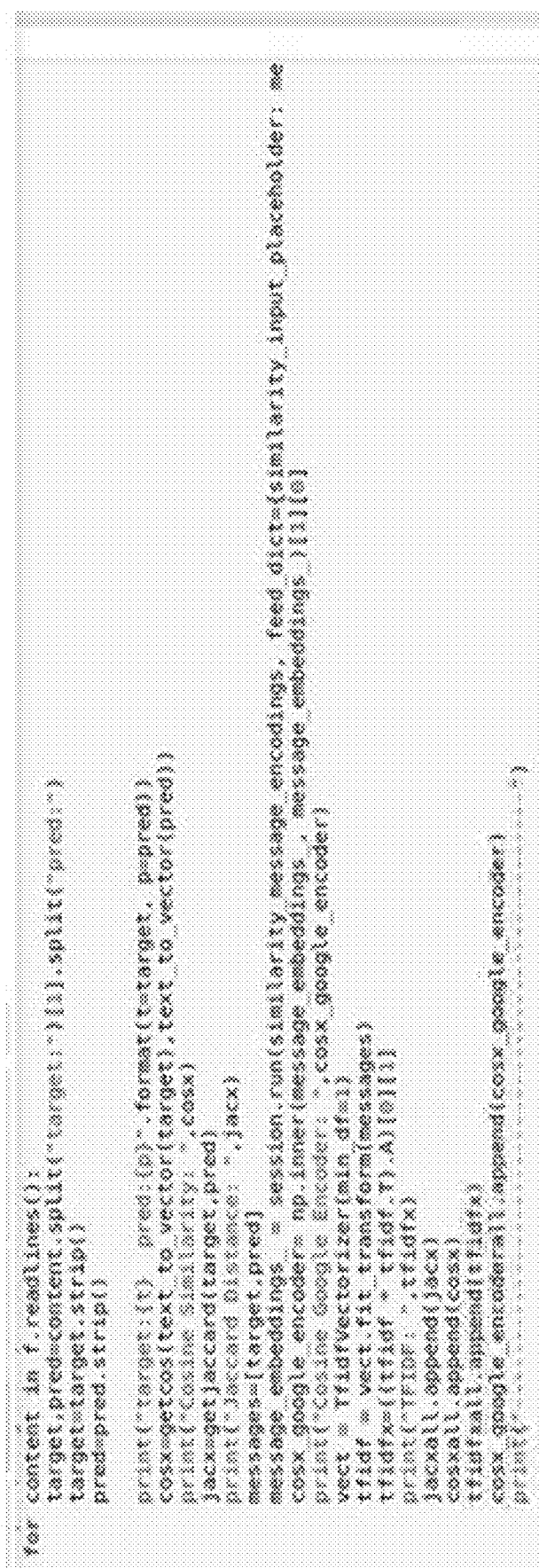
FIGS. 57A and 57B show another example computer code to determine whether to verify a requesting individual, according to example embodiments.
Figure 57B:
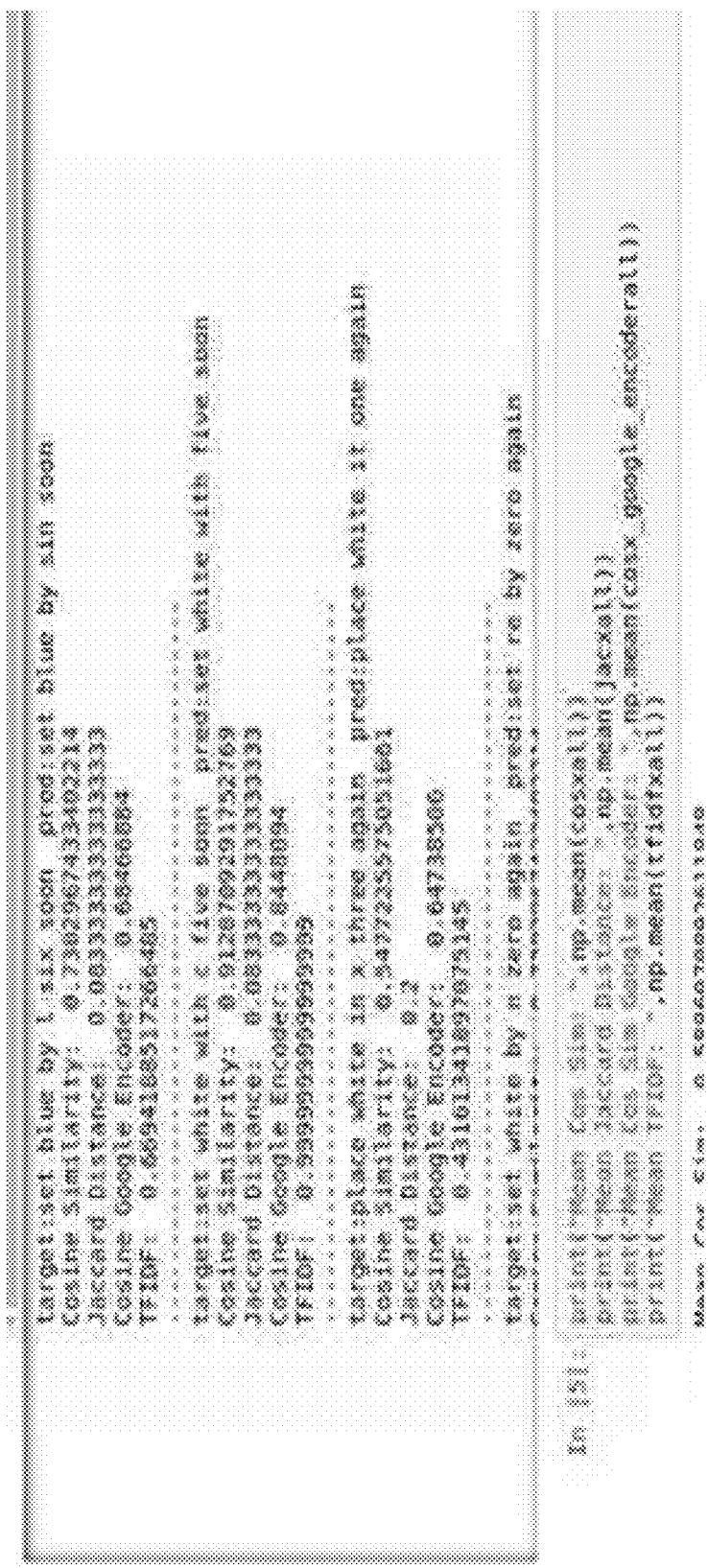
Figure 59:
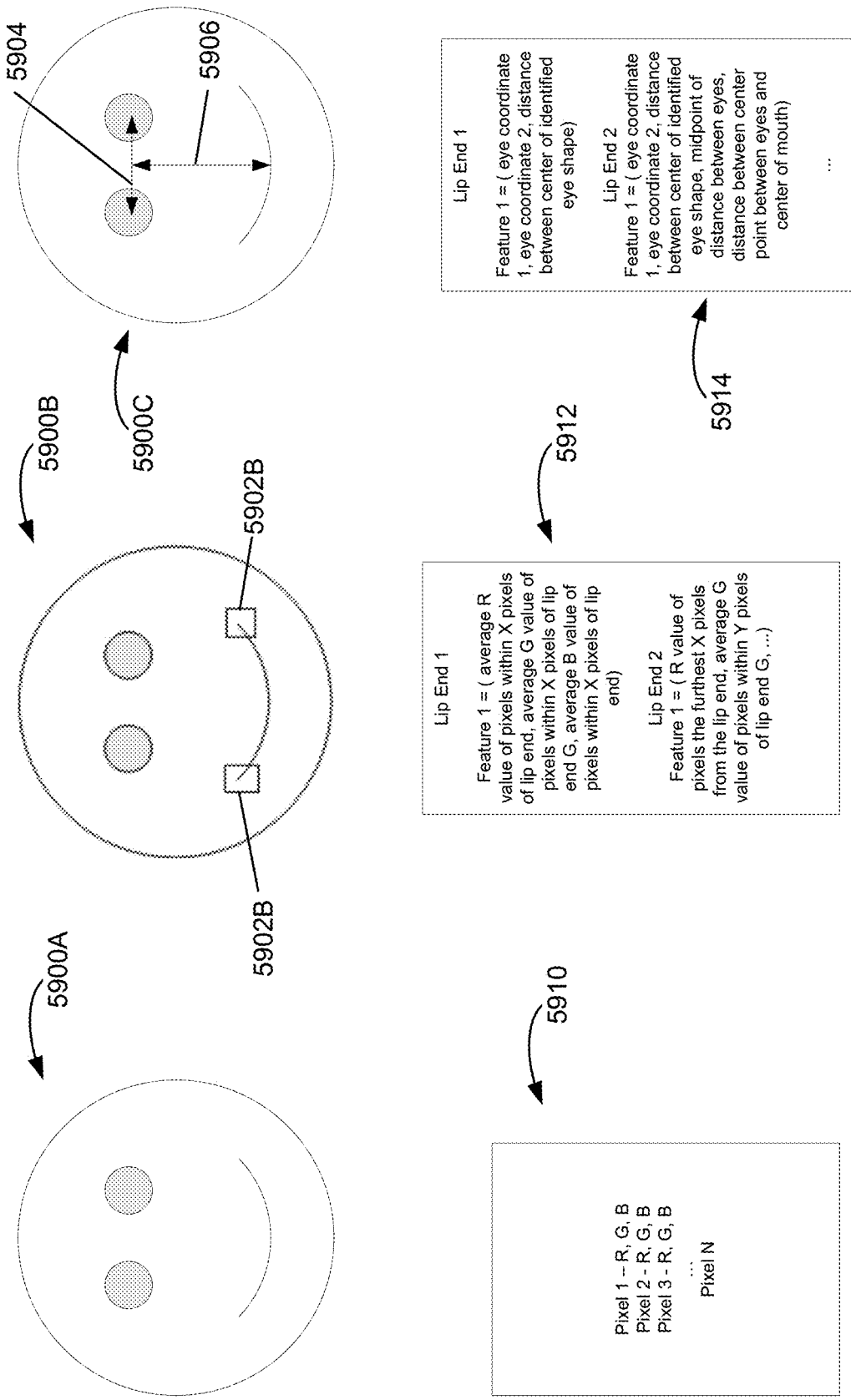
FIG. 59 is a diagram of facial features, and corresponding feature vectors, according to example embodiments.

FIGS. 39 and 54 are screenshots showing example interfaces screens on a mobile device in accordance with a series of interactions whereby the digitally signed tokens are utilized in validating characteristics of the individual, according to some embodiments. The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

In some embodiments, one or more aspects of the tokenization and/or verification/validation processes described herein can involve one or more secure execution environments and/or secure storage elements. For example, in some embodiments, the storage of private keys and tokens, in addition to computations required for issuance and proofs, could be performed on Trusted Execution Environments, Smart Cards, Secure Elements or Trusted Platform Modules on devices such as mobile and personal computers using corresponding APIs.

In some embodiments, a computing system includes or is configured to provide a plurality of distinct execution environments. The isolation of these environments can be enforced using software or hardware. In some embodiments, a distinct execution environment can include one or more secure storage elements (for example, a Secure Element or one or more aspects of a Smart Card).

The distinct execution environments are, in some embodiments, configured to provide access to different storage and processing resources. In some embodiments, one of the environments may be referred to as a trusted execution environment (TEE) and may have access to isolated and secure storage and processing resources. In some embodiments, a secure environment may support a distinct operating system, or it may be a set of secure resources accessible to applications that are assigned to use it by the underlying operating system of the overall system. In some embodiments, a computing system includes a dedicated secure storage resource, such as a separate secure storage or a secure storage area within a general storage resource. In some embodiments, the computing system includes a dedicated secure memory device such as a separate secure memory, or a secure area within a general memory resource (e.g. secure memory may be accessible in a different address space or in a different address range).

These resources may be physically and/or logically distinct from the general resources of the same type. In a computing system that includes or is configured to provide two distinct execution environments, the first execution environment is a secure execution environment and the second execution environment is a potentially unsecure environment. The secure execution environment is sometimes referred to as a trusted execution environment (TEE) and the potentially unsecure environment is sometimes referred to as a rich execution environment (REE). The second execution environment (e.g. the potentially unsecure execution environment) is configured to communicate with the secure execution environment (e.g. the first execution environment) to request one or more aspects of the tokenization and/or verification/validation process to be performed.

The second execution environment includes an unsecure portion of a processor, memory, and storage. Software code of the second execution environment can include an unsecure OS that is stored in storage, loaded into memory at run time, and executed by processor to perform OS operations. In some embodiments, software executable by the second execution environment can include one or more APIs or other software components for providing function calls or otherwise interfacing with one or more components of the first execution environment.

For example, in some embodiments, the first (e.g. secure) execution environment can include (e.g. store) one or more keys such as root keys, private keys, and the like for generating signs tokens, validating one or more signed data elements, and/or the like. Some environment, first execution environment can include (e.g. store) one or more tokens against which one or more credentials or other data elements can be validated.

In some embodiments, first execution environment can include one or more software components including computer executable code for generating/issuing and/or validating one or more tokens, credentials and/or other data elements.

For example, in one example embodiment, a digitally signed token representing a verified identity or account can be stored as a secure storage element in a secure execution environment. A secure execution environment can include, computer executable instructions which receive from an unsecure execution environment one or more data sets representing one or more biometric verification credentials. The computer executable instructions and the secure execution environment can be configured to perform one or more calculations or data transformations to validate that the data sets representing the biometric verification credentials match or otherwise correspond to the digitally signed token as described herein or otherwise. In some embodiments, the data sets representing the one or more biometric verification credentials can be received at the device on which the secure execution environment resides and/or an external device in communication with the device in which the secure execution environment resides.

In some embodiments, secure execution environment can return one or more signals indicating whether the biometric verification credentials are valid or otherwise match the digitally signed token. Some environments, the signals can include one or more signed data elements to confirm the veracity of the signals.

In some embodiments, a secure execution environment can be used to generate a signed token. In some embodiments, a secure execution environment can receive from an unsecure execution environment one or more tokens and/or credentials. One or more software elements within the secure execution environment can generate a signed token and/or credential using one or more private keys stored within the secure execution environment. The signed token and/or credential can then be returned to the unsecure execution environment.

In some example scenarios, the signed token and/or credentials can be used by an unsecure execution environment (e.g. a door unlocking device) to verify the signed token with a corresponding public key.

Any other aspect of the tokenization and/or the validation process can be similarly applied to using these secure and unsecure execution environments to ensure that sensitive information such as keys, credentials, tokens, tokenization algorithms, biometric data, biometric processing algorithms, neural networks, and/or the like are only accessible by authorized authenticated individuals and/or processes.

In some embodiments, sensitive operations using a private key may be performed only in a secure area. In some embodiments, some additional or all operations maybe performed in a java card space of a smart card.

With reference to FIGS. 58 to 72, an illustrative example of the system 100 operating to authenticate an individual is shown. FIG. 58 shows a schematic diagram of the system 100 operating to authenticate an individual.

At block 5802, system 100 receives a request to register an individual for system 100. For example, the individual may be a dog walker, a banking customer, or a person engaging in a commercial transaction such as purchasing goods, renting goods, etc.

The request may be received by the system via communication unit 105, which may broadcast the form of a request. For example, communication unit 105 may broadcast that requests for verification can be received via Bluetooth or another network 150, if the request conform to specific application programming interface requirements (API). In example embodiment, the request may be received via an application associated with the system 100, such as an online banking app where access is sought to banking records. In example embodiments, the request is received via I/O unit 107 (e.g., via a touchpad on a point of sale (POS) device). According to example embodiments, registration requests may only be permitted in certain locations (e.g., within a branch), or after permission to request registration has been granted (e.g., after a bank employee verifies an individuals identity first).

At block 5804, the system 100 (e.g., passphrase generation unit 116) determines a required amount and type of phonemes to enable secure authentication. A phoneme is a unit of sound that distinguishes one word from another. Examples of phonemes in the English language include voiced phonemes such as /b/(e.g., bug, bubble), /d/ (e.g., dad, add, milled), which use the vocal chords, an unvoiced phonemes, which do not require vocal chords, such as /f/(e.g., fat).

Features of an individual, when speaking a phoneme, may be sufficiently unique to provide for an accurate authentication mechanism when comparing between authenticated samples and submitted samples. For example, the features of the individual can include facial features (e.g., mouth shapes, such as shown in FIG. 60), or auditory features such as pitch, tone, etc. (e.g., a particular regional accent may pronounce certain phonemes differently). Media capturing these features, such as a video, a recording, etc. may be used for to generate representations of the individual speaking the particular phoneme.

At block 5804, system 100 may be configured to require a media document of the user speaking the full set of phonemes, e.g., as contained in a phoneme pangram, or any subset of phonemes be submitted to accept registration. Where all available phonemes are requested, the system 100 may subsequently authenticate the user based on any words, as representations of the individual saying the building blocks of each word—the phonemes—are all present. In example embodiments, the system may require media data of the individual speaking some or all phonemes multiple times, to build a more robust profile. At block 5806, for example, system 100 may retrieve phoneme definitions or other words which enumerate phonemes in a particularly representative manner (e.g., some words may have lingering sounds, allowing for more images in a video of the individual changing their facial features to pronounce the phoneme). In example embodiments, the system 100 may request media data of particular combinations of phonemes to represent the phoneme transitions, or a subset of combinations.

Block 5804 results in a reference phrase or set of words being selected by system 100, which words include the requisite amount of phonemes. For example, the reference set of words may be a phoneme pangram, such as "The hungry purple dinosaur ate the kind, zingy fox, the jabbering crab, and the mad whale and started vending and quacking," or the reference set of words may be a passage from a book.

The reference phrase may be selected from a predefined set of reference phrases. For example, the system 100 may store in data storage 108 a copy of an internal training manual, and portions of the training manual may be selected. In example embodiments, the reference phrase is generated by a model data architecture, such as a natural language processor trained to generate phrases of a fixed length including all phonemes.

In example embodiments, the reference phrase or set of words may be selected based on a readability or accessibility threshold. For example, any selected reference phrase may be analyzed with a readability algorithm or assigned a score in accordance with a scoring system (e.g., the Flesch Reading Ease Score), and if the selected or generated phrase has a low score, it may be discarded. Similarly, the selected or generated phrase may be processed to determine whether any words within the phrase have a low accessibility score. The accessibility store may be assigned to particular words (e.g., manual assignment of an accessibility score) which accessibility reference scored may be stored on data storage 108. For example, long words with repeating consonants may have a low accessibility score as a result of being more likely to be difficult to pronounce by individuals with dyslexia.

In example embodiments, at block 5804, in addition to or in the alternative to the process described above, the system 100 is configured to determine the amount of phoneme transitions required to register to the system. Phoneme transitions, similar to phonemes, may require unique features of the user to pronounce.

At block 5808, the system 100 requests from the individual media data of the individual speaking the reference phrase. For example, the system 100 may send the request similar to the request described in relation to block 5802.

At block 5810, system 100 identifies whether a video received in response to the request in block 5808 satisfies preliminary criteria. For example, the system 100 may base authentication comparisons on certain facial features, and if the received video does not include the features, the system 100 may reject the video (e.g., the video crops out the eyes). A further description of feature extraction is set out in relation to block 5812. In example embodiments, the preliminary criteria include a required resolution, colour balancing, etc. In some embodiments, the preliminary criteria include determining whether the video shows an individual, and not a fake image, as described in reference to FIG. 16.

At block 5812, where the video is determined to satisfy the criteria of block system 5810, the system 100 (e.g., verification unit) extracts features of the registering individual from the video, where each feature is associated with a particular phoneme or phoneme transition.

Extracted features are vectors representative one or more properties of the submitted media. For example, with reference to FIG. 59A, which shows an exaggerated set of images and features, a feature may be the average colour of the face of the registering individual during a specific phoneme (e.g., the red, green, blue values of all pixels in an image shown in database 5910 of the registering individual's face in image 5900A).

In example embodiments, features are vectors associated with specific subsets of the media data. For example, in image 5900B, a facial feature detecting model data architecture has determined regions 5902A and 5902B associated with respective ends of the lips of the registered individual, and the extracted features may be configured to be a three dimensional vector (shown in database 5912) representative of the average red, green, blue values of the pixels in the identified regions 5902A and 5902B.

In some embodiments, the features may be vectors that denote relationships between identified features within the media data. For example, image 5900C includes a distance 5904 between the center of the registered user's eyes, and a distance 5906 between the centerpoint of the distance between the user's eyes and the centerpoint of the individual's mount. The feature may simply be a one dimensional vector including one of the distances, or the feature vector may include a plurality of dimensions describing the distance 5906, such as a vector including (eye coordinate 1, eye coordinate 2, distance between center of identified eye shape, midpoint of distance between eyes, distance between center point between eyes and center of mouth) as shown in database 5914.

In example embodiments, the regions used to determine features (e.g., regions 5902A) are determined by a facial recognition model data architecture (e.g., stored in or operated out of facial recognition unit 117) specifically trained to extract features. For example, the facial recognition model data architecture may be pre-trained to identify eyes of faced in images. The pre-training may include processing an entire image of an individual, and asking the facial recognition model data architecture to guess which pixel locations include the eye. The facial recognition model data architecture is adapted to iteratively update, through modifying weight values associated with computing nodes, transfer functions configured to minimize a loss function related to a false identifications of regions of the eye. The transfer functions may incorporate data from adjacent pixels, which may capture information of transitions of colors between adjacent pixels, and the like. In example embodiments, the facial recognition model data architecture may be trained to identify the pixel locations of all features that will be used to authenticate an individual, and not just the eye.

Referring now to FIG. 30, an example model data architecture for extracting features is shown. In the shown embodiment, the input layer 3002 receives a vector representation of the image (e.g., a 256×256 pixel image, with each pixel having a RGB value) and may output a RBG value normalized vector representation (e.g., by subtracting the mean RBG value from each RBG component of the vector).

The shown model data architecture includes a series of layers in a segmentation portion 3004, and a series of layers in a classification portion 3006. The segmentation portion 3004 includes 2D convolutional transpose layers, each reducing the dimensionality of the impute vector to generate a latent representation of the image. The segmentation portion 3004, after convolution via the convolution layers (e.g., convolutional layer 3008) to generate a latent representation, decodes the latent representation into the original sized image. This layer structure, shown ending with the output of convolutional layer 3014, is referred to herein as an autoencoder. The autoencoder output is provided to a reshape layer 3010, which rearranges the vector from a 256×256×3 vector into a 65536×7 vector, after which it is passed into an activation layer 3012 to determine whether the autoencoder representation includes a feature that requires classifying. The activation layer 3012 may implement a softmax activation function, or other functions.

Where the output of the reshape layer 3010 activates the activation layer 3012, that output is provided to classification portion 3006 to determine a label for the image (e.g., eye), and specifically the input of flatten layer 3016 to convert the output tensor from the convolutional layers (e.g., reshape layer 3010) to a form usable by linear layers (e.g., dense layer 3018). The dense layers are responsible for determining features within the flattened vector that are indicative of features in training examples.

At activation layer 3020, which implements a leaky_relu_activation function, the vector output of the activation layer, which in example embodiments are the features referred to elsewhere in this document, is a 256 dimension vector feature. In example embodiments, varying amounts of features are used.

In example embodiments, the features of FIG. 30 may not be associated directly with any explicable phenomena. For example, the features may be an amalgamation of information within the image that the model data architecture has learned is useful in correctly classifying images or portions of images.

Subsequent processing by activation layer 3020, the features are provided to the dense layer 3022, which may provide the final classification by the model. For example, the output of the dense layer 3022 may be a 16,651 dimensional vector which has all dimensional values as zero except for the dimension value associated with the "eye" label.

In example embodiments where, the model data architecture shown in FIG. 30 is trained to identify the phoneme being spoke in the image. For example, each image of the video may be processed by the segmentation portion 3004 and the classification portion 3006 and the model may predict, at the output of the classification portion 3006, the phoneme present in the processed image. The prediction, as described above, can be in the form of a vector, where each dimension of the vector represents a phoneme. In this way, the model data architecture learns to classify each image as including a phoneme or phoneme transition.

In example embodiments, the model data architecture includes a long short term memory (LSTM ), which stores information related to sequential changes. For example, the LSTM may be trained to extract features from sequences of images. For example, the LSTM may be trained that a particular sequence of features in an image relates to a phoneme transition. Moreover, if the model data architecture is trained to incorporate the text being described, the LSTM may learn the interrelation of features in the images and the expected text.

In example embodiments, a separate application monitors the output of the classifier, and requires that the phoneme classifications output sequentially by the classifier are correct for the expected phrase. For example, where the passphrase includes the word "cat", the application may determine whether sequential phoneme classifications are arranged in the following sequence "k", "æ" and "t". If, for example, the application is provided with the following sequence, "æ", "k", and "t", then the application may reject the classification.

The training data for a model data architecture trained to classify images as phonemes can include, for example, the images shown in FIG. 60. For example, image 6002 may be a training image where the classifier is trained that the correct prediction is a vector representing the phoneme ɚ (e.g., early/'ɚ lI/, first/'fɚ st/) spoken when saying the letter "e", image 6004 may be a training image where the classifier is trained that the correct prediction is a vector representing the phoneme d ʒ (e.g., just /'d ʒ /\st/, age /'eId ʒ ) spoken when pronouncing the letter "u", image 6006 may be a training image where the classifier is trained that the correct prediction is a vector representing phonemes i (e.g., even /'iv ə n/, these /'diz/) and ɔ (e.g., all /' ɔ l/, want /'w ɔ nt/) spoken when saying the letters "a" and "i", and image 6004 may be a training image where the classifier is trained that the correct prediction is a vector representing the phoneme oʊ (e.g., over /'oʊ v ɚ '/, both /'boʊθ /) spoken when saying the letter "o".

All layers described in relation to the model data architecture of FIG. 30 include weight values associated with computing nodes and transfer functions configured to minimize a loss function, which in turn adjusts the weight values.

In example embodiments, the weights of the model data architecture may already be configured based on a pre-training. For example, the facial recognition model data architecture may be pre-trained on a corpus of faces and feature identifiers.

In example embodiments, the facial recognition model data architecture may be further trained with the reference data if labelled. For example, an employee may input into system 100 the positive reference frames for where the registering individual's eyes are in the reference data, and the facial recognition model data architecture may iteratively update its constituent weights, as described herein, to adjust to the new positive examples.

It will be appreciated that the above example of a model data architecture is illustrative, and various configurations including various layers and types of layers are contemplated by this disclosure.

Returning to FIG. 58, after the model data architecture identifies features in block 5814, the system 100 stores the features (alternatively referred to as tokens) for subsequent authentication. In example embodiments, the system 100 stores the tokens in data storage 108, secure storage 110, or transmits them to the registering individual for storage. Having the registering individual store the reference data may reduce the computational storage requirements of system 100.

In example embodiments, the system 100 secures the features into secured tokens before storage. For example, the feature vector, which may be as described an n-dimensional vector, may be signed by a private cryptographic key (e.g., stored in secured data storage 109), where the act of signing the data can be verified by a corresponding public key of the same institution. In an illustrative example, the token may be signed by the private key of an operator of the system 100, such as a bank, or an institution, or a merchant. The corresponding public key of the operator or trusted entity, when combined with the signed data verifies that the secured token was signed by the trusted entity.

By signing the token, the trusted entity also prevents the data from being altered without compromising the digital signature. In this way, the trusted entity may sign the tokens, as it can retrieve the features from the secured token using the private key, and entrust their storage with the registered individual without being concerned about the integrity of the tokens. For example, if the secured token is interfered with, the trusted entity will not be able to verify its signature.

In example embodiments, the system 100 transmits the tokens to a third party or other location on system 100 for digital signing. For example, where the system 100 is operated on a POS device, the tokens may be transmitted to a back end computing signing for digital signing given the sensitivity of the private keys.

The registered individual may subsequently be notified that they have registered to the system 100, and that a reference data set corresponding to their features has been stored.

In example embodiments, the registered individual also includes or links the registered reference data to a user profile, which may contain other information associated with the registered individual.

The stored secured token or reference data may be subsequently used by the system to permit access to one or more computing resources.

Referring now to block 5882, system 100 receives a request from a requesting user to access one or more computing resources. In example embodiments, the request is specific to computing resources associated with an authenticated individual (e.g., a bank account), or the request may seek computing resources generally available to a group of individuals (e.g., permit entry and egress to a home, where access generally is sought).

The request may be exchanged between the requesting user and the system 100 in accordance with the methods described in relation to block 5802.

At step 5824, the passphrase generation unit 116 may generate or select a dynamic passphrase to challenge the user with. The passphrase, similar to the reference phrase, includes a set of words which, when spoken, require one or more features of the requesting individual to rearrange to produce phonemes or the phoneme transitions. More specifically the passphrase includes words which include at least a subset of the phonemes or phoneme transitions in the reference data (shown as block 5826) to allow for comparison. For example, where the reference data included all phonemes, the passphrase can include any combination of words.

The dynamic passphrase, in contrast to the static passphrase, changes over time. By changing the passphrase, illicit or unauthorized individuals seeking entry will find it harder to mimic the correct answer, as it changes over time, increasing the amount of preparation. Moreover, by changing the passphrase over time without for example repeating permutations, illicit or unauthorized individuals may find it difficult to predict what type of information is required to be mimicked.

The passphrase may be generated prior to any request being received by system 100 and periodically refreshed, or generated only after receiving the request described in block 6522. For example, the system 100 may periodically generate a passphrase for the registered user and keep said passphrase on file for a fixed period to ensure rapid delivery of the passphrase to the requesting individual.

Generating the passphrase includes selecting one or more words, or one or more characters, which when pronounced by the individual, require speaking the particular phoneme or phoneme transition. For example, the passphrase generation unit 116 may have a dictionary of words or source, and include an algorithm to select from the stored dictionary. Continuing the example, the passphrase generation unit 116 may be trained to select passages from a novel (e.g., Dracula) randomly, and assess whether the words of the passage include the phonemes or phoneme transitions present in the reference data set. In example embodiments, the passphrase is not coherent, such as a string "1Qr56".

The passphrase may be generated such that a sufficient amount of phonemes are present to compare to the reference data (e.g., five different phonemes to provide for robust authentication), and that a sufficient amount of instances of the individual speaking the phoneme are present (e.g., two separate instances of each phoneme to ensure that authentication is accurate).

In example embodiments, the passphrase is dynamically generated. For example, passphrase generation unit 116 may include a natural language processing (NLP) model data architecture trained to generate passphrases. The model data architecture for generating passphrases may be trained on a reference data set, such as a novel, or article, or series of articles, to iteratively predict the subsequent word in the novel, and thereafter generate passphrases word by word based on the training examples in the articles.

Advantageously, training the model data architecture for generating passphrases with existing public examples such as novels removes the requirement for specialized curated data sets, and allows for ample material to re-train the model data architecture for generating passphrases so as to generate different passphrases (e.g., a new book, or a new combination of books), allowing for relatively inexpensive training and generation of passphrases. Moreover, questions generated by an NLP model data architecture trained in with novels or other materials may increase the cohesiveness of the questions asked.

Similar to the reference phrases described in relation to block 5804, the passphrase may be generated based on a readability or accessibility metric.

In example embodiments, as described herein, the passphrase is dynamically generated based on up to date information in the user profile. The up to date profile includes one or more entries associated with the authenticated individual. For example, as shown in FIG. 61, the one or more entries may be rows of data 6102, 6104, and 6106, which include numerous data, such as the date 6108 of the credit card transaction, the description 6110, the amount 6112, the merchant name 6114, the transaction fees 6116, and the resulting balance 6118 of the credit card transactions. Various entries storing various data associated with the individual are contemplated. For example, the one or more entries may relate to rewards points information, online activity, etc.

Generating the passphrase based on the user profile associated with the authenticated individual can include, for example, including words present in the user profile. For example, the passphrase may be required to include at least a merchant name or description of a good recently purchased by the authenticated individual.

In example embodiments, generating dynamic passphrases further includes generating a verification question where the passphrase is a correct answer to the verification question. The passphrase generation unit 116 may optionally also generate one or more incorrect phrases for display alongside the passphrase, and transmit the verification question, the passphrase, and the one or more incorrect phrases for display as an added layer of security.

In this way, authenticating the user using the dynamic generated passphrase and verification question may include two separate layers of security to be assessed in relation to requesting data: first, whether the features of the requesting individual match the features of the authenticated individual, and second, whether the passphrase has been correctly answered.

Generating or selecting the dynamic passphrases and verification questions based on a user profile associated with the authenticated individual will be described in reference to FIGS. 61 to 73, which show experimental work in generating or selecting dynamic features. It will be appreciated that the scope of the present application is not limited to the particular features exemplified by these examples Referring to FIG. 61, the one or more entries and the associated data may be incorporated into the generation or selection of the dynamic passphrase having a subset of the reference phonemes by selecting words associated with the one or more entries that represent actions by the authenticated individual. This has the effect of increasing security, as (1) the recent actions of the individual are likely harder for an illicit individual to obtain relative to a stale password, or an address, etc., and (2) the passphrases may be easier to pronounce or guess by the authenticated user as they relate to a lived experience of the authenticated user.

Alternatively stated, FIG. 61 shows one or more data objects storing a plurality of structured data records associated with an individual, each structured data record (e.g., the shown rows) of the plurality of structured data records including at least a plurality of data values (e.g., the values in each cell) corresponding to a feature data field (e.g., the columns) of a plurality of feature data fields. FIG. 61 is an example data object, and the system 100 may retrieve one or more data objects from one or more data sources. For example, the system 100 can retrieve data objects from multiple data storage 108 sites, whether within the system 100 or external to system 100.

Incorporating the one or more entries into the passphrase can be implemented by (1) fitting the one or more entries into a plurality of cluster groups, (2) determining important data types which explain the fitting and definition of the cluster groups, and (3) generating the verification questions to include words describing the important data type or specific important data type values.

Fitting the one or more entries into a plurality of cluster groups into the plurality of cluster groups is performing a cluster analysis of the one or more entries. The one or more entries may be represented as vectors (e.g., referring to FIG. 61, a vector representation of the first entry 6102 may be (Ser. No. 01/012,020, a numerical representation of "existing balance", 45, a numerical representation of "woodgrove bank", etc.)). In example embodiments, the string data is represented by word vectors for example with a word2vec machine-learning model.

Figure 62:
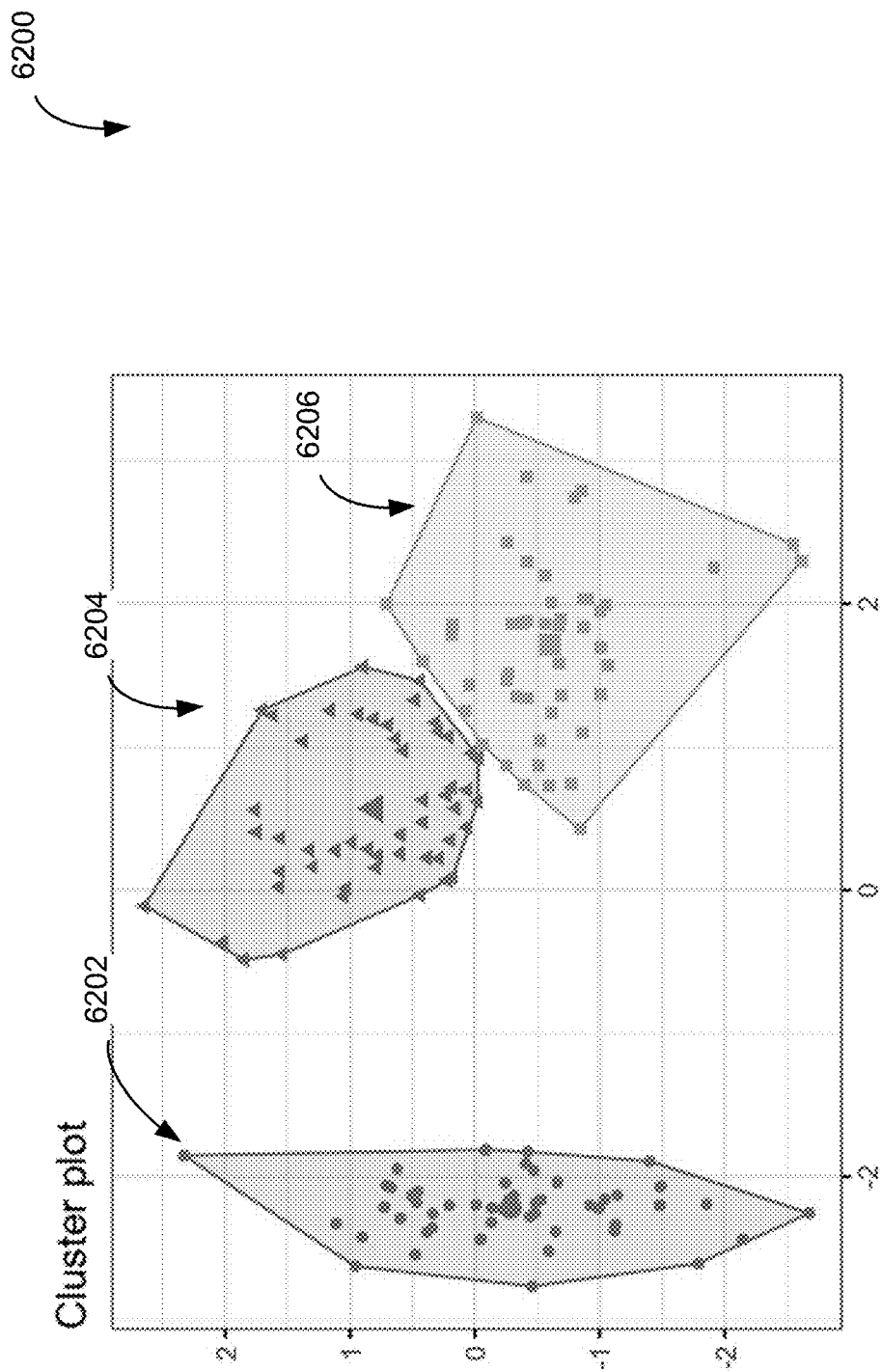
FIG. 62 is an example graph including various data record clusters, according to example embodiments.

The vector representations of all of the plurality of entries may input into an unsupervised model data architecture that fits each of the entries into a cluster groups. Fitting the entries into the cluster groups includes determining a distance between different entries. For example, where the entries are seven dimensional vectors, the distance between the various entries may be determined in the seven dimensional space, or the vectors may be projected onto a smaller dimensional space. For example, the distance between vectors may a Cosine Distance, a Jaccard distance, etc. As a result, a cluster group is defined by a group of entries which are closer to one another than then are to entries of another group, or which share a particular similarity, etc. For example, example cluster groups 6202, 6204, and 6206 are shown in FIG. 62 on an exemplary two-dimensional plot. In some embodiments, the cluster groups are defined to be exclusive, or overlapping, and so forth.

In example embodiments, segmenting the structured data records into one or more data record clusters includes establishing, using an unsupervised machine learning model data architecture, a plurality of data record clusters, each data record cluster representing a mutually exclusive set of structured data records of the plurality of structured data records.

Figure 63:
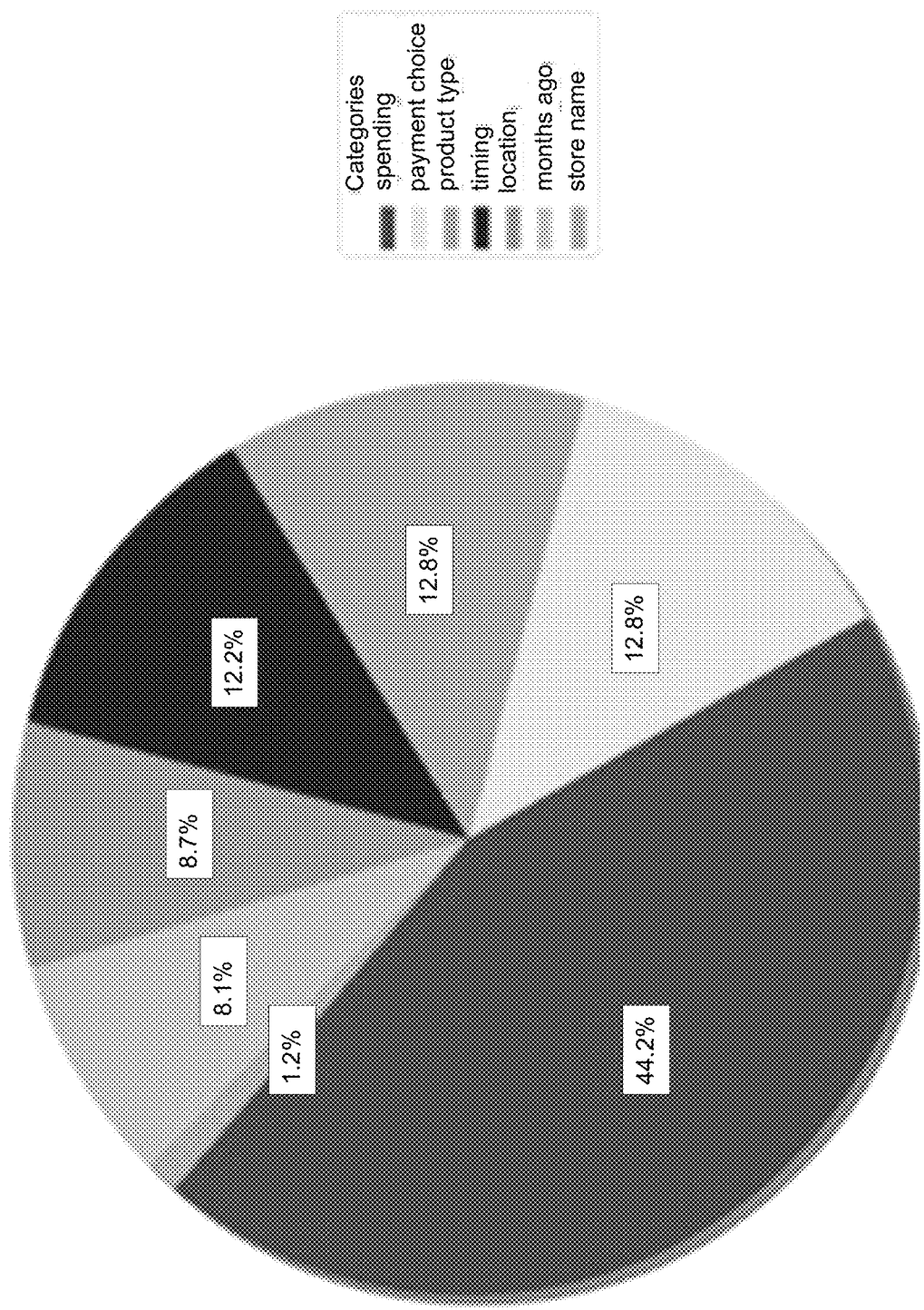
FIG. 63 is a pie graph of a plurality of data record clusters established with respect to example structured data records, according to example embodiments.

An alternate representation of the example cluster groups or data record clusters of experimental credit card data is shown in FIG. 63, where the clusters are represented as a share of all entries.

Table 1 below shows the clustering of the experimental data set, which data set was augmented to account for trend, noise, and seasonality analysis. The value can correspond to a particular ranking of a particular feature in relation to an importance level associated with the impact of the feature when generating a particular cluster.

An example entry relating to the purchase of a flight is shown having various associated features described therein.

| Category | Name | Value |
| --- | --- | --- |
| Spending | $100 | 150 |
| Payment choice | Credit card | 77 |
| Product type | Airlines | 64 |
| Timing | 12:00 | 59 |
| Location | Los Angeles | 54 |
| Months ago | 1 month ago | 51 |
| Store name | Sunbelt airline | 3 |

By assigning the entries to clusters, and generating the questions based on the clusters, the system 100 may provide for increased chances that (1) the system generates meaningfully different authentication questions and passphrases, as the cluster grouping should separate aspects of the actions, and (2) the legitimate individual is able to correctly answer the verification question, as the verification question is likely associated with a repeated or prominent theme in their previous actions. Alternatively stated, performing cluster analysis on the one or more entries may provide selecting passphrases which require different types of information, as the cluster groups include similar types of entries.

For example, if a malicious user acquired access to a customer's data through a corporate data breach, then the system 100 may increase the chances of preventing unauthorized access by selecting questions from different cluster groups to include variety in the type of personal knowledge the passphrase is associated with.

In example embodiments, feature importance analysis is conducted on the plurality of cluster groups to determine which type of data has the highest impact in determining to which cluster group an entry will be fitted. Alternatively stated, the type of data determined by the feature importance analysis has the highest ability to explain an entries inclusion into a specific cluster. For example, the value of the location data type may have a largest impact of sorting the entry into a particular cluster (e.g., a cluster may include many vacation related purchases, which may be most likely to be explained by the location of the purchase).

In example embodiments, for a data record cluster having a largest number of structured data records, the system 100 ranks the plurality of feature data fields based on a determined contribution value of each feature data field relative to the establishing of the data record cluster having the largest number of structured data records. For example, the contribution value may be determined through feature importance analysis. Contribution can be established The system 100 may further identify, using the ranked plurality of feature data fields, a first and a second feature data field of the plurality of feature data fields having the two highest determined contribution values.

By extracting the most important type of data, or a set of most important type of data (alternatively referred to as a list of prioritized data types), and selecting words of the most important types of data for the dynamic questions and passphrases, the system 100 may increase the ability of a legitimate user to correctly answer the verification question, as the important type of data may explain behaviour traits of the individual. For example, the individual's actions may be best explained by the most important type of data, and using words of the most important type of data may allow the individual to recall their behaviour and correctly answer the verification question.

The set of most important type of data may be determined by a pre-fixed number—for example, the set may be the five most important types of data.

FIGS. 64 and 65 show example computer code to implement feature importance ranking of the clusters generated for an experimental data set of one or more entries of credit card transitions and loans, respectively.

In another illustrative example, the passphrase generation unit 116 generating passphrases and verification questions using words to describe the most important data types (e.g., the amount of the credit card transaction and the amount of time since the credit card transaction) may include the dynamically generated verification question, "Approximately how many months ago was your credit card bill around $1000?", and the passphrase can be "six months" or "five months", and the incorrect answer can include "four months".

Figure 66:
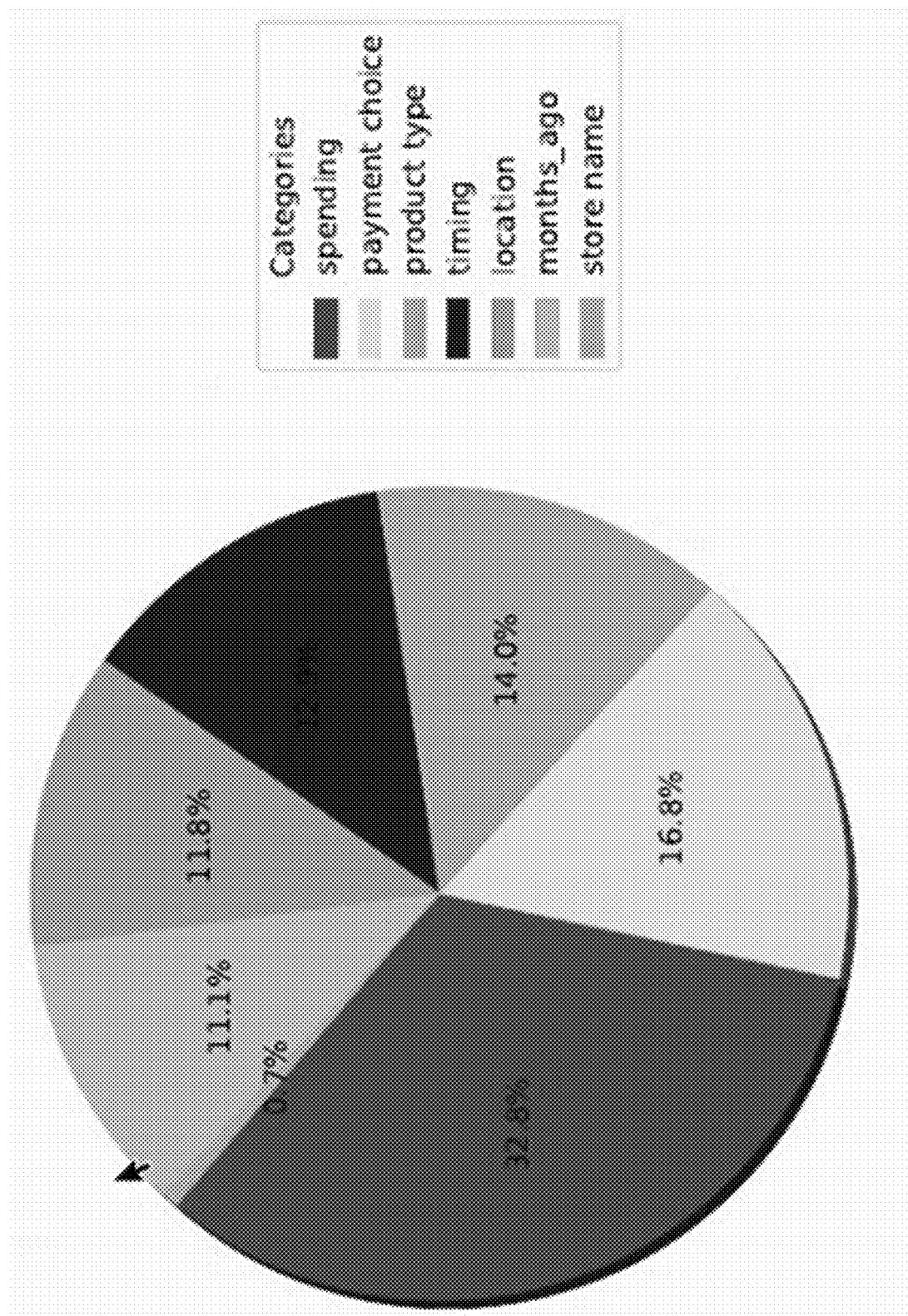
FIG. 66 is a graph of another plurality of data record clusters established with an unsupervised machine learning model data architecture and the structured data records of FIG. 63, according to example embodiments.

Different types of cluster analysis and feature importance analysis and prioritizing can yield different types of questions. For example, based on another experimental cluster in feature analysis (e.g., a tuned Random Forest analysis), the passphrase generation unit 116 may determine that the most important data types are the location of the transaction, and the product type purchased. Continuing the example, the dynamic passphrase unit may generate the following question; "What kind of products do you normally purchase in New York?" the following passphrase "professional services" and the incorrect passphrase can be "transportation services". Similarly, the cluster groups may change, as shown in FIG. 66.

In another example, where the most important data types include the location of purchase and type of product are determined to be the most important (e.g., prioritized), the verification question may be, "When you purchase goods or services at rental car company number bond, what is your usual payment method?", the passphrase may be "credit card" and the incorrect passphrase may be "debit card". In further examples the verification question may be: "In which city do you usually purchase goods from Walmart?" the passphrase made be "Brooklyn".

Figure 67:
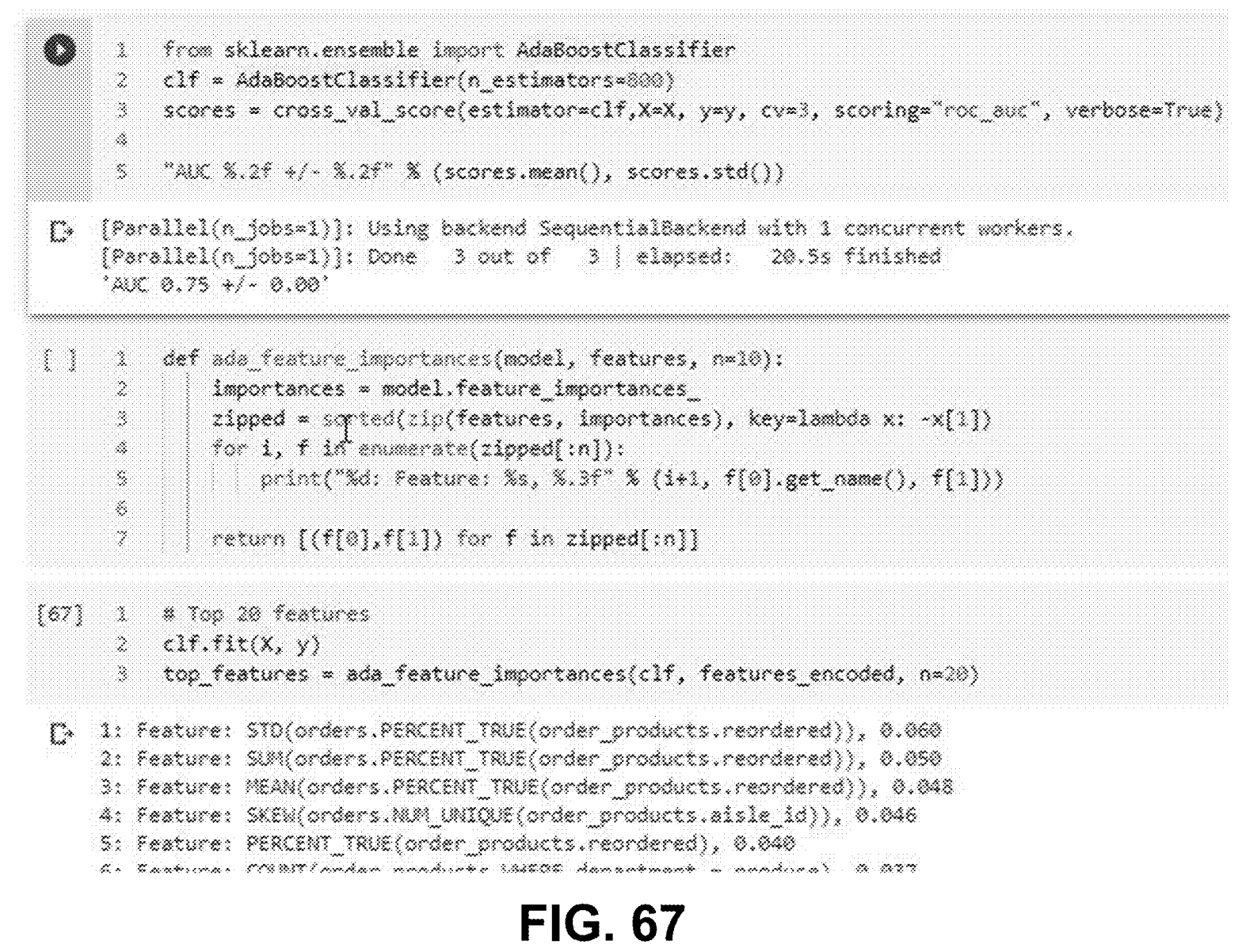
Figure 68:
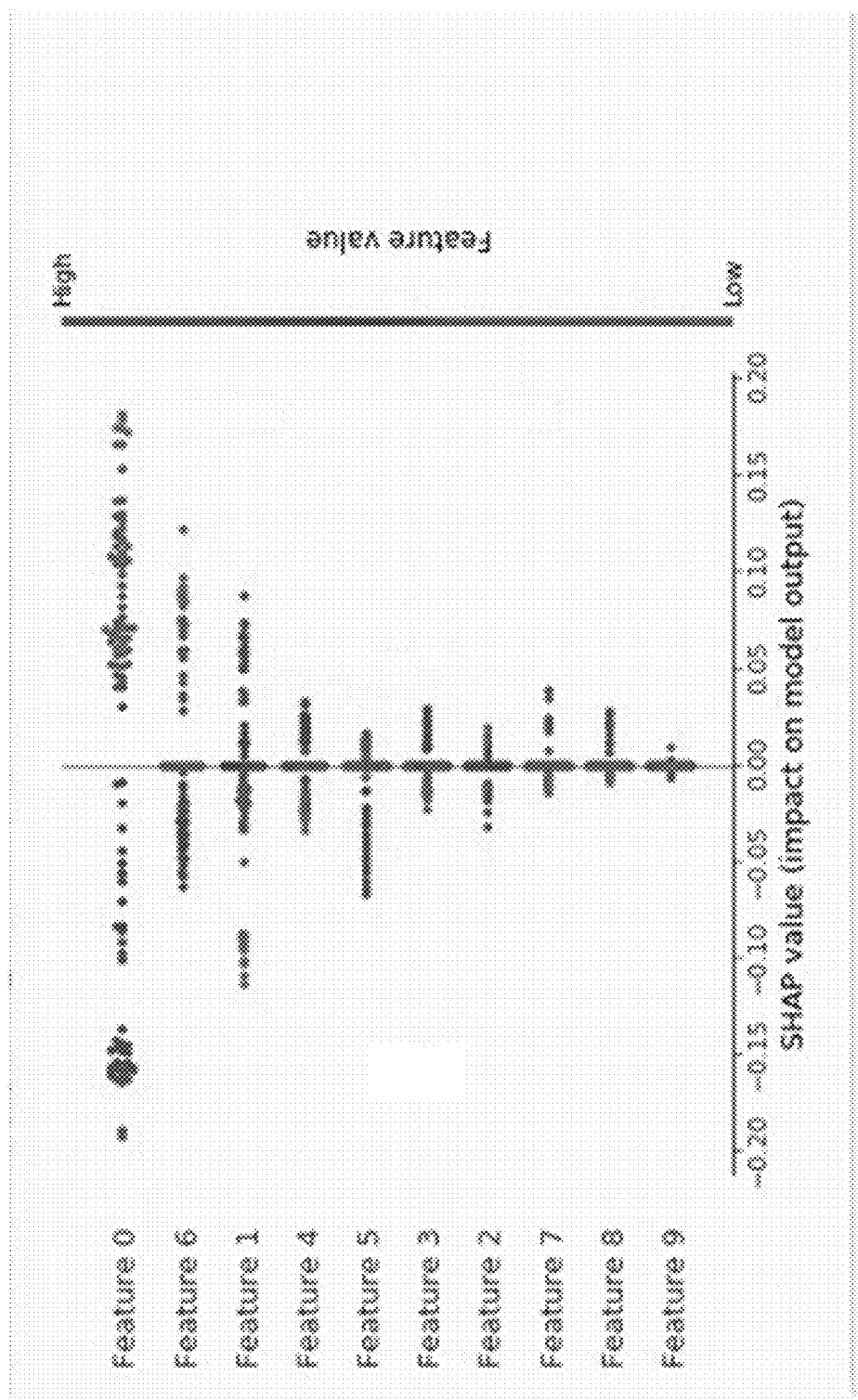
FIG. 68 is an example plot of a prioritized list of features associated with fitted clusters, according to example embodiments.
Figure 69:
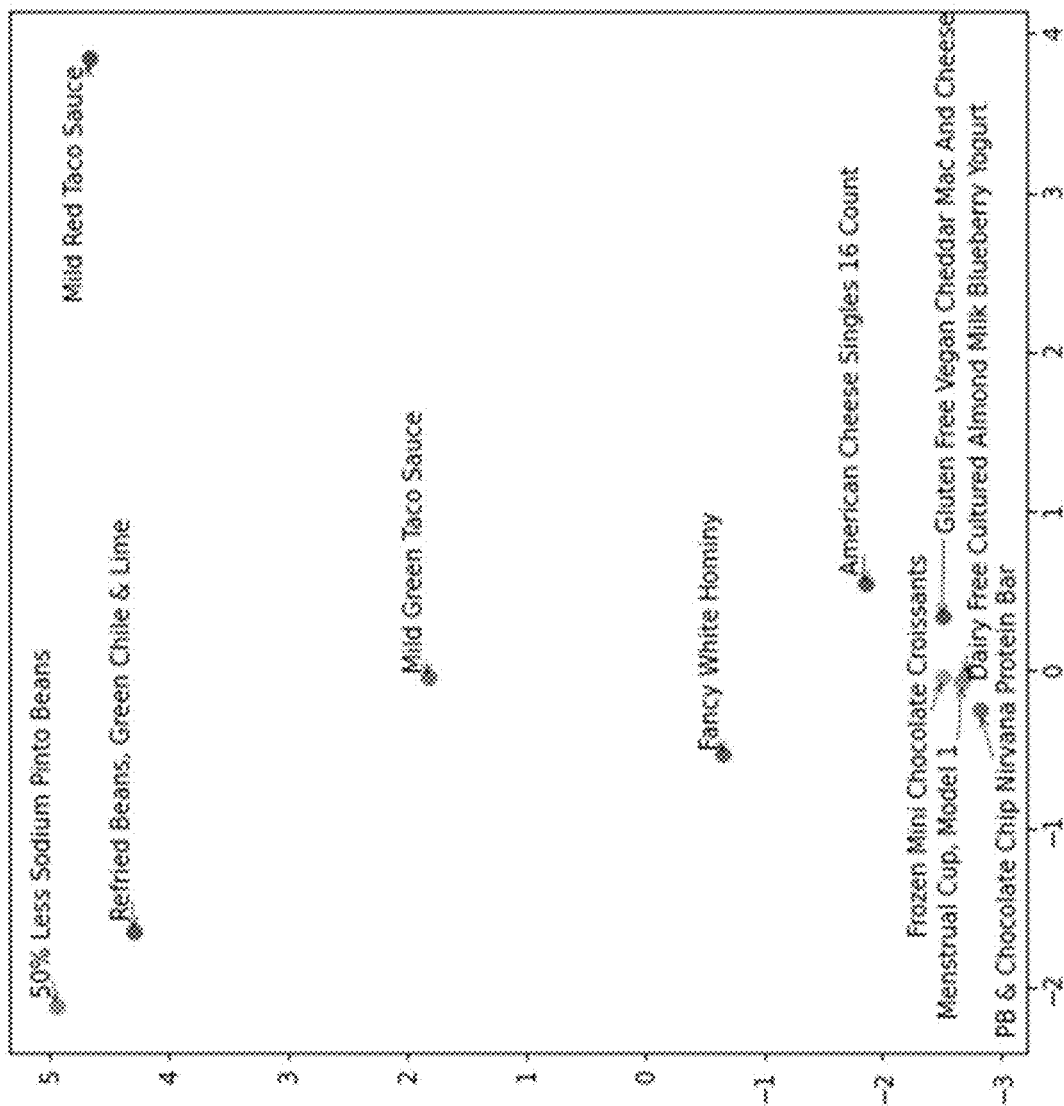
FIGS. 69 to 72 show various plots of analysis conducted on an experimental plurality of structured data records, according to example embodiments.
Figure 70:
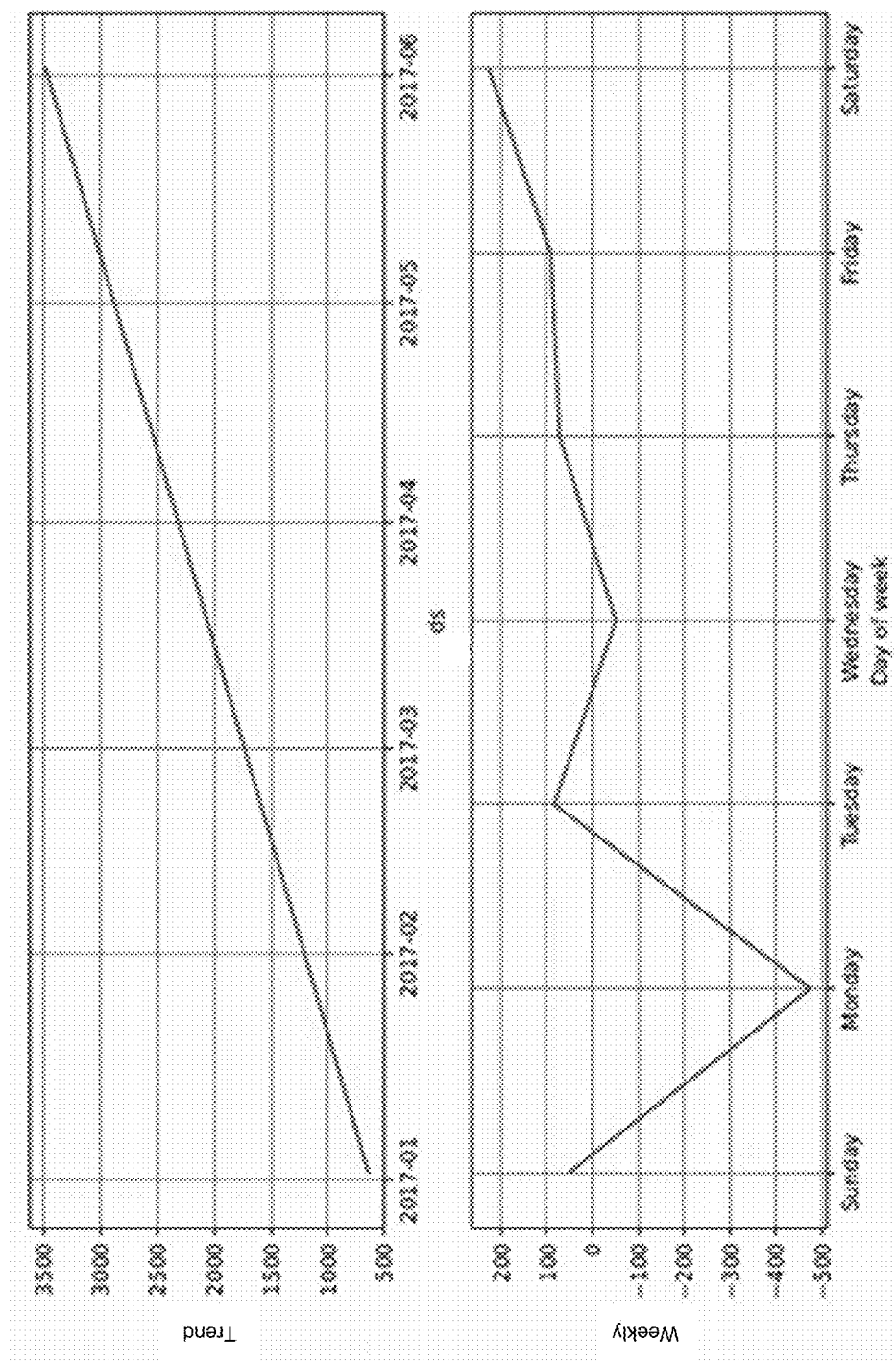
Figure 71:
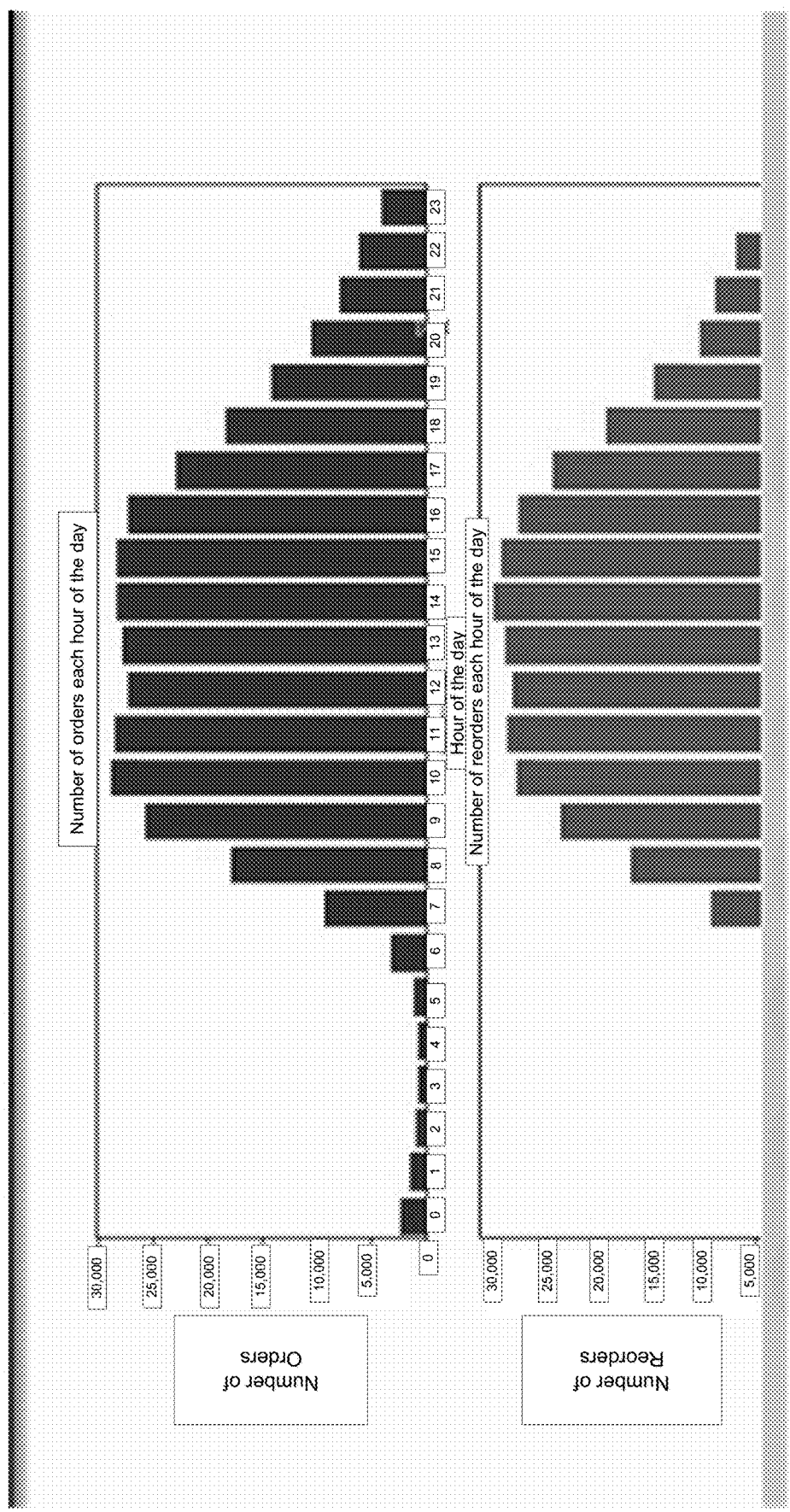
Figure 72:
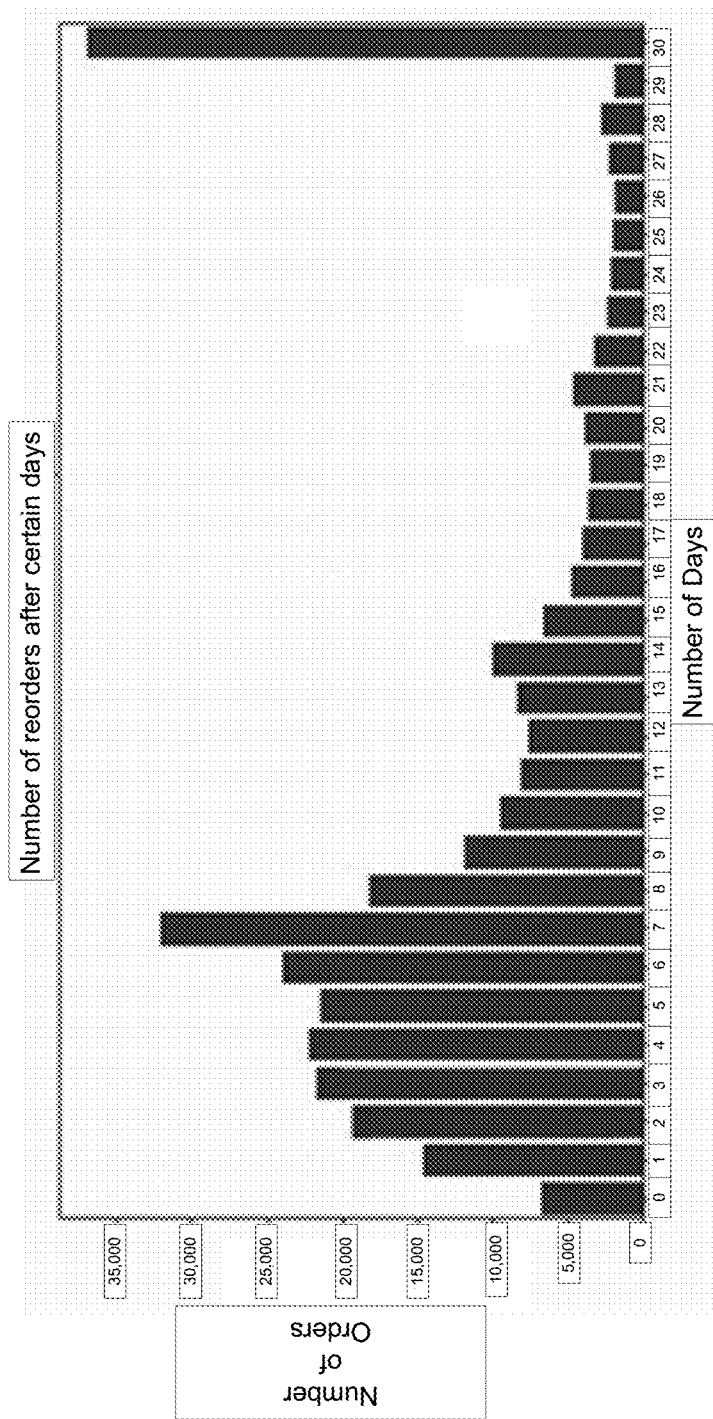

FIG. 67 shows another example computer code for performing feature analysis, and FIG. 68 shows a visual representation of the importance of the data types (referred to as features) determined using the SHAP method. FIGS. 69 to 72 describe various analysis (seasonal, trend, etc.) carried out on another example data set to determine individual behaviour.

Generating passphrases based on most important data types may overcome the technical bias of systems to generating obscure or archaic passphrases that are infrequently used. For example, a person is more likely to be able to answer questions to features that occur with some degree of frequency within their transaction history.

In example embodiments, the passphrase generation unit 116 implements a natural language processing (NLP) model architecture, similar to the NLP described in relation to block 5804 to generate verification questions and answer, where the NLP is trained at least in part on the words within the one or more entries. The NLP model architecture may be trained to generate question based on a positive example training set of questions.

For example, the training questions may all be related to credit card transactions, and the NLP may subsequently learn to generate questions that have increased coherency in respect of credit card transactions. During training, the NLP may be trained to assign a higher probability that the next predicted word should be a word found in the entries. The NLP may be activated to continue to generate text until the generated passphrase and/or verification question includes words from the one or more entries.

In example embodiments, the NLP model architecture may be trained to generate fill in the blank questions and can generate multiple questions from a single question. For example, where the verification question is based on a statement of fact, such as "You [the authenticated user] shopped at Store X in month Y to purchase good Z", the NLP may generate the following questions: "You shopped at _____ in month Y to purchase good Z", or "You shopped at Store X in month Y to purchase _____", and so forth.

In experimental work to date, there is illustration of example training examples for training a NLP model architecture.

In the experimental work. the plurality of structured data records associated with an individual includes 29,383 account transactions (e.g., incoming amounts (also referred to as accounts), disbursements, orders, transactions, and loans), and each structured data record of the plurality of structured data included an account identifier (e.g., an anonymized account identifier), a date of the purchase, a name of a retailer, an associated type of retailer (e.g., a grocery or other food type retailer, an electronics retailer, a pharmacy, a clothing or shoe retailer, etc.), the time, the purchase amount range (e.g., between $10 and $50, between $50 and $100), and category type (e.g., similar to the type of retailer, the type of good purchased).

Example training questions can include: "Was the date you created the account before Friday 28 May 1993?", with potential answers of "Yes" or "No"; "What is the frequency with which your statements are issued: Monthly Issuance, Weekly Issuance, or Issuance After Transaction?" with potential answers "Monthly Issuance, Weekly Issuance, or Issuance After Transaction"; "Are you the Owner or Disponent of the account?" with potential answers "Yes" or "No"; "Was your date of transaction before Wednesday 24 Nov. 1993? Choose Yes or No"; "What is your transaction type: Credit, Withdrawal, or Withdrawal in Cash?"; "What is your mode of transaction: Credit in Cash, collection from Another Bank, Withdrawal in Cash, Remittance to Another Bank or Credit Card Withdrawal?"; "What is your characterization of the payment: Interest Credited, Payment for Statement, Loan Payment, Household, Insurance Payment, or Sanction Interest?"; "Was your loan granted before Sunday 12 Jun. 1994? Choose Yes or No."; "If 'A' stands for contract finished, no problems, 'B' stands for contract finished, loan not payed, 'C' stands for running contract, OK so far, 'D' stands for running contract, client in debt; what is your status of loan payment: A, B, C, or D?"; "What is the duration of your loan: 12, 24, 36, 48, or 60 months?"; "What stores have you shopped at previously: More™, StoreBirds™, AjerNaStore™, MoreMerry™, SouthShopper™, DejavuStore™, NartureParadies™, FatimaStore™, BuyMore™, EverGreen™ WholeFoods™, CheapChopper™, ShoppingHogs™, Semnod™, CoolBuyStoreTM, WorldFamousStore™, NewBrand™, Spar™, FreshFood™, CleanShop™ UncleFrank™, BestBuy™, InternationalMarket™, SamStore™, AlwaysOpen™ Semitas™, DiSCOUntWorld™, Ikea™, BigMarket™, 7Eleven™, BigShopper™ or BetterUncle™?"; What category of stores have you visited recently: Food, Electronics, Pharmacy, Clothes or Shoes?"; "What is your usual shopping hours: 8 am-12 pm, 12-4 pm, or 4-8 pm?"; "What is the average amount you spend in a shopping trip: $50, $51-$100, or above $100?".

At block 5828, system 100 transmits a request to the requesting user to provide media data including the requesting user saying the dynamically generated passphrase. The request may be transmitted similar to the request in block 5822.

At block 5830, similar to block 5810, the system verifies whether the media data received in response to block 5828 satisfies criteria.

At block 5832, the system extracts one or more features from the provided media data (referred to as the requesting data). For example, the features can be extracted with the facial feature model data architecture described in relation to block 5812, or another facial feature model data architecture. In example embodiments, at block 5832, the system uses facial feature model data architecture as shown in block 5840, which is the facial feature model data architecture of block 5818, further trained with the registration data serving as positive examples.

At block 5834, the features extracted from the video provided in block 5828 are compared to the features in the registration data and features stored in block 5816 (shown as being retrieved in block 5842).

In example embodiments, the comparison includes a simple determination as to whether the features of the requesting individual pronouncing particular phonemes are identical to the features of the authenticated individual in the reference data pronouncing the same phonemes. For example, the features describing the requesting individual pronouncing the phoneme "æ" may be stored as data structure which includes an aggregated value of the pixel RGB values of a corner of the requesting individual's lip (e.g., (0.5556, 0.6522, 0.4888)), which may be compared to the reference data structure which stores a similar feature vector (e.g., (0.5557, 0.6524, 0.4889)) of the authenticated individual saying the same phoneme "æ".

In example embodiments, the compared feature vectors may be compared to determine whether the feature vectors are sufficiently similar (e.g., satisfying a threshold indicative of feature similarity). For example, similar to the determination of distances between entry vectors in regards to cluster analysis as described herein, the threshold indicative of feature similarity may be based on a distance or orientation between the two feature vectors. For example, the cosine similarity between the two vectors may be determined, and where the value of the cosine similarity is zero, the two vectors may be orthogonal, indicating that they are not very similar. In example embodiments, the distance may be measured by similarities measures including a Euclidian, or Jaccard distance between the two vectors.

In an illustrative example, the system 100 requires a match for each phoneme expected to be in a data of the user saying the dynamic passphrase. For example, where the passphrase, is "Royal Bank" (e.g., and the verification question is "Which bank do you have your mortgage with?"), in order to authenticate the requesting individual, the system 100 may require that the following phonemes—r, ɔ, I, ə, l (royal) and b, æ, ŋ, k (bank), are classified as existing in the requesting data, or that the features representing the requesting individual pronouncing the phonemes are present in the requesting data.

The system 100 may then classify each image of the requesting data by providing each image into the model data architecture. The model data architecture, for each image in the video, may output a predicted phoneme, or features associated with the predicted phoneme. For example, where the individual mispronounces a word, the outputs of the classifier may be r, ɔ, I, l (royl) and b, æ, ŋ, k (bank). The system 100 may reject the authentication as a result of not detecting an image that includes the missing phoneme. Alternatively, the system 100 may determine whether features associated with the phonemes are present, and determine whether the said features match the reference features, as described above. For example, the system 100 may traverse a data structure including all extracted feature vectors from the requesting data, and determine whether there are sufficient matches with the feature vectors in the reference data.

In example embodiments, the extracted features are timestamped, and the system 100 may check the extracted data structure to determine whether the extracted feature vectors are correct sequentially in respect of the expected passphrase. For example, the system 100 may check to see that the feature vectors are timestamped to have the features extracted in the following order—r, ɔ, I, ə, l (royal), and not l, r, ɔ, I, ə.

In example embodiments, the system 100 may determine compliance if a sufficient amount of phonemes within the reference data set are present in the requesting data. For example, where the reference data set includes all phonemes of a particular language, and the requesting data allows for successful authentication based on a comparison of a 80+% of possible phonemes (e.g., where the requesting user matches 80% of a phoneme pangram). In an example embodiment, the system 100 may determine compliance where a certain percentage of the phoneme representations in the requesting data (and therefore the passphrase), match the expected phoneme representations (e.g., eight of the nine expected phonemes are present in the requesting data).

In addition to an amount of matching phonemes determined, in example embodiments, the system 100 may require a particular degree of confidence in order to authenticate the individual. For example, the model data architecture may use an activation function that is more difficult to trigger in order to output a classification. In example embodiments, the degree of confidence may be described as the distance between the reference data feature vectors and the feature vectors in the requesting information. For example, the degree of confidence may require that the distance is limited to a certain percentage of the length of the reference feature vector.

In example embodiments, the system 100 utilizes the passphrase to speed up the process of authentication. For example, the system 100 may be configured, from the reference data, an expected duration of for the authenticated individual to speak each phoneme (e.g., the "æ" sound may require 0.1 seconds to speak, or a single image in a 10 frame per second video), and combine that data with the passphrase to determine an expected length of speaking or expected amount of images. Subsequently, the system 100 may determine the length of the video in the requesting data, and determine an expected location of each phoneme for the passphrase. In this way, the system 100 can more quickly determine authentication as it knows when to expect the particular phoneme.

If there is sufficiency similarity in the comparison, the system 100 may, at block 5838, transmit notification that authentication has been successful or provide access to the requested computing resources. For example, system 100 may allow a user to access their bank account information, or transmit to a retailer that the payment authorization has been validated. In example embodiments, the dynamic passphrase generation is one of one or more authentication mechanisms, and successful authentication by system 100 prompts the user to complete subsequent authentication mechanisms.

In example embodiments, where the feature comparison of block 5834 does not satisfy the threshold, the system 100 may generate a new dynamically generated password, and prompt the individual to again authenticate via a video of the individual speaking the new passphrase. The new dynamically generated password is completely different from the previous dynamically generated password, or includes some overlap.

Re-serving the individual with the new dynamically generated password may be beneficial to gather further information where system 100 is certain that the requesting user is illicit, or may allow the system to collect further features of the requesting individual to increase the confidence of the comparison.

According to some embodiments, a separate model data architecture may be trained to predict one or more features of the authenticating individual saying the passphrase when provided with the passphrase as input. In said embodiments, the predicted features are compared to the features provided by the requesting user.

Referring now to FIG. 73, a method 7300 of generating a dynamic challenge passphrase data object is shown.

At block 7301, one or more data objects storing a plurality of structured data records associated with an individual, each structured data record of the plurality of structured data records including at least a plurality of data values corresponding to a feature data field of a plurality of feature data fields are retrieved. For example, the data values of the plurality of feature data fields can include: a duration of interaction between a customer and a banking advice center (e.g., a telephonic investment advice center); an amount, time of, and parameters (e.g., type of banknotes requested) of a withdrawal transaction by a customer at a branch, an typical time of use (e.g., the afternoon) for online or mobile banking interaction, and so forth.

In example embodiments, the data sources include client demographics, transaction data, channel specific interaction logs, and public data such as credit reports and customer surveys.

At block 7302, a plurality of data record clusters, each data record cluster representing a mutually exclusive set of structured data records of the plurality of structured data records are established using an unsupervised machine learning model data architecture. For example, the unsupervised machine learning model data architecture utilize a K-Means Clustering, or other approach to determining the clusters. In example embodiments, the data record clusters are not mutually exclusive, for example they may be established using a Fuzzy K-means approach.

At block 7303, the plurality of feature data fields are ranked based on a determined contribution value of each feature data field relative to the establishing of the data record cluster having the largest number of structured data records, for a data record cluster having a largest number of structured data records.

At block 7304, a first and a second feature data field of the plurality of feature data fields having the two highest determined contribution values are identified using the ranked plurality of feature data fields. In example embodiments, one, or a plurality of feature data fields are identified and selected. For example, three features may be identified, or only a single feature may be identified. In example embodiments, identification comprises selecting the first feature having the largest determined contribution values, which determined contribution values are generated through feature importance analysis such as SHAP.

At block 7305, the dynamic challenge passphrase data object, wherein the first or the second feature data field is used to establish a statement string portion, and a remaining one of the first or the second feature data field is used to establish a question string portion and a correct response string is generated. In an illustrative example, the questions may be structured in the following manner:

{"What are the names of" && [individual specific data value in the first feature data field](e.g., CATEGORY e.g. restaurant, furniture store, etc.) && "you went to" [individual specific data value in the second feature data field] (FREQUENCY e.g. twice) && "in the last" && [individual specific data value in the third feature data field](e.g., a TIME_PERIOD such as two months, three months) && "in" && [individual specific data value in the fourth feature data field](e.g., a LOCATION such as New York)?"}

Similarly, in another example, dynamic challenge passphrase data object can be "What" && (ONLINE_STORE e.g. website) && "you used to place an online order using a" && (PAYMENT_METHOD, e.g. visa credit card) && "on the" && (TIME e.g. day of July 18th)?"

Authenticating a user in accordance with method 7300, including dynamically generating the authentication questions, may avoid the issues associated with static questions as described herein.

In example embodiments, where the data sources are from different channels within an organization (e.g., one data source is mobile banking data, and a second source is data from in branch interactions), the dynamic challenge passphrase data object may increase the level of security by incorporating information from channels which are separated for privacy. Alternatively stated, a malicious actor would have to know and breach two separate data sources in order to have source material to begin approximating the dynamically generated questions. As the authenticated individual has experienced all the information stored in the data sources (e.g., the individual has shopped, or requested loans, etc.), there is no adverse impact on the individual in using multiple silo-ed data sources. In some embodiments, as the passphrase uses data from multiple silo-ed sources, the passphrase can be used in all siloes, increasing the likelihood that a malicious user will not be able to access any resources associated with the individual.

Method 7300 is described in relation to accessing a bank account upon a user request. Without limiting the generality of the forgoing, method 7300 may be implemented in the context of an authentication process to: access an advice center banking resource, change login credentials associated with the banking resource (e.g., authentication may be required to change a password), generally where it is accessed that there is a likelihood of fraud or where there are indicators of exceptional behavior, accessing automated self-service for accounts, for high risk transactions, for account origination and enrollment, and for authentication of infrequent users.

Whereas method 7300 describes the generation of a single dynamic challenge passphrase data object, in example embodiments, multiple dynamic challenge passphrase data objects may be generated prior to the system 100 having confidence in the validation.

Moreover, by dynamically generating the dynamic challenge passphrase data object in relation to structured data records associated with an individual, where the first or the second feature data field is used to establish a statement string portion, and the remaining one of the first or the second feature data field is used to establish a question string portion and a correct response string, the passphrase security will increase as the question is used specific. For example, the first and second feature data field can be different for different individuals.

In example embodiments, all model data architectures described herein may be trained with the information submitted for an accurate verification, or further trained with new training examples. For example, a successful validation by the user may be tracked to indicate a level of time required to answer questions, which may indicate that the question is too obscure. Similarly, rejected requests for access may be used as negative training examples.

Where method 7300 may result in the provisioning of access to an electronic resource (e.g., online banking account) where authentication is successful, in instances where authentication is not successful (e.g., where the correct response string is not selected or spoken), the system 100 may send an alert to a fraud monitoring squad.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The technical solution of embodiments may be in the form of a software product. The software product may be stored in a non-volatile or non-transitory storage medium, which can be a CD-ROM, a USB flash disk, or a removable hard disk. The software product includes a number of instructions that enable a computer device (personal computer, server, or network device) to execute the methods provided by the embodiments. The embodiments described herein are implemented by physical computer hardware, including computing devices, servers, receivers, transmitters, processors, memory, displays, and networks. The embodiments described herein provide useful physical machines and particularly configured computer hardware arrangements. Although the embodiments have been described in detail, it should be understood that various changes, substitutions, and alterations could be made herein.

Moreover, the scope of the present application is not intended to be limited to the particular embodiments of the process, machine, manufacture, composition of matter, means, methods, and steps described in the specification.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A computer system for generating a dynamic challenge passphrase data object, the computer system comprising a non-transitory computer readable storage device, computer memory, and a processor configured to:

retrieve, from one or more data sources, one or more data objects storing a plurality of structured data records associated with an individual, each structured data record of the plurality of structured data records including at least a plurality of data values corresponding to a feature data field of a plurality of feature data fields;

establish, using an unsupervised machine learning model data architecture, a plurality of data record clusters, each data record cluster representing a mutually exclusive set of structured data records of the plurality of structured data records;

for a data record cluster having a largest number of structured data records, rank the plurality of feature data fields based on a determined contribution value of each feature data field relative to the establishing of the data record cluster having the largest number of structured data records;

identify, using the ranked plurality of feature data fields, a first and a second feature data field of the plurality of feature data fields having the two highest determined contribution values; and generate the dynamic challenge passphrase data object, wherein the first or the second feature data field is used to establish a statement string portion, and a remaining one of the first or the second feature data field is used to establish a question string portion and a correct response string;

wherein the dynamic challenge passphrase data object is used to validate a challenge response data structure using the correct response string; and wherein the dynamic challenge passphrase data object is automatically generated from one or more data sources such that an individual is not required to establish the dynamic challenge passphrase data object during an initial registration.

2. The system of claim 1, wherein for each of the plurality of structured data records, the processor is configured to transform textual data elements into numerical vectors having numerical values corresponding to a level of semantic similarity between underlying words represented by the numerical vectors.

3. The system of claim 1, wherein the processor is configured to first generate a baseline statement string using the first or the second feature data field, and then the dynamic challenge passphrase data object is generated based on one of a plurality of question strings generated based on the baseline statement string.

4. The system of claim 3, wherein the plurality of question strings generated based on the baseline statement string are each based on removal of a word from the baseline statement string, and the correct response string corresponds to the removed word from the baseline statement string.

5. The system of claim 1, wherein the correct response string is used to validate a response data object to provision access to an electronic resource.

6. The system of claim 5, wherein the processor is configured to:

receive a script-reading video data set capturing a portion of or an entirety of the individual's face while the individual is speaking words corresponding to a script data structure, the script data structure having a sequence of pre-identified phonemes or phoneme transitions, the pre-identified phonemes or phoneme transitions including at least one overlapping phoneme or phoneme transition required to be spoken when speaking words of the correct response string;

extract, from the script-reading video data set, a data subset representing the one or more facial or lip features of the requesting individual corresponding to each phoneme or phoneme transition corresponding to the sequence of pre-identified phonemes or phoneme transitions;

train, one or more baseline machine learning data model architectures, each baseline machine learning data model architecture of the one or more baseline machine learning data model architectures corresponding to a corresponding pre-identified phoneme or phoneme transition of the script data structure such that parameters of the baseline machine learning data model architectures are tuned based on the corresponding one or more facial or lip features;

receive an answer-reading video data set capturing a portion of or an entirety of the individual's face while the individual is speaking the words corresponding to the correct response string; and process, the answer-reading video data set, using the one or more baseline machine learning data model architectures corresponding to the at least one overlapping phoneme or phoneme transition to determine an overall classification similarity score;

wherein the provisioning of access to the electronic resource only occurs if the correct response string has been validated against the correct response string and the overall classification similarity score is greater than a pre-defined threshold similarity score.

7. The system of claim 6, wherein the script data structure includes words corresponding to a phonetic pangram or a holo-alphabetic sentence.

8. The system of claim 1, wherein the dynamic challenge passphrase data object is processed to control rendering of a graphical user interface where the statement string portion and the question string portion are displayed as textual display elements on a computer display.

9. The system of claim 5, wherein the secure electronic resource is a secure webpage.

10. The system of claim 9, wherein the secure webpage is an online banking website.

11. A method for generating a dynamic challenge passphrase data object, the method comprising:

retrieving, from one or more data sources, one or more data objects storing a plurality of structured data records associated with an individual, each structured data record of the plurality of structured data records including at least a plurality of data values corresponding to a feature data field of a plurality of feature data fields;

establishing, using an unsupervised machine learning model data architecture, a plurality of data record clusters, each data record cluster representing a mutually exclusive set of structured data records of the plurality of structured data records;

for a data record cluster having a largest number of structured data records, ranking the plurality of feature data fields based on a determined contribution value of each feature data field relative to the establishing of the data record cluster having the largest number of structured data records;

identifying, using the ranked plurality of feature data fields, a first and a second feature data field of the plurality of feature data fields having the two highest determined contribution values; and generating the dynamic challenge passphrase data object, wherein the first or the second feature data field is used to establish a statement string portion, and a remaining one of the first or the second feature data field is used to establish a question string portion and a correct response string;

wherein the dynamic challenge passphrase data object is used to validate a challenge response data structure using the correct response string; and wherein the dynamic challenge passphrase data object is automatically generated from one or more data sources such that an individual is not required to establish the dynamic challenge passphrase data object during an initial registration.

12. The method of claim 11, further comprising, for each of the plurality of structured data records, transforming textual data elements into numerical vectors having numerical values corresponding to a level of semantic similarity between underlying words represented by the numerical vectors.

13. The method of claim 11, further comprising generating a baseline statement string using the first or the second feature data field, and then the dynamic challenge passphrase data object is generated based on one of a plurality of question strings generated based on the baseline statement string.

14. The method of claim 13, wherein the plurality of question strings generated based on the baseline statement string are each based on removal of a word from the baseline statement string, and the correct response string corresponds to the removed word from the baseline statement string.

15. The method of claim 11, wherein the correct response string is used to validate a response data object to provision access to an electronic resource.

16. The method of claim 15, the method further comprising:

receiving a script-reading video data set capturing a portion of or an entirety of the individual's face while the individual is speaking words corresponding to a script data structure, the script data structure having a sequence of pre-identified phonemes or phoneme transitions, the pre-identified phonemes or phoneme transitions including at least one overlapping phoneme or phoneme transition required to be spoken when speaking words of the correct response string;

extracting, from the script-reading video data set, a data subset representing the one or more facial or lip features of the requesting individual corresponding to each phoneme or phoneme transition corresponding to the sequence of pre-identified phonemes or phoneme transitions;

training, one or more baseline machine learning data model architectures, each baseline machine learning data model architecture of the one or more baseline machine learning data model architectures corresponding to a corresponding pre-identified phoneme or phoneme transition of the script data structure such that parameters of the baseline machine learning data model architectures are tuned based on the corresponding one or more facial or lip features;

receiving an answer-reading video data set capturing a portion of or an entirety of the individual's face while the individual is speaking the words corresponding to the correct response string; and processing, the answer-reading video data set, using the one or more baseline machine learning data model architectures corresponding to the at least one overlapping phoneme or phoneme transition to determine an overall classification similarity score;

wherein the provisioning of access to the electronic resource only occurs if the correct response string has been validated against the correct response string and the overall classification similarity score is greater than a pre-defined threshold similarity score.

17. The method of claim 16, wherein the script data structure includes words corresponding to a phonetic pangram or a holo-alphabetic sentence.

18. The method of claim 15, wherein the secure electronic resource is a secure webpage.

19. The method of claim 11, wherein the dynamic challenge passphrase data object is processed to control rendering of a graphical user interface where the statement string portion and the question string portion are displayed as textual display elements on a computer display.

20. A non-transitory computer readable medium storing machine interpretable instructions which when executed by a processor, cause the processor to:

retrieve, from one or more data sources, one or more data objects storing a plurality of structured data records associated with an individual, each structured data record of the plurality of structured data records including at least a plurality of data values corresponding to a feature data field of a plurality of feature data fields;

establish, using an unsupervised machine learning model data architecture, a plurality of data record clusters, each data record cluster representing a mutually exclusive set of structured data records of the plurality of structured data records;

for a data record cluster having a largest number of structured data records, rank the plurality of feature data fields based on a determined contribution value of each feature data field relative to the establishing of the data record cluster having the largest number of structured data records;

identify, using the ranked plurality of feature data fields, a first and a second feature data field of the plurality of feature data fields having the two highest determined contribution values; and generate the dynamic challenge passphrase data object, wherein the first or the second feature data field is used to establish a statement string portion, and a remaining one of the first or the second feature data field is used to establish a question string portion and a correct response string;

wherein the dynamic challenge passphrase data object is used to validate a challenge response data structure using the correct response string; and wherein the dynamic challenge passphrase data object is automatically generated from one or more data sources such that an individual is not required to establish the dynamic challenge passphrase data object during an initial registration.

* * * * *